United States Patent
Rostoker

(10) Patent No.: US 8,381,180 B2
(45) Date of Patent: Feb. 19, 2013

(54) VISUALLY EXPOSING DATA SERVICES TO ANALYSTS

(75) Inventor: Nir Rostoker, Bialik (IL)

(73) Assignee: SAP AG, Walldorf (DE)

( * ) Notice: Subject to any disclaimer, the term of this patent is extended or adjusted under 35 U.S.C. 154(b) by 1476 days.

(21) Appl. No.: 11/645,449

(22) Filed: Dec. 26, 2006

(65) Prior Publication Data

US 2008/0127052 A1 May 29, 2008

Related U.S. Application Data

(60) Provisional application No. 60/843,164, filed on Sep. 8, 2006.

(51) Int. Cl.
*G06F 9/44* (2006.01)

(52) U.S. Cl. .......... 717/120; 717/104; 717/101

(58) Field of Classification Search .............. None
See application file for complete search history.

(56) References Cited

U.S. PATENT DOCUMENTS

| | | | | |
|---|---|---|---|---|
| 5,446,895 A * | 8/1995 | White et al. | ............ | 717/101 |
| 5,561,811 A * | 10/1996 | Bier | ............ | 710/5 |
| 5,668,998 A * | 9/1997 | Mason et al. | ............ | 717/104 |
| 5,671,415 A * | 9/1997 | Hossain | ............ | 717/101 |
| 5,706,502 A * | 1/1998 | Foley et al. | ............ | 717/120 |
| 5,729,746 A * | 3/1998 | Leonard | ............ | 717/101 |
| 5,758,160 A * | 5/1998 | McInerney et al. | ............ | 717/104 |
| 5,832,505 A * | 11/1998 | Kasso et al. | ............ | 1/1 |
| 5,838,315 A * | 11/1998 | Craycroft et al. | ............ | 715/866 |
| 5,937,189 A * | 8/1999 | Branson et al. | ............ | 717/101 |
| 6,014,666 A * | 1/2000 | Helland et al. | ............ | 1/1 |
| 6,016,394 A * | 1/2000 | Walker | ............ | 717/104 |
| 6,028,997 A * | 2/2000 | Leymann et al. | ............ | 717/104 |
| 6,038,393 A * | 3/2000 | Iyengar et al. | ............ | 717/104 |
| 6,167,564 A * | 12/2000 | Fontana et al. | ............ | 717/104 |
| 6,269,473 B1 * | 7/2001 | Freed et al. | ............ | 717/104 |
| 6,275,976 B1 * | 8/2001 | Scandura | ............ | 717/120 |
| 6,342,907 B1 * | 1/2002 | Petty et al. | ............ | 715/762 |
| 6,349,404 B1 * | 2/2002 | Moore et al. | ............ | 717/104 |
| 6,519,571 B1 * | 2/2003 | Guheen et al. | ............ | 705/14.66 |
| 6,564,368 B1 * | 5/2003 | Beckett et al. | ............ | 717/113 |
| 7,076,766 B2 * | 7/2006 | Wirts et al. | ............ | 717/121 |
| 2002/0041289 A1 * | 4/2002 | Hatch et al. | ............ | 345/762 |
| 2002/0073396 A1 * | 6/2002 | Crupi et al. | ............ | 717/104 |
| 2002/0087947 A1 * | 7/2002 | Kwon et al. | ............ | 717/120 |
| 2002/0100014 A1 * | 7/2002 | Iborra et al. | ............ | 717/104 |

(Continued)

OTHER PUBLICATIONS

"XGL Architecture Guide", Oracle Corp, 1994, <http://docs.oracle.com/cd/E19457-01/801-6675/801-6675.pdf> pp. 1-138.*

(Continued)

*Primary Examiner* — Thuy Dao
*Assistant Examiner* — Samuel Hayim
(74) *Attorney, Agent, or Firm* — Fish & Richardson P.C.

(57) ABSTRACT

The present disclosure relates to methods, systems, and software of modifying, configuring, adapting, or otherwise developing one or more pre-constructed applications and business process components to meet a user's needs or requirements of a particular business application. Each component or application includes one or more pre-constructed user interfaces and performs one or more predetermined functions, services, or queries. A non-technical user or business analyst may obtain an application and, thereafter, adapt or reconfigure the application to perform desired functions, thus creating a custom application. In some cases, the user may custom build a new application utilizing multiple components or applications. The creation, adaptation, and configuration of the application may be performed in an intuitive manner without exposing the user to the programming code or application model. Thus, the user can often easily create, adapt, and configure the application without the need for specialized information technology skills.

30 Claims, 74 Drawing Sheets

U.S. PATENT DOCUMENTS

| | | | | |
|---|---|---|---|---|
| 2002/0104067 A1* | 8/2002 | Green et al. | | 717/101 |
| 2002/0167543 A1* | 11/2002 | Smith et al. | | 345/762 |
| 2002/0169658 A1* | 11/2002 | Adler | | 705/10 |
| 2002/0180783 A1* | 12/2002 | Broussard | | 345/744 |
| 2002/0188434 A1* | 12/2002 | Shulman et al. | | 703/21 |
| 2002/0191018 A1* | 12/2002 | Broussard | | 345/746 |
| 2002/0199170 A1* | 12/2002 | Jameson | | 717/120 |
| 2003/0005412 A1* | 1/2003 | Eanes | | 717/120 |
| 2003/0028579 A1* | 2/2003 | Kulkarni et al. | | 709/100 |
| 2003/0172367 A1* | 9/2003 | Kannenberg | | 717/101 |
| 2003/0184584 A1* | 10/2003 | Vachuska et al. | | 345/762 |
| 2004/0015819 A1* | 1/2004 | Romano-Critchley et al. | | 717/102 |
| 2004/0015823 A1* | 1/2004 | Nolan | | 717/104 |
| 2004/0064805 A1* | 4/2004 | Sparago et al. | | 717/120 |
| 2004/0143812 A1* | 7/2004 | Bernstein et al. | | 717/101 |
| 2004/0177355 A1* | 9/2004 | Wragge | | 717/174 |
| 2005/0050301 A1* | 3/2005 | Whittle et al. | | 712/32 |
| 2008/0120129 A1* | 5/2008 | Seubert et al. | | 705/1 |

OTHER PUBLICATIONS

Shuusuke Haruna et al., "A GUI Software Design Model and its Runtime Architecture for Digital AV Applications", IEEE, 2000, <http://ieeexplore.ieee.org/stamp/stamp.jsp?tp=&arnumber=897234> pp. 347-351.*

Michael Gegick et al., "Matching Attack Patterns to Security Vulnerabilities in Software-Intensive System Designs", ACM 2005, <http://delivery.acm.org/10.1145/1090000/1083211/p11-gegick.pdf> pp. 1-7.*

\* cited by examiner

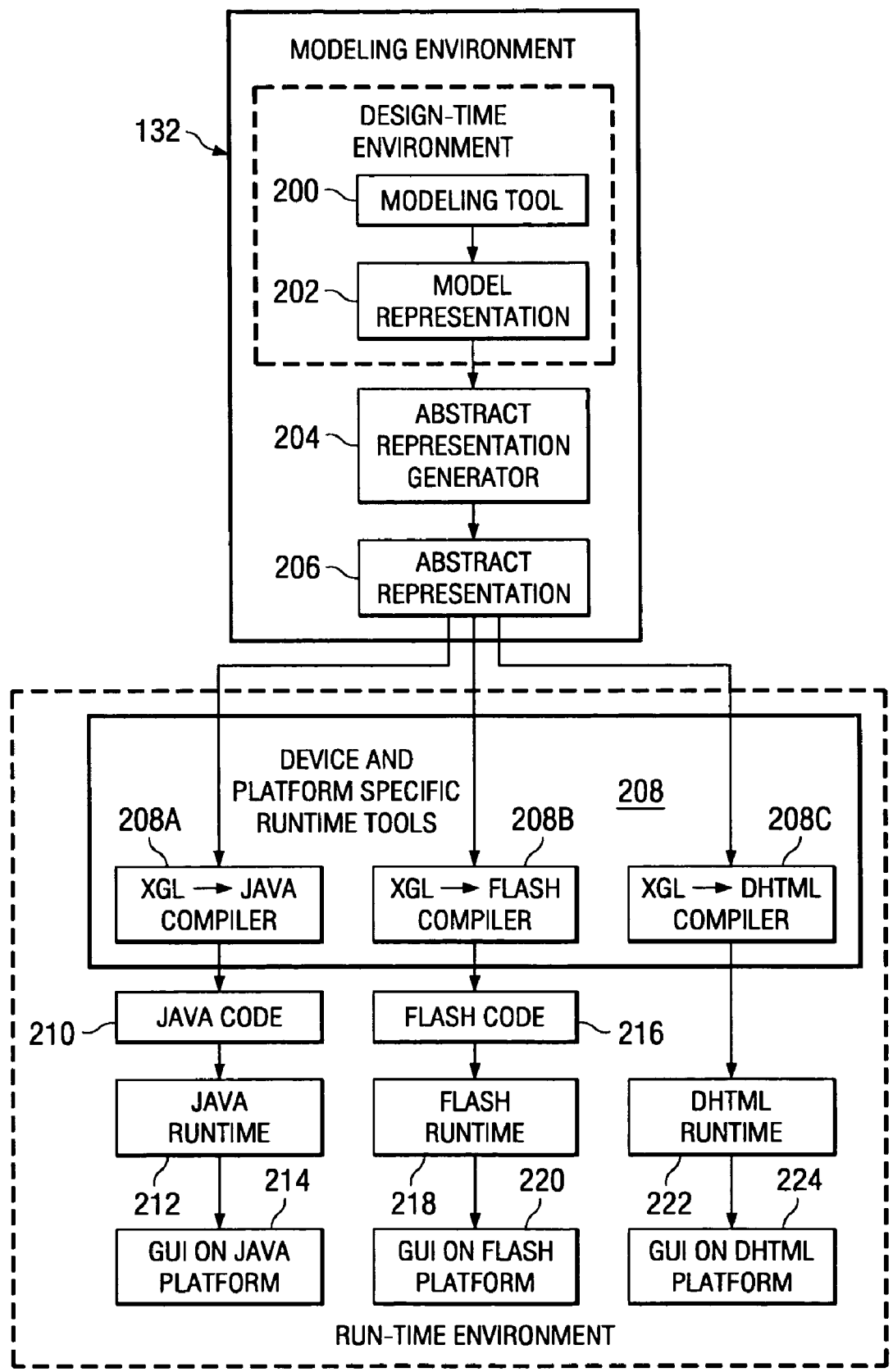

FIG. 59

VISUALLY EXPOSING DATA SERVICES TO ANALYSTS

RELATED APPLICATIONS

This application claims the benefit of U.S. Provisional Application No. 60/843,164, filed Sep. 8, 2006, which is incorporated herein by reference in its entirety.

TECHNICAL FIELD

This disclosure relates to software and, more particularly, to software for developing custom business applications in a service-oriented architecture.

BACKGROUND

Generally, software applications, such as business applications, typically perform one or more tasks that were created, modified, or otherwise developed by a skilled information technology professional. As a result, a large amount of time and expense can be required to develop these applications because of the specialized skill required. Moreover, some applications, although otherwise useful, may never be developed because of the required large investment in time and resources. Consequently, an operation, such as a business operation, continues to operate inefficiently. In some cases, these applications may utilize or implement analytics that provide information workers with comprehensive views they need to take actions guided by strategy that are appropriate, timely, and in concert with colleagues and the rest of the value network. In other words, facts-based understanding of customers and prospects—as well as suppliers, partners, employees, and broader economic indicators—can be used in both strategic and operational processes. In some cases these analytics deliver insights across the extended value network, spanning multiple business functions, departments, and even organizations. Plus, the analytic functions are usually designed for information workers, so they can be easy to use, modify, and extend.

SUMMARY

The present disclosure relates to methods, systems, and software for providing a compilation of composite applications ("xApps") and xApp components that may be modified, reconfigured, and/or adapted to meet a user's desires or requirements of a business application. Each component or application includes one or more pre-constructed user interfaces (UIs) and performs one or more predetermined functions, services, or queries. A non-technical user, such as a business analyst, may obtain an application and, thereafter, adapt or reconfigure the application to perform desired functions, thus creating a custom application. Alternatively, the user may custom build a new application utilizing multiple components or applications. The creation, adaptation, and configuration of the application may be performed in an intuitive manner without exposing the user to the programming code or application model. Consequently, the user is able to easily create, adapt, and configure an application without the need for specialized information technology skills, such as computer programming, or understanding the base architecture or model on which the application is based.

The user may create custom applications by building, modifying, and configuring analytics of the components using a "what-you-see-is-what-you-get" (WYSIWYG) approach. For example, modification the components may be performed utilizing guided procedures, configuration tools, or layout editing capabilities (e.g., a "wizard"). By using a wizard, the user is capable of creating, adapting, and configuring an analytical application or dashboard to create a new business application and, thus, quickly respond to changing business needs with a low associated cost.

According to one implementation, the system includes a storefront having a knowledge base or compilation of software components, applications, or other data services that can easily be modified or integrated into different business analyst and end user tools. A user may define a desired analytical application by utilizing one or more components obtained from the knowledge base via an information hub. The user may locate the components by searching the hub. The user may then select a pre-existing application or component and use the selected component or application without modification or use the component or application as a template, making modifications in order to create an application to operate in a desired manner.

According to one implementation, the search of the compilation may be conducted with one or more free search terms or taxonomy terms or a combination of one or more free search terms and taxonomy terms. The user may modify the pre-existing application to suit the needs of the new application. For example, the user may add, hide, or delete components or modify one or more components of the application. Thus, a user may modify one or more data series a graph; change the type of graph used to illustrate the defined data series; or add, delete, hide or modify a legend, axis titles, or graph titles of a graph, for example. The user may also add a functional button to a UI of the application to perform one or more user-defined functions, such as perform a calculation, present one or more other functional capabilities of the application, display a portion of text, open a dialogue box or window, or any other required or desired function. The user may also define the layout and properties of the UI, such as placement of one or more components, changing component sizes, or other aspects of the UI.

Alternately, the user may create an application from a "blank sheet" by searching the compilation of components and applications. A search may return one or more applications, application components, or other business process components that the user may import and configure to operate in a predetermined manner. The user may also use, import, or otherwise link one or more data series to the imported or created applications. Further, when the user performs a search, according to one implementation, the applications identified by the search may be presented to the user with related graphical user interface ("GUI") screen shots of the analytics, demonstrations of the component's functionality, key performance indicators (KPIs), example application scenarios, community reviews, and other information, such as user ratings, component cost, etc. Additionally, according to one implementation, the user may evaluate a component by, for example, imputing example or dummy data, and understand the operation of the component based on the output from the dummy data.

Further, after searching the component compilation, the user may identify an available application that will exactly satisfy the requirements of the desired application with little or no modification. Moreover, the user may create the new application without being exposed to the application programming code or model. Consequently, the user is able to create an application without having much, if any, computer programming or application design experience or knowledge.

In some cases, the application may involve or require modifications beyond the abilities of the user. Consequently, gaps may exist between the intended or desired functionality of the new or modified application and the actual application. As such, the user may include a description of the intended functionality of the new application. For example, the user may illustrate the intended operation of the new or modified application by utilizing a dummy set of input data and a dummy set of output data. Thus, the difference between the input and output data sets provides an indication to an information technology professional (e.g., a computer programmer) of the desired functionality. The user may also include notes explaining the required operation of the application and required binding or linking of the component with other components or data sets, for example. Other gaps may include deletion or addition of particular data elements. Accordingly, the information technology professional may utilize the dummy data sets and notes to configure the component accordingly in an efficient manner. Further, because the information technology professional is utilized only if and when the user is unable to fully modify a component as required, the creation of the application may be quickly developed.

The methods, systems, and software of the present disclosure may be computer implementable and may be provided as context-based content for a computer application. The details of these and other aspects and implementations of the disclosure are set forth in the accompanying drawings and the description below. Other features, objects, and advantages of the various embodiments will be apparent from the description and drawings, as well as from the claims.

DESCRIPTION OF DRAWINGS

FIG. 2A depicts an example development environment in accordance with one embodiment of FIG. 1;

FIGS. 58-74 are various screenshots illustrating adaptation of a pre-constructed xApp into a custom application.

DETAILED DESCRIPTION

Figure 1:
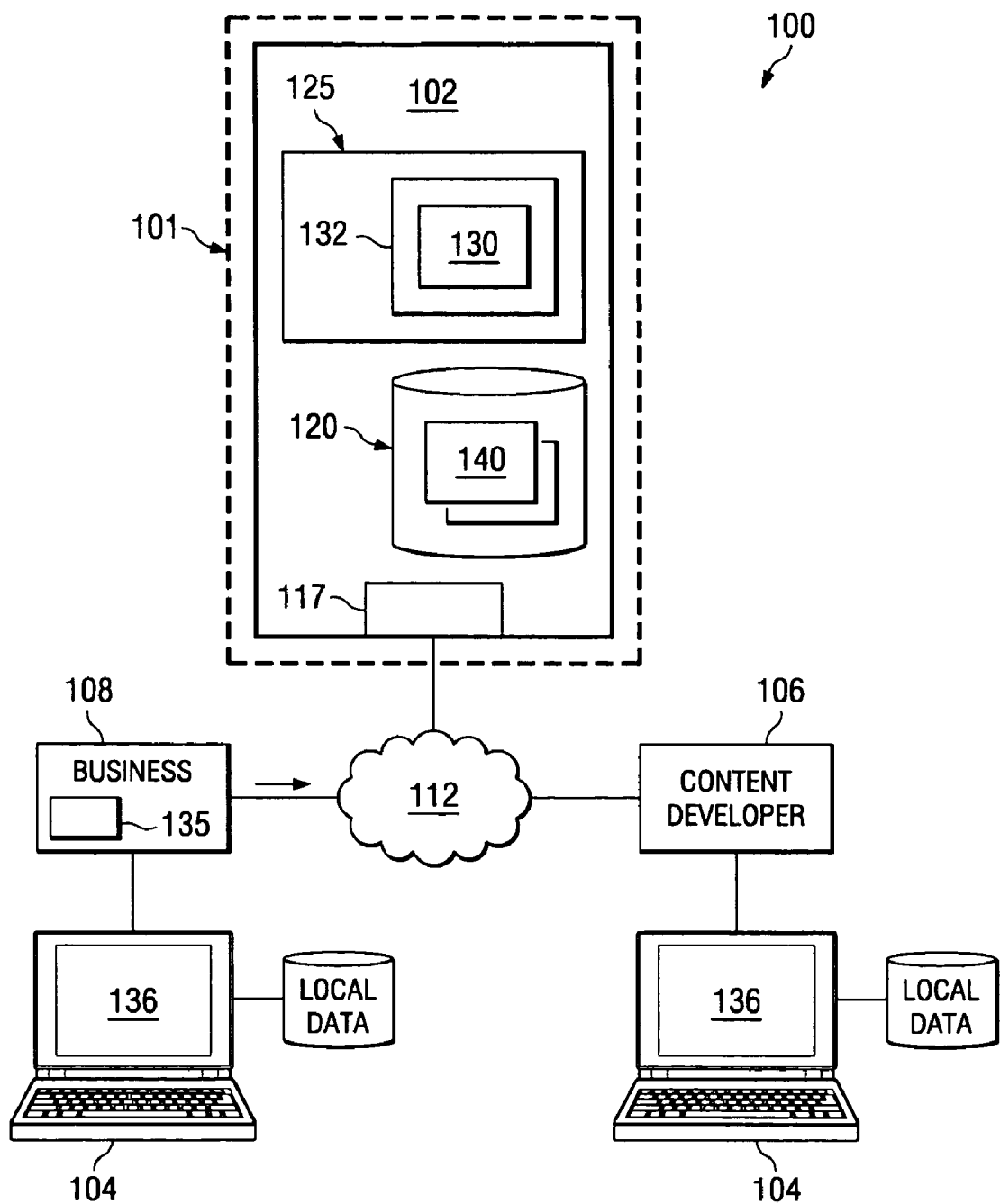
FIG. 1 illustrates an example system for developing a business application in accordance with one implementation of the present disclosure.

FIG. 1 illustrates an example system 100 for presenting, providing, or otherwise managing enterprise application content and other data services 140 via a content provider 101. For example, content provider 101 may be considered a storefront, hub, or retailer of business content and solutions, generally considered analytics implemented by business process components. The storefront is an aggregated place for businesses 108 and users to evaluate and consume a number of different reusable analytics, components, or data services 140 for development or modification of an analytical application or a dashboard by a non-technical user, whether a business analyst or end user, in an intuitive fashion. This storefront can typically be accessed in a stand-alone fashion (such as a website), within any suitable productivity tool (whether enterprise software, email application, and others) selected by the user or automatically interfaced, or in a cooperative fashion with a third party search engine. In other words, content provider 101 may manage and share a knowledge base of software assets or other data services 140 (often using metadata) that can easily be integrated into different business analyst and end user tools. The value of this knowledge base normally grows with the usage of its customers and partners resulting in the continuous growth of the respective ecosystem.

Generally, the content provider 101 uses a component manager 130, or other similar information hub of enterprise knowledge and components, to present a plurality of data services 140 to businesses 108, or their individual users, as well as other companies and users in the network. The component manager 130 may form a portion of a development or modeling environment 132, discussed in more detail with reference to FIG. 2A. The component manager 130 may also be implemented by a stand-alone enterprise to help it leverage the existing development base of business processes and components 140 and demonstrate how changing them would impact its application landscape. In this situation, the interface or associated components 140 may be shared by or individualized/tailored for particular departments. In fact, the storefront may be a source for both internal and external content, with the same or different interfaces and utilities.

These data services may be gathered from a plurality of component developers 106 for easy review at component manager 130, which may be located or managed by content provider 101. For example, the content provider 101 may be one of the manufacturers of these data services 140, as well as the retailer of business content/solutions. This component manager 130 may, among other things, hide the complexity associated with finding and understanding reusable components, provide the storefront experience that enables the particular user to find and learn about the items they desire, or create a community around each item that contributes to the information and knowledge shared.

For example, in certain situations, the content provider 101 may provide or utilize a bank of easily searched xApps and xApp components (services/queries with prebuilt UIs) that can be recomposed/adapted to customer, such as illustrated business 108, needs. This bank of UIs may be associated (in at least one of 1-m, m-m, and m-1 relations) with modeled services. The solution can enable the creation, adaptation, configuration, or other development of an analytical application 135 or a dashboard by a non-technical user or a semi-technical business analyst in a very intuitive fashion. In other words, the user can be exposed to the layout of the application and not to the actual model or code behind it, thereby more easily allowing him to create, adapt, configure, or otherwise develop the particular application 135 without being exposed to the code or model. The data services are exposed in a catalog-like fashion and can be easily searched and consumed by the user and integrated into the application. The data services are attached as a default UI (or many UIs) and presented in a way that a user can consume a data service together with a UI seamlessly as one component according to his preferences. This allows the UIs to become the "drivers," selected to best fit the services during layout stage, which together with (for example) xApps hub queries, allow Business Analysts ("BAs") to complete the modeling scenarios so as to include attractive UI data services. This may allow non-technical or semi-technical users (like Business Analysts) to create, modify, and configure analytics (and other applications as well) using a WYSIWYG approach. Business Analysts are provided with very intuitive wizards, configuration tools, and layout editing capabilities without the need to see actual code or even the modeled application, so as to contribute to the enablement of the idea.

For example, the non-technical user or business analyst may more easily develop composite applications 135 (or xApps) to enable continuous business innovation and may provide the flexibility to respond quickly and profitably to business change without disrupting existing IT investments. These composite applications can often span multiple solutions, departments, and organizations, while leveraging existing IT systems and ease future integration. They may also allow quick reconfiguration to accommodate new business structures, processes, and customer and partner requirements. In certain cases, the composite applications can deliver new collaborative capabilities across the enterprise in a role-based portal environment.

One example composite application framework provides a robust environment for the design and use of xApps and composite applications that comply with Enterprise Services Architecture (ESA), commonly referred to Services-Oriented Architecture (SOA). In certain implementations, SOA can be considered a blueprint for an adaptable, flexible, and open IT architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises design tools, methodologies, services and processes, an abstraction layer for objects, and user interface and process pattern libraries. The composite application framework supports model-driven application composition, so a user may build applications with as little programming as possible. That means reduced development and deployment time for new applications and business-pattern-oriented integration.

The object access layer generally decouples repositories of underlying systems from business objects and processes. Thus, xApps can "snap on" to any existing system landscape. The object access layer is a central interface that can control communication with participating systems via web services. Therefore the xApp may be operable with a service that is provided by another component or an external service provider. Accordingly, tools, such as a business object modeler, allow a developer to create back-end-independent object models for xApps. The business data of a specific business object may be retrieved from several independent sources.

A collaboration framework may allow the user to relate any service or object with any business object. Collaboration objects such as task, document, and meeting are accessible within the object access layer. So all composite applications based on composite application framework can have built-in collaboration functionality.

User interface patterns and guided procedures can help accelerate application design and collaborative process execution through reusability and automatic configuration. Guided procedures or wizards may be configured to implement best practices patterns, with an easy-to-use, design-time user interface, and run-time process visualization. The business objects and services of composite application framework are the foundation for the design of guided procedures. Predefined workflow patterns support the process definition of guided procedures. Users can make ad hoc modifications to the business process.

In another example, an xApp analytics composite application may enable users to gain credible, clear, and comprehensive business insights. This example application may normally leverage the business content and infrastructure to unify and integrate disparate data and processes from provider 101, third-party, and custom corporate applications, legacy systems, and externally syndicated information sources. The xApp analytics provides information workers with the comprehensive views they need to take actions guided by strategy that are appropriate, timely, and in concert with their colleagues and the rest of their value network. xApp analytics may deliver insights across the extended value network, spanning multiple business functions, departments, and even organizations. Plus, the analytic functions are often designed for information workers so they may be easy to use, modify, and extend. Users may then quickly deploy a ready-to-use analytics application that encapsulates best business practices.

In some cases, the component manager 130 is a hosted solution on a remote server 102 providing an easy-to-use interface for disparate data services 140 to at least one business 108 or user, potentially without requiring specific technical or data-specific knowledge. System 100 is typically a distributed client/server system that spans one or more networks such as 112. In such cases, the various components—such as servers 102 and clients 104—may communicate via a virtual private network ("VPN"), Secure Shell ("SSH") tunnel, or other secure network connection. Accordingly, rather than being delivered as packaged software, system 100 may represent a hosted solution, either by or for content provider 101, that may scale cost-effectively and help drive faster adoption. In this case, portions of the hosted solution may be developed by a first entity, while other components are developed by a second entity. In such embodiments, data may be communicated or stored in an encrypted format using any standard or proprietary encryption algorithm. This encrypted communication may be between the user (or application/client) and the host or amongst various components of the host. Put simply, communication or other transmission between any modules and/or components may include any encryption, export, translation or data massage, compression, and so forth as appropriate. Further, system 100 may store some data at a relatively central location (over a WAN) while concurrently maintaining local data at the user's site for redundancy and to allow processing during downtime. But system 100 may be in a dedicated enterprise environment—across a local area network (over LAN) or subnet—or any other suitable environment without departing from the scope of this disclosure.

Turning to the illustrated embodiment, system 100 includes or is communicably coupled (such as via a one-, bi- or multi-directional link or network) with server 102, one or more clients 104, one or more content developers (or vendors) 106, one or more businesses 108, at least some of which communicate across network 112. Server 102 comprises an electronic computing device operable to receive, transmit, process, and store data associated with system 100. Generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer ("PC"), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

Illustrated server 102 includes local memory 120. Memory 120 may include any memory or database module and may take the form of volatile or non-volatile memory including, without limitation, magnetic media, optical media, random access memory ("RAM"), read-only memory ("ROM"), removable media, or any other suitable local or remote memory component. Illustrated memory 120 includes data services 140 but may also include any other appropriate data such as VPN applications or services, firewall policies, a security or access log, print or other reporting files, HTML files or templates, data classes or object interfaces, child software applications or sub-systems, and others.

Data services 140 include software at any appropriate level of granularity that may be reusable by users, perhaps across businesses, user types, and platforms. These services 140 may be assets that are developed by multiple developers (such as content provider 101 and content developer 106). More specifically, such data services 140 may include (among other things) composite applications, analytics, reusable components, objects, collaborative software and pages, request for comments ("RFC") documents, relationships, processes, views, models, dashboards, and other business content (whether primary, secondary, or other), solutions, or identifiable portion thereof. For example, the xApps portfolio may combine web services and data from multiple systems, in an application design made possible by a composite application framework. This framework typically includes the methodology, tools, and run-time environment to develop composite applications. It may provide a consistent object model and a rich user experience, while giving non-technical analysts a productive way to create composite applications on top of a set of heterogeneous applications. Regardless of the particular type, category, or classification of the component, system 100 often stores metadata and other identifying information along with the actual piece of software (whether object or source). For example, the service may further include each component's definition, lifecycle history, dependents, dependencies, versions, use or "big name" cases, industry types or associations, role types, security profile, and usage information.

Data services 140 (and their accompanying information) may be stored in one or more logical or physical repositories. In some embodiments, data services 140 (or pointers thereto) may be stored in one or more tables in a relational database described in terms of SQL statements or scripts. In the same or other embodiments, data services 140 may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. For example, a particular data service record may merely be a pointer to a particular piece of third party software stored remotely. In another example, a particular data service may be an internally stored software object usable by authenticated customers or internal development. In short, data services 140 may comprise one table or file or a plurality of tables or files stored on one computer or across a plurality of computers in any appropriate format. Indeed, some or all of data services 140 may be local or remote without departing from the scope of this disclosure and store any type of appropriate data.

Server 102 also includes processor 125. Processor 125 executes instructions and manipulates data to perform the operations of server 102 such as, for example, a central processing unit ("CPU"), a blade, an application specific integrated circuit ("ASIC"), or a field-programmable gate array ("FPGA"). Although FIG. 1 illustrates a single processor 125 in server 102, multiple processors 125 may be used according to particular needs and reference to processor 125 is meant to include multiple processors 125 where applicable. In the illustrated embodiment, processor 125 executes at least component manager 130.

At a high level, the component manager 130 is software operable to provide an interface to a plurality of solutions and some or all of the underlying reusable components 140 that can be used for these solutions. More specifically, component manager 130 is any application, program, module, process, or other software that helps manage at least a portion of data services 140 and is operable to present certain components 140 though interface 136 for viewing and potential use or purchase by others. In one embodiment, component manager 130 may represent the back-end processing exposing visual information or representations such that product groups, partners, community members, or other authorized users can easily upload, search for, evaluate, download, rate/rank, receive certification, and view documentation, of such services, lightweight or other composites, analytics dashboards, applications, and any other components or solutions. More specifically, component manager 130 is often operable to enable the creation and display of new relationships between services, make the particular services the center of its universe (such as a business object), and enable new information/knowledge/guidance to be added. In certain embodiments, component manager 130 may implement further functionality including being operable to: i) support versions, feedback, updates; ii) notify client-side applications such that they become aware of updates that are available; iii) present a "try before you buy" option; iv) control/charge for access and downloads; v) manage or present a cumulative mega-catalog of available components plus the ability to have site- or customer-specific sub-catalogs; vi) provide a back-end to any of these catalogs for publishers, managers, or reviewers; vii) optimize consumption process via analysis of information collected; viii) certify users that can rate and submit content/feedback; and ix) manage permissions for users and allow users to determine what access rights they have. Of course, some or all of this further functionality may not be present or enabled in certain implementations of component manager 130. In certain cases, component manager 130 may be further operable to perform other types of processing or include links to such other functionality. For example, component manager 130 may implement, include, or be communicably coupled with a business application. In another example, component manager 130 can be an application layer that sits on top of a development environment. In yet another example, component manager 130 can reside on top of any suitable repository. In a further example, component manager 130 can have an integration point into any suitable tool or be hosted within a software development or other network.

Regardless of the particular implementation, "software" may include software, firmware, wired or programmed hardware, or any combination thereof as appropriate. Indeed, component manager 130 may be written or described in any appropriate computer language including C, C++, Java, Visual Basic, assembler, Perl, any suitable version of 4GL, as well as others. It will be understood that while component manager 130 is described as including a number of sub-modules, component manager 130 may instead be a single multi-tasked module that implements the various features and functionality through various objects, methods, or other processes. Further, while illustrated as internal to server 102, one or more processes associated with component manager 130 may be stored, referenced, or executed remotely. For example, a portion of component manager 130 may be a web service that is remotely called, while another portion of component manager 130 may be an interface object bundled for processing at remote client 104. In another example, the majority of processes or modules may reside—or processing take place—on client 104. Moreover, component manager 130 may be a child or sub-module of another software module or enterprise application (not illustrated) without departing from the scope of this disclosure. At any rate, component manager 130 is generally operable to perform processing automatically, which may indicate that the appropriate processing is substantially performed by at least one component of system 100. It should be understood that the term "automatically" further contemplates any suitable administrator or other user interaction with component manager 130 or other components of system 100 without departing from the scope of this disclosure.

Server 102 may also include interface 117 for communicating with other computer systems, such as clients 104, over network 112 in a client-server or other distributed environment. In certain embodiments, server 102 receives data from internal or external senders through interface 117 for storage in memory 120, for storage in DB, and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. For example, server 102 may be communicably coupled to one or more "local" repositories through one sub-net while communicably coupled to a particular client 104 or "remote" repositories through another. In other words, network 112 encompasses any internal or external network, networks, sub-network, or combination thereof operable to facilitate communications between various computing components in system 100. Network 112 may communicate, for example, Internet Protocol ("IP") packets, Frame Relay frames, Asynchronous Transfer Mode ("ATM") cells, voice, video, data, and other suitable information between network addresses. Network 112 may include one or more local area networks ("LANs"), radio access networks ("RANs"), metropolitan area networks ("MANs"), wide area networks ("WANs"), all or a portion of the global computer network known as the Internet, and/or any other communication system or systems at one or more locations. In certain embodiments, network 112 may be a secure network associated with the enterprise and certain local or remote content developers 106 and businesses 108.

As used in this disclosure, business 108 is any person, department, organization, small business, enterprise, or any other entity that may use or request others to use system 100, namely component manager 130, to download or purchase reusable components 140, at least some of which were created, modified, or otherwise uploaded by developer 106 to content provider 101. As described above, developers 106 also may be local or remote to business 108. Indeed, a particular developer 106 may provide some content to component manager 130, while receiving or purchasing other content (at the same or different times) as business 108. As illustrated, business 108 and developer 106 each typically perform some processing (such as uploading or purchasing content) using a computer, such as client 104.

Client 104 is any computing device operable to connect or communicate with server 102 or network 112 using any communication link. For example, client 104 is intended to encompass a personal computer, touch screen terminal, workstation, network computer, kiosk, wireless data port, smart phone, personal data assistant ("PDA"), one or more processors within these or other devices, or any other suitable processing device used by or for the benefit of business 108, vendor 106, content provider 101, or some other user or entity. At a high level, each client 104 includes or executes at least GUI 136 and comprises an electronic computing device operable to receive, transmit, process and store any appropriate data associated with system 100. It will be understood that there may be any number of clients 104 communicably coupled to server 102. Further, "client 104," "business," "business analyst," "end user," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely the client portion of GUI or application interface 136.

GUI 136 comprises a graphical user interface operable to allow the user of client 104 to interface with at least a portion of system 100 for any suitable purpose, such as viewing application or other transaction data. Generally, GUI 136 provides the particular user with an efficient and user-friendly presentation of data provided by or communicated within system 100. For example, GUI 136 may present the user with the components and information that is relevant to their task, increase reuse of such components, and facilitate a sizable developer community around those components. GUI 136 may comprise a plurality of customizable frames or views having interactive fields, pull-down lists, and buttons operated by the user. For example, GUI 136 is operable to display certain data services 140 in a user-friendly form based on the user context and the displayed data. In another example, GUI 136 is operable to display different levels and types of information involving data services 140 based on the identified or supplied user role. GUI 136 may also present a plurality of portals or dashboards. For example, GUI 136 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by data services 140. It should be understood that the term graphical user interface may be used in the singular or in the plural to describe one or more graphical user interfaces and each of the displays of a particular graphical user interface. Indeed, reference to GUI 136 may indicate a reference to the front-end or a component of component manager 130, as well as the particular interface accessible via client 104, as appropriate, without departing from the scope of this disclosure. Therefore, GUI 136 contemplates any graphical user interface, such as a generic web browser or touchscreen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112.

FIG. 2A depicts an example modeling environment 132, in accordance with one embodiment of the present disclosure. Thus, as illustrated in FIG. 1, modeling environment 132 would be a modeling environment, which includes component manager 130. The modeling environment 132 may be utilized to create, adapt, or configure the data services 140 (available to a user via the component manager 130) for creating a custom application, such as a business application, to fulfill a need of the user. The applications may include applications created by the developers with the modeling environment 132 or applications created or adapted by users, such as business analysts, using the modeling environment 132 or created or adapted and subsequently transmitted to the modeling environment 132.

According to some embodiments, a modeler (or other analyst) may use the model-driven modeling environment 132 to create pattern-based or freestyle user interfaces using simple drag-and-drop services. Because this development may be model-driven, the modeler can typically compose an application using models of business objects without having to write much, if any, code. In some cases, this example modeling environment 132 may provide a personalized, secure interface that helps unify enterprise applications, information, and processes into a coherent, role-based portal experience. Further, the modeling environment 132 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 132 may provide a shared set of services for finding, organizing, and accessing unstructured content stored in third-party repositories and content management systems across various networks 112. Classification tools may automate the organization of information, while subject-matter experts and content managers can publish information to distinct user audiences. Regardless of the particular implementation or architecture, this modeling environment 132 may allow the developer to easily model the data services 140 using this model-driven approach.

In certain embodiments, the modeling environment 132 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 2A, modeling tool 200 may be used by a GUI designer or business analyst during the application design phase to create a model representation 202 for a GUI application. It will be understood that modeling environment 132 may include or be compatible with various different modeling tools 200 used to generate model representation 202. This model representation 202 may be a machine-readable representation of an application or a domain specific model. Model representation 202 generally encapsulates various design parameters related to the GUI such as GUI components, dependencies between the GUI components, inputs and outputs, and the like. Put another way, model representation 402 provides a form in which the one or more models can be persisted and transported, and possibly handled by various tools such as code generators, runtime interpreters, analysis and validation tools, merge tools, and the like. In one embodiment, model representation 402 maybe a collection of XML documents with a well-formed syntax.

Illustrated modeling environment 132 also includes an abstract representation generator (or XGL generator) 204 operable to generate an abstract representation (for example, XGL representation or XGL-compliant representation) 206 based upon model representation 202. Abstract representation generator 204 takes model representation 202 as input and outputs abstract representation 206 for the model representation. Model representation 202 may include multiple instances of various forms or types depending on the tool/language used for the modeling. In certain cases, these various different model representations may each be mapped to one or more abstract representations 206. Different types of model representations may be transformed or mapped to XGL representations. For each type of model representation, mapping rules may be provided for mapping the model representation to the XGL representation 206. Different mapping rules may be provided for mapping a model representation to an XGL representation.

This XGL representation 206 that is created from a model representation may then be used for processing in the runtime environment. For example, the XGL representation 206 may be used to generate a machine-executable runtime GUI (or some other runtime representation) that may be executed by a target device. As part of the runtime processing, the XGL representation 206 may be transformed into one or more runtime representations, which may indicate source code in a particular programming language, machine-executable code for a specific runtime environment, executable GUI, and so forth, which may be generated for specific runtime environments and devices. Since the XGL representation 206, rather than the design-time model representation, is used by the runtime environment, the design-time model representation is decoupled from the runtime environment. The XGL representation 206 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 206 generated for a model representation 202 is generally declarative and executable in that it provides a representation of the GUI of model 202 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 206 is also not GUI runtime-platform specific. The abstract representation 206 provides a self-contained, closed, and deterministic definition of all aspects of a graphical user interface that is device independent and language independent.

Abstract representation 206 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract generator 204 may be configured to generate abstract representation 406 for models of different types, which may be created using different modeling tools 200. It will be understood that modeling environment 132 may include some, none, or other sub-modules or components as those shown in this example illustration. In other words, modeling environment 132 encompasses the design-time environment (with or without the abstract generator or the various representations), a modeling toolkit (such as 200) linked with a developer's space, or any other appropriate software operable to decouple models created during design-time from the runtime environment. Abstract representation 206 provides an interface between the design time environment and the runtime environment. As shown, this abstract representation 206 may then be used by runtime processing.

As part of runtime processing, modeling environment 132 may include various runtime tools 208 and may generate different types of runtime representations based upon the abstract representation 206. Examples of runtime representations include device or language-dependent (or specific) source code, runtime platform-specific machine-readable code, GUIs for a particular target device, and the like. The runtime tools 208 may include compilers, interpreters, source code generators, and other such tools that are configured to generate runtime platform-specific or target device-specific runtime representations of abstract representation 206. The runtime tool 208 may generate the runtime representation from abstract representation 206 using specific rules that map abstract representation 206 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 206 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 2A, an XGL-to-Java compiler 208a may take abstract representation 206 as input and generate Java code 210 for execution by a target device comprising a Java runtime 212. Java runtime 412 may execute Java code 210 to generate or display a GUI 214 on a Java-platform target device. As another example, an XGL-to-Flash compiler 208b may take abstract representation 206 as input and generate Flash code 216 for execution by a target device comprising a Flash runtime 218. Flash runtime 218 may execute Flash code 216 to generate or display a GUI 220 on a target device comprising a Flash platform. As another example, an XGL-to-DHTML (dynamic HTML) interpreter 208c may take abstract representation 206 as input and generate DHTML statements (instructions) on the fly which are then interpreted by a DHTML runtime 222 to generate or display a GUI 224 on a target device comprising a DHTML platform.

It should be apparent that abstract representation 206 may be used to generate GUIs for Extensible Application Markup Language ("XAML") or various other runtime platforms and devices. The same model representation 406 may be mapped to various runtime representations and device-specific and runtime platform-specific GUIs. In general, in the runtime environment, machine executable instructions specific to a runtime environment may be generated based upon the abstract representation 206 and executed to generate a GUI in the runtime environment. The same XGL representation may be used to generate machine executable instructions specific to different runtime environments and target devices.

According to certain embodiments, the process of mapping a model representation 202 to an abstract representation 206 and mapping an abstract representation 206 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 206 rather than model representation 202 for runtime processing, the model representation 202 that is created during design-time is decoupled from the runtime environment. Abstract representation 206 thus provides an interface between the modeling environment and the runtime environment. As a result, changes may be made to the design time environment, including changes to model representation 202 or changes that affect model representation 202, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 2B:
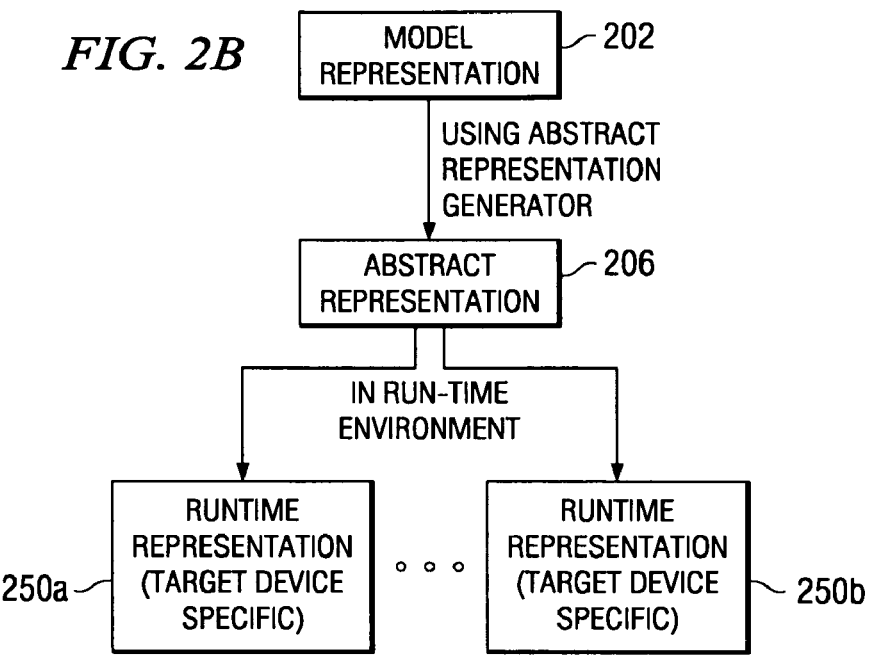
FIG. 2B depicts a simplified process for mapping a model representation to a runtime representation using the example development environment of FIG. 2A or some other development environment.

FIG. 2B depicts an example process for mapping a model representation 202 to a runtime representation using the example modeling environment 132 of FIG. 2A or some other modeling environment. Model representation 202 may comprise one or more model components and associated properties that describe a data object, such as data services 140. As described above, at least one of these model components is based on or otherwise associated with these data services 140. The abstract representation 206 is generated based upon model representation 202. Abstract representation 206 may be generated by the abstract representation generator 204. Abstract representation 206 comprises one or more abstract GUI components and properties associated with the abstract GUI components. As part of generation of abstract representation 206, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 250a and 250b, including GUIs for specific runtime environment platforms, may be generated from abstract representation 206. A device-dependent runtime representation may be generated for a particular type of target device platform to be used for executing and displaying the GUI encapsulated by the abstract representation. The GUIs generated from abstract representation 206 may comprise various types of GUI elements such as buttons, windows, scrollbars, input boxes, etc. Rules may be provided for mapping an abstract representation to a particular runtime representation. Various mapping rules may be provided for different runtime environment platforms.

Figure 3:
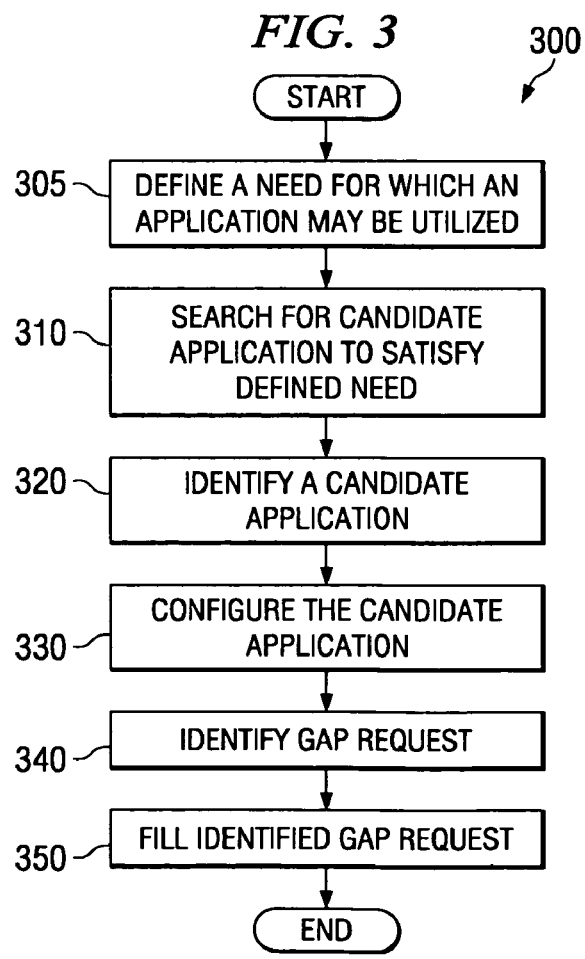
FIG. 3 is a is a flow diagram illustrating an example method for developing the custom application according to an implementation of the present disclosure.

FIG. 3 illustrates an example method 300 of creating a custom business application. At step 305, a user, such as a business analyst, identifies or defines a problem or aspect of a business that may be improved with the implementation of a business application. Such an application may facilitate the analysis of a series of data, present a series of data in a desired manner, perform one or more operations on one or more data series, or any other business operation. Once the user has defined the problem, the user may access the modeling environment 132 via the component manager 130 (or "hub").

At step 310, the user searches the hub including a catalog of analytical xApps. The user may conduct a search of the xApps using, for example, a free text search (i.e., a search using user-selected terms), a taxonomy term search (i.e., search terms included in a defined taxonomy), or a combination of free text and taxonomy terms. A search may return one or more xApps corresponding or otherwise falling within the scope of the search terms used. According to one implementation, the xApps identified by a search are presented to the user via the corresponding UI of the xApp. That is, once a search is executed the user is presented with the UIs corresponding to the xApps returned by the search. As a result, the user is able to select the xApp having a UI most closely resembling the desired UI of the new business application at step 320. According to one implementation, the UI is a screenshot of the visual representation of the xApp, which may be accompanied by a textual description. The search results may be displayed as "thumbnail" views of the UI, a screenshot of the UI in a reduced size, or a full-size view of the xApp's UI. Further, other information relating to the identified xApps may also be presented, such as screenshots of the xApp's analytics, demos, KPIs, business cases (i.e., business scenarios in which the xApp is particularly suited), community reviews and ratings, pricing information, as well as others. These components may have been saved along with a granularity definition that declares its 'size,' such as a full page, a pane, a single square, etc. Accordingly, the search page could present or otherwise expose this granularity scale. According to other implementations, the user may be able to operate a demonstration or prototype of the xApps to understand the functionality and capabilities of each. Thus, the user is able to easily identify an xApp that satisfies or closely corresponds to the needs of the desired business application. Thus, when the user is unable to locate an xApp that identically corresponds to the desired business application, an xApp coming closest to the desired business application may be used as a blueprint or template for the new application.

Once selected, the user may import or transfer a copy of the xApp to a local landscape, such as an analytics workbench, or the user may work with the xApp directly from the component manager 130. The user may then configure or modify the xApp to function in a desired manner. For example, even if the user is able to identify an xApp from the catalog from the hub, the user may add or modify the xApp to perform other functions. Alternately, the user alters or configures the selected application when the xApp does not precisely match the desired functionality of the new application. In certain implementations, the content provider 101 may bill the user for some or all of the selected components. The billing amount may be a "finder's fee," an access fee, a search fee, a component cost, or any other suitable cost determined by the user, the business 108, and/or the component. Sometimes this billing amount may be computed by component manager 130 and then communicated to the billing application, sub-module, or outside data processing service for subsequent processing. Then, using an EFT process, credit card, business account, or other payment or arranged payment method, content provider 101 receives payment (or approved promise of payment) for the invoiced components. Component manager 130 then allows these components to be downloaded by, copied by, or otherwise provided to the requesting user or business 108. Of course, if there is no fee or expected billing for the particular selected component, then it can be immediately provided to the user. In fact, if there are no selected components that are associated with a cost, then component manager 130 may automatically skip the billing and payment steps. If the user desires, he may supply feedback and contribute for the community using any forums or modules that help place views, ask questions, and give advice regarding specific applications, components, or enterprise knowledge. This feedback could include notes, ratings, or other comments on the quality of a reusable component. Typically, any registered or authenticated user can take an active part in the forums or execute the feedback functionality. But this feedback could be automatically or manually analyzed—and subsequently filtered or emphasized—based on quality, word choice, performance evaluation of the feedback provider, interface layout or efficiency, role, and such. In some situations, the end user may be encouraged or even required by the content provider 101 to take an active role in the community in order to increase the value it offers to its other members.

At step 330, the user configures the xApp. As explained above, the xApps can include pre-built UIs that may be configured intuitively, without exposure of the user to the application code or model. In some circumstances, the business process component can present a full prototype of the light analytical application without any existing data service in the back end. In other words, this configuration may include selection and prototyping of the selected business process components by the business analyst. Further, according to one implementation, the user may utilize the analytics workbench to modify or otherwise configure the selected xApp by, for example, dragging and dropping desired features or pre-constructed objects from a toolbar onto the UI of the xApp. The user may also identify pre-selected objects by performing additional searches of the hub. Further, the user may configure the xApp using intuitive wizards that provide a step-by-step approach to configure an object of the xApp to conform to function in a desired manner. Also, objects of the application may include a graphical "to-do" list. Thus, when the to-do list is triggered, such as by selecting an object or dragging and dropping an object onto the UI of the xApp. Thereafter, the to-do list may actively follow the configuration of the object by the user. For example, the to-do list may follow the configuration of the object by identifying completed aspects and those still requiring the attention of the user. Objects may also trigger warning messages indicating that one or more problems related to the particular object exists. Configuration of the xApp may also be performed with the use of other configuration and layout editing tools. Further, use of searches of the hub for pre-constructed content, intuitive wizards, to-do lists, layout and editing tools, drag-and-drop toolbars, as well as other WYSIWYG tools permits the user to configure the xApp without being exposed to the programming code or model of the xApp. Consequently, the user does not need specialized information technology skills to create a custom application.

In some cases, the user may not be able to locate an xApp having all of the functionality needed in the desired application or a selected xApp may require additional modification. In other words, at step 340, the user may encounter "gaps" between the intended or desired functionality of the new or modified application and the existing application, perhaps using prototyping or other modeling techniques. Gaps may fall into several categories, such as data gaps, UI gaps, process or action gaps, and backend gaps. Data gaps may include missing data elements, such as missing charts or chart data; missing data logic, such as sorting logic, rules, or formulas; missing or inappropriate default values; and unnecessary data elements, such as unnecessary charts, data elements in existing charts, or filters. Accordingly, data gaps may be filled by configuring existing data elements such as charts, graphs, formulas, sorting rules, default values or filters; removing or hiding existing data elements, such as chart columns or rows or adding data filters; or adding new data elements, such as charts, graphs, or tables. UI gaps may include missing UI elements, such as missing buttons, scroll bars, combo boxes, or calendars; needed modifications, such as chart type, 2D or 3D visualization, window types, colors, fonts, object locations, sizes, and other visual effects; and removal of UI elements, such as removal of text boxes, input forms, windows, and other UI elements. In some cases, component manager 130 may enable the business analyst to specify an IT gap request in his prototype or model. This example gap request can include what the modeler wants the component to do (free-text) and possibly an indication of what chart type to use. This gap can then be filled by a developer at a later stage. Thus, filling UI gaps may include configuring existing UI elements, hiding or removing extraneous UI elements, or adding additional UI elements. Process or action gaps may include additions of new actions, such as adding new actions, processes, transactions, sub-analytical applications, guided activities, or contextual help; adding or changing process logic, such as triggers or orders; and removing actions, such as actions, processes, transactions, sub-analytical applications, steps or guided activities, or contextual help. Further, backend gaps may include missing business intelligence ("BI") or advanced business application programming ("ABAP"). Filling gaps may include searching other xApps or other business process components using the hub and identifying the desired components for incorporation into the new application. Identified components may then be imported into the new application.

At step 350, these gaps can be filled. Generally, the user may fill the gaps with the use of additional WYSIWYG tools such as those described above and, as such, the gaps may be filled without exposing the user to the application code or model. For example, filling gaps by adding elements, objects, or components may be performed by conducting a search of the hub contents and selecting a component corresponding to the need of the new application. The new component, object, or feature may be dragged and dropped or otherwise imported into the application and configured, such as binding the new component with a separate component, without exposure to the application code or model. According to other implementations, the user may identify and select components of one xApp and incorporate (i.e., merge) those components into a second xApp. Alternately, the entire xApp may be merged into a second xApp.

However, some gaps may require modification outside of the capabilities of the available WYSIWYG tools. For example, process and backend gaps may require skills beyond those of the user. For gaps that prove beyond the capabilities of the user or the available modification tools (e.g., the WYSIWYG tools), the user may include a description of the intended functionality of the new application. For example, the user may illustrate the intended operation of the new or modified application by utilizing a dummy set of input data and a dummy set of output data. According to one implementation, the dummy data may be imported from a spreadsheet data file or comma separated value file. Alternately, the dummy data may be user-created. Thus, the difference between the input and output data sets provides an indication to an information technology professional (e.g., a computer programmer) of the desired functionality. The user may also include notes explaining the required operation of the application and required binding or linking of the component with other components or data sets, for example. Accordingly, the information technology professional may utilize the dummy data sets and notes to configure the component accordingly in an efficient manner. Further, because the information technology professional is utilized only if and when the user is unable to fully modify a component as required, the creation of the application may be quickly developed.

While some gaps may require the aid of an information technology professional, a large number of applications may be directly copied from an existing xApp requiring little or no modification while other applications are adaptable exclusively by the user. Consequently, many new applications may be created exclusively by the user by utilizing the available configuration tools. Still other applications may be created using little input by a skilled information technology professional.

Figure 4:
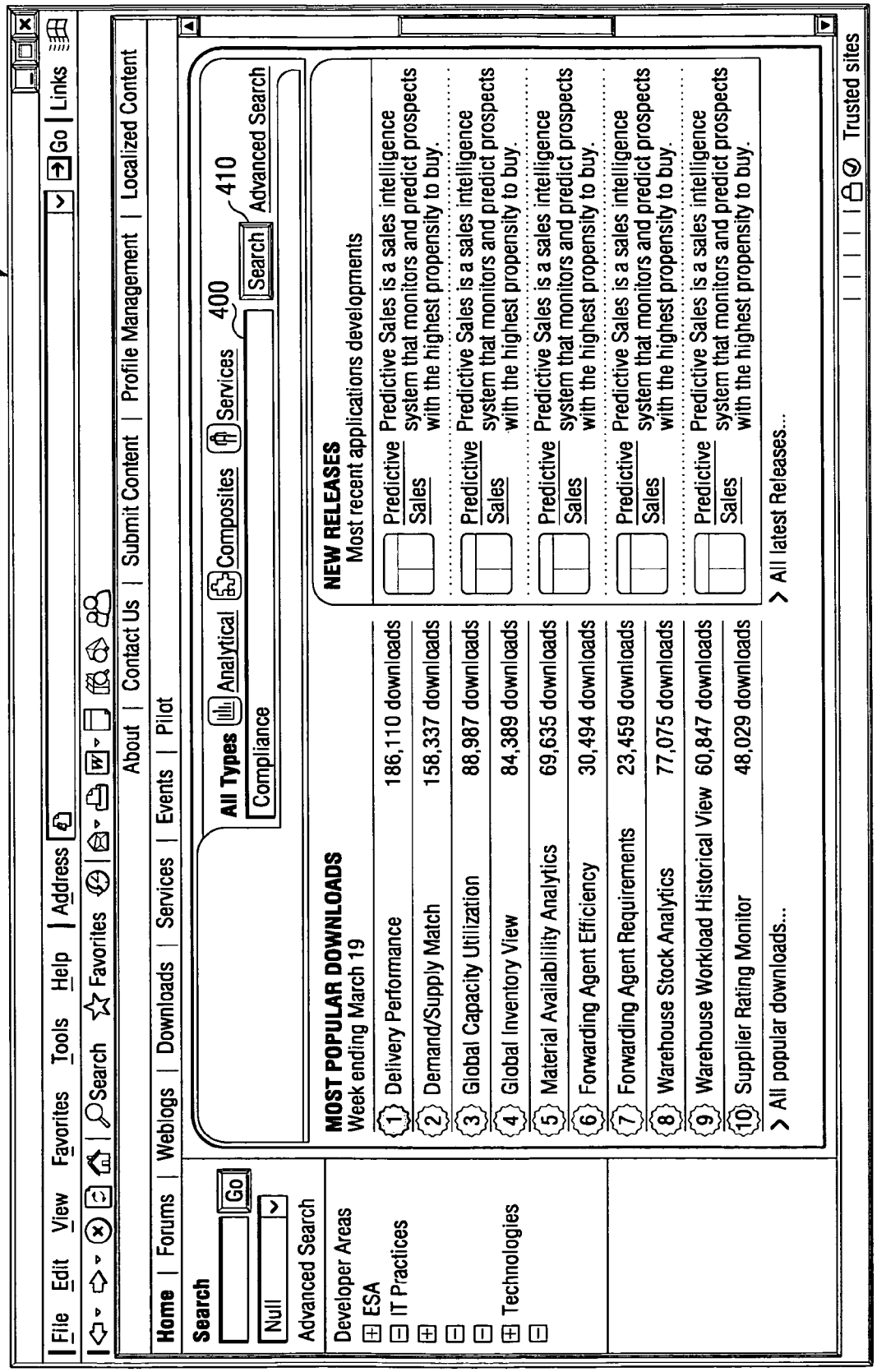
FIGS. 4-57 are various data presentations utilizing a user interface illustrating adaptation of a pre-constructed xApp into the custom application.
Figure 5:
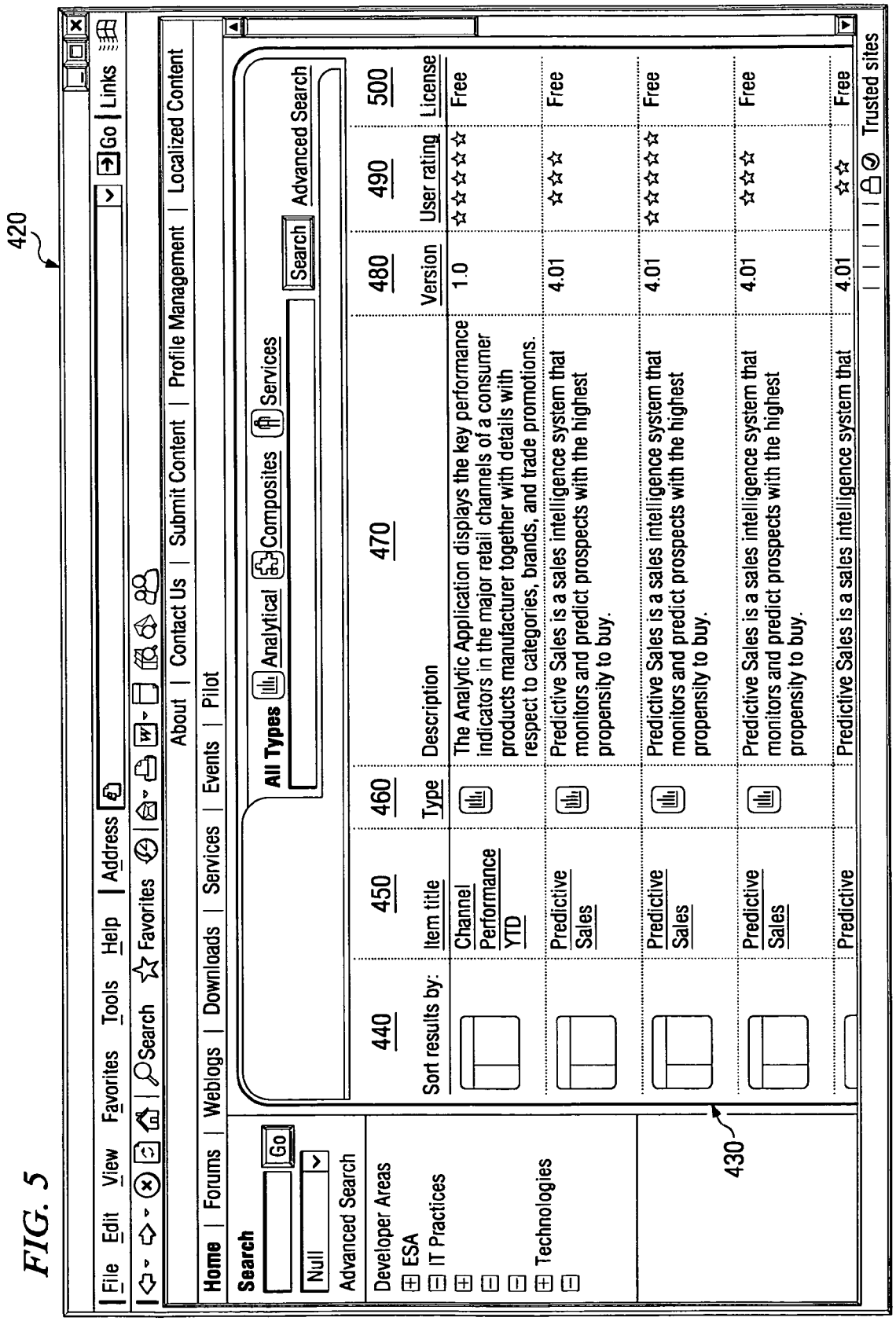
Figure 6:
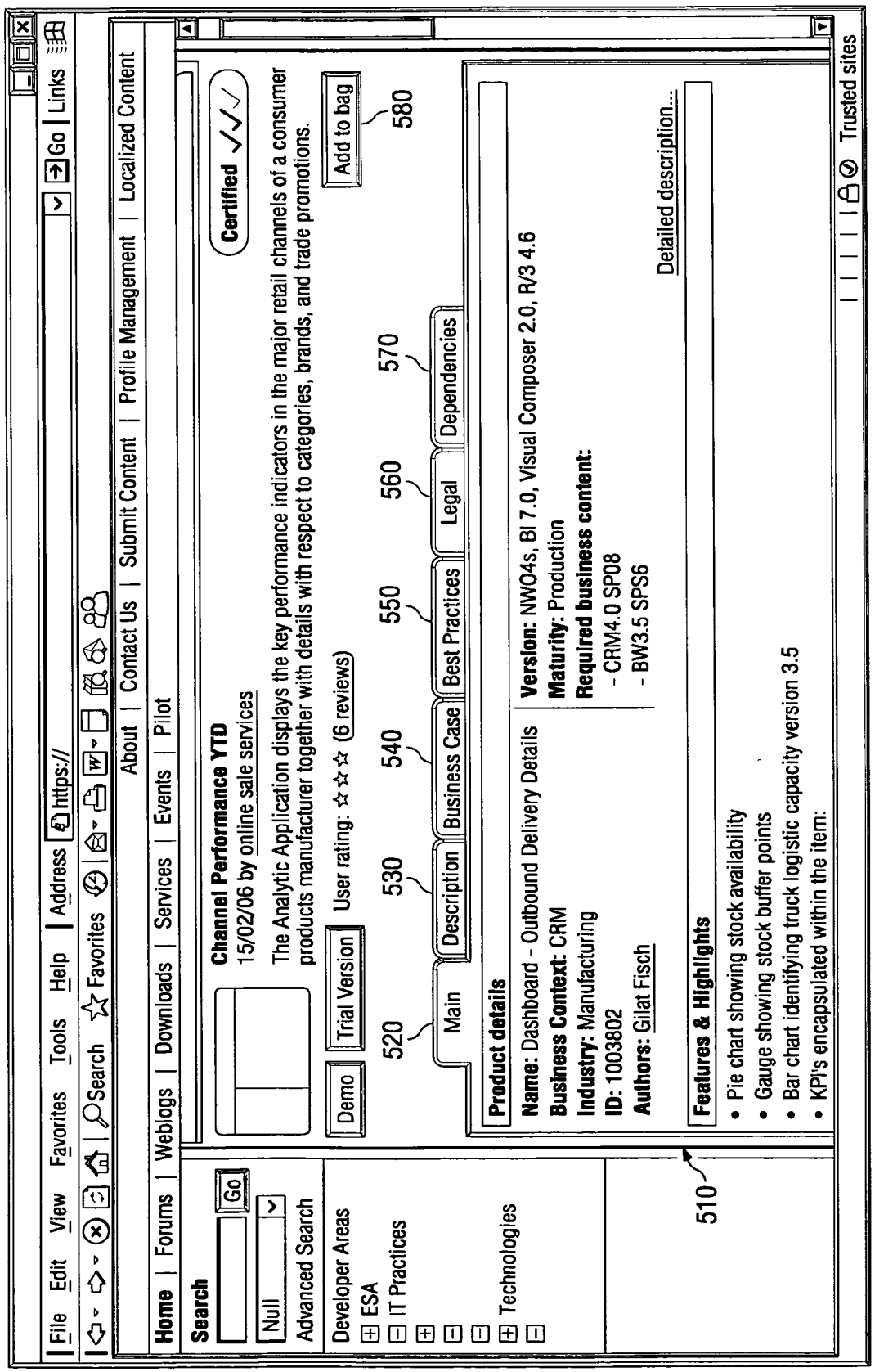
Figure 59:
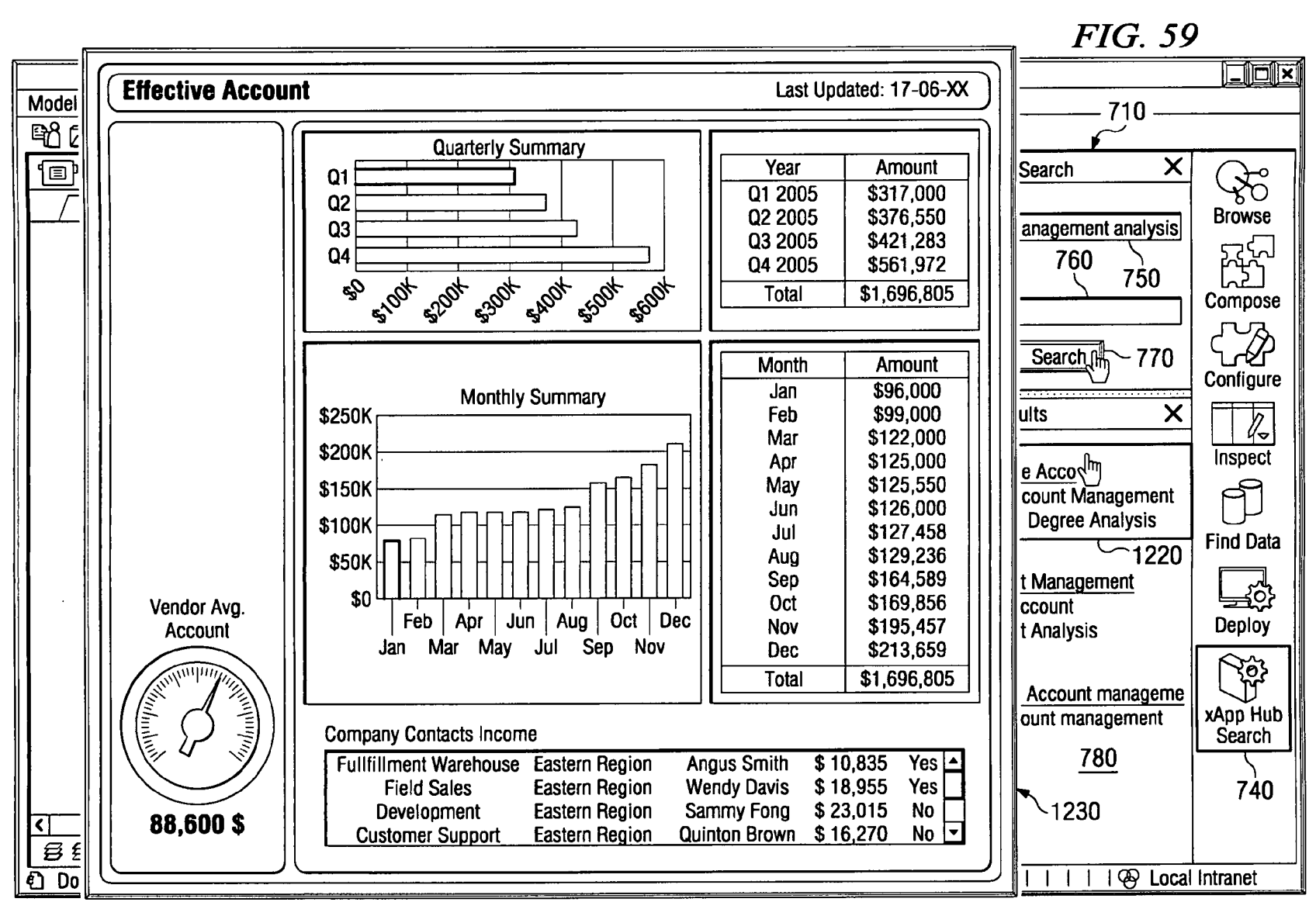

FIGS. 4-59 are example screenshots illustrating selection and adaptation of an xApp according to one implementation. It will be understood that these illustrated front-ends or interfaces are for example purposes only and other presentations with other data organized differently are within the scope of the disclosure. FIG. 4 shows an implementation of GUI 136. GUI 136 includes a search field 400 into which the user may input search terms, such as free terms, taxonomy terms, or a combination thereof, to identify one or more xApps to use as a basis for a new application. Once the search terms have been entered, such as the term "compliance," as shown, the user selects the Search button 410. GUI 420 appears in FIG. 5, listing the xApps satisfying the entered search terms. The GUI 420 displays the identified xApps in a table 430 containing various information about the xApps. For example, as shown, the table includes a column 440 for a graphical representation of the xApp's UI, a column 450 for the xApp's name, a column 460 indicating the xApp's type, a column 470 including a brief description of the xApp, a version column 480, a user rating column 490, and a licensing fee column 500. When the user selects an xApp, component manager 130 presents a GUI screen 510 (FIG. 6) containing more detailed information about the xApp. For example, GUI 510 includes a general information tab 520 containing, for example, general features and highlights of the xApp and system requirements, a tab 530 containing more detailed description, a tab 540 describing a common scenario in which the xApp is used, tab 550 containing a description of the best practices for the xApp, a tab 560 containing legal information relating the xApp (e.g., how the xApp may be used, whether modifications may be made to the xApps programming code, whether the xApp may be exported, etc.), and a tab 570 listing any dependencies, i.e., necessary data, elements, and/or other applications necessary to permit the xApp to function. Button 580 allows the user to add the selected xApp to a personal holding bin, such as a "shopping cart" (referred to in FIG. 6 as "my bag"), prior to purchasing or otherwise obtaining the xApp.

Figure 7:
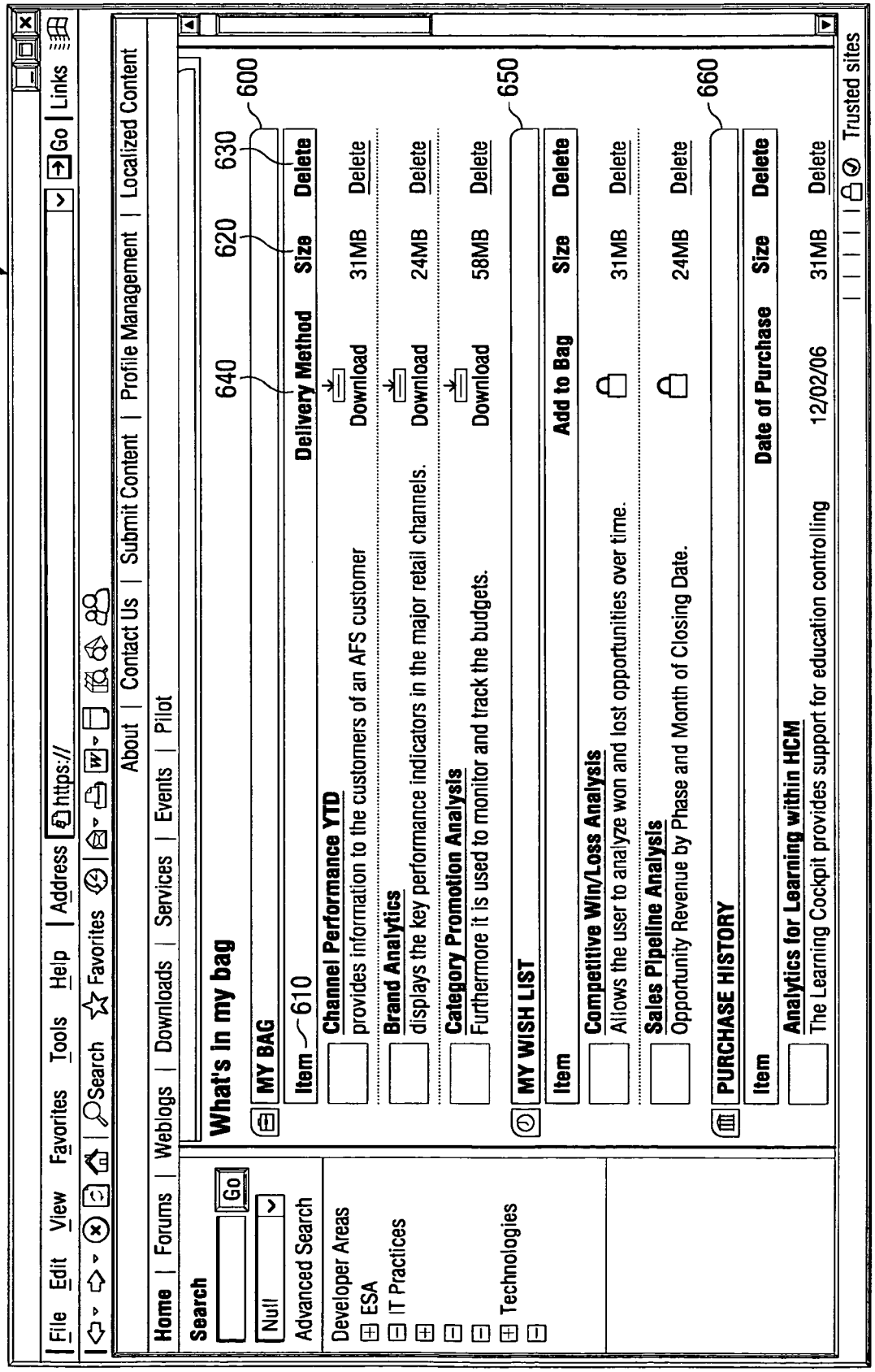
Figure 8:
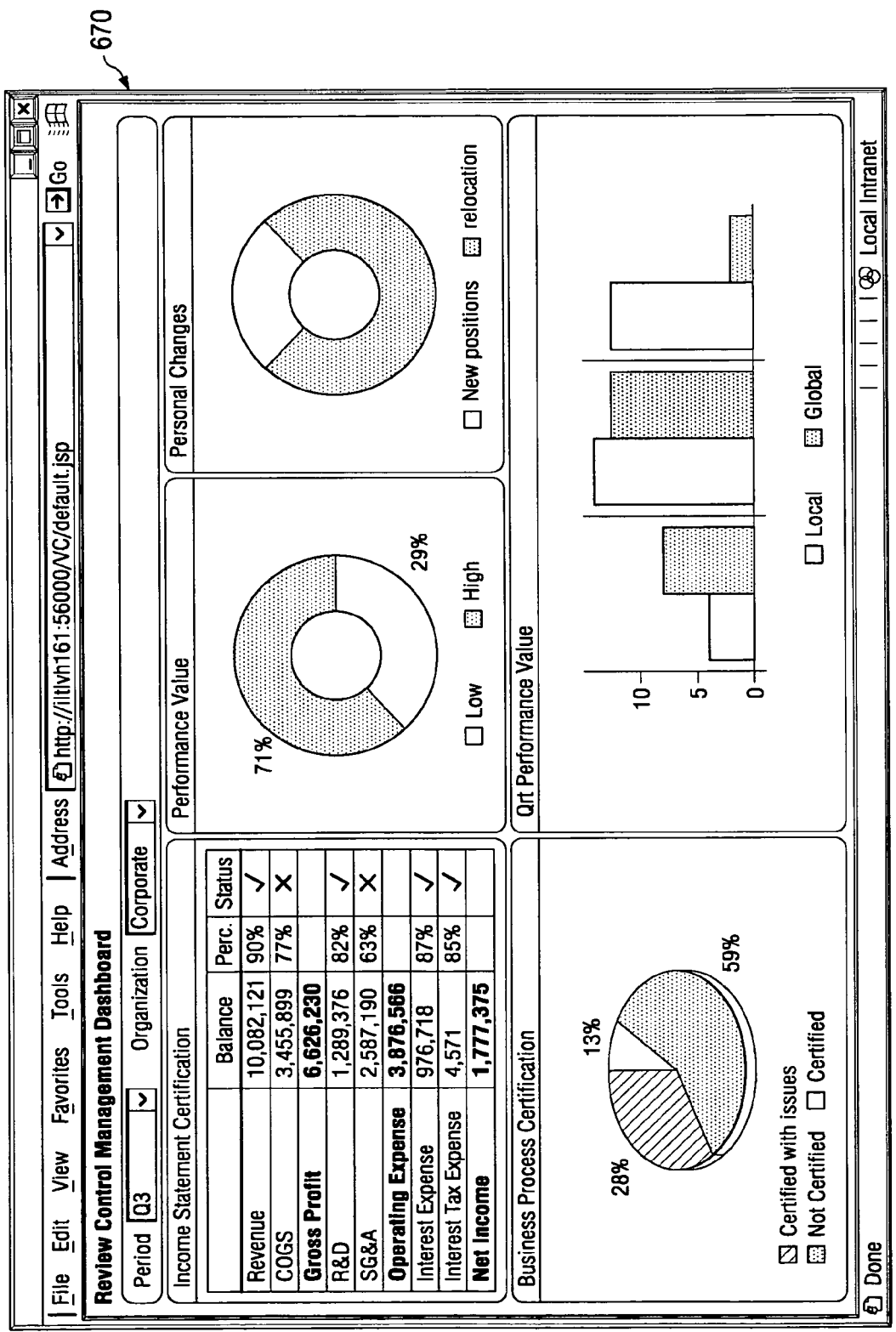

FIG. 7 shows a GUI 590 illustrating the "my bag" holding bin 600. The bin shows the xApps present 610, the size of the each xApp 620, a button 630 to delete an xApp from the bin, and a button 640 to download the xApp, such as to workbench to begin adapting the xApp to then user's needs. The GUI 590 may also include a "wish list" 650 containing one or more xApps that the user may acquire at a future time, and a "purchase history" 660, indicating the xApps previously obtained. FIG. 8 shows a GUI 670 illustrating the UI of a selected xApp that may appear when the download button 640 of GUI 590 is selected.

Figure 9:
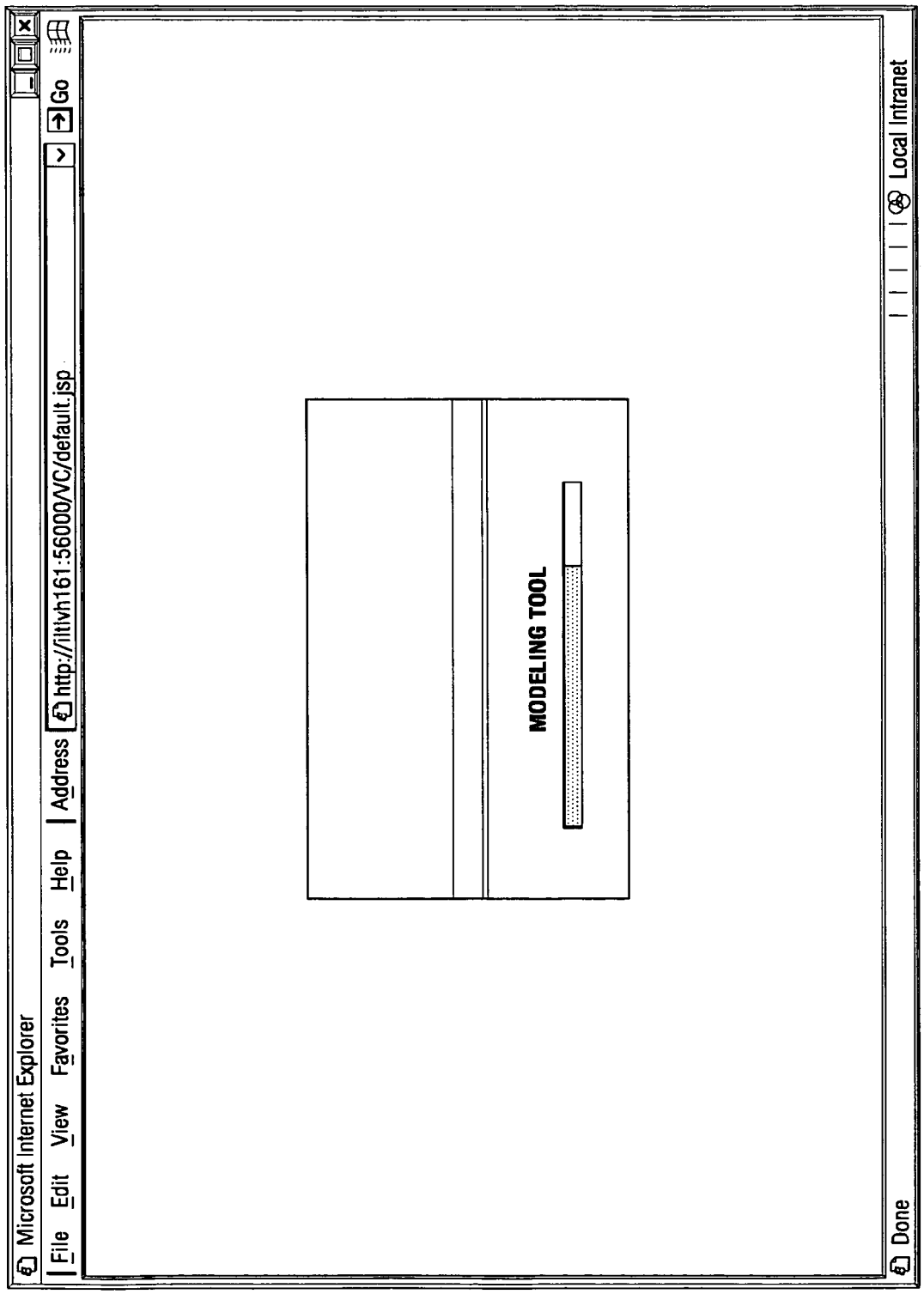
Figure 10:
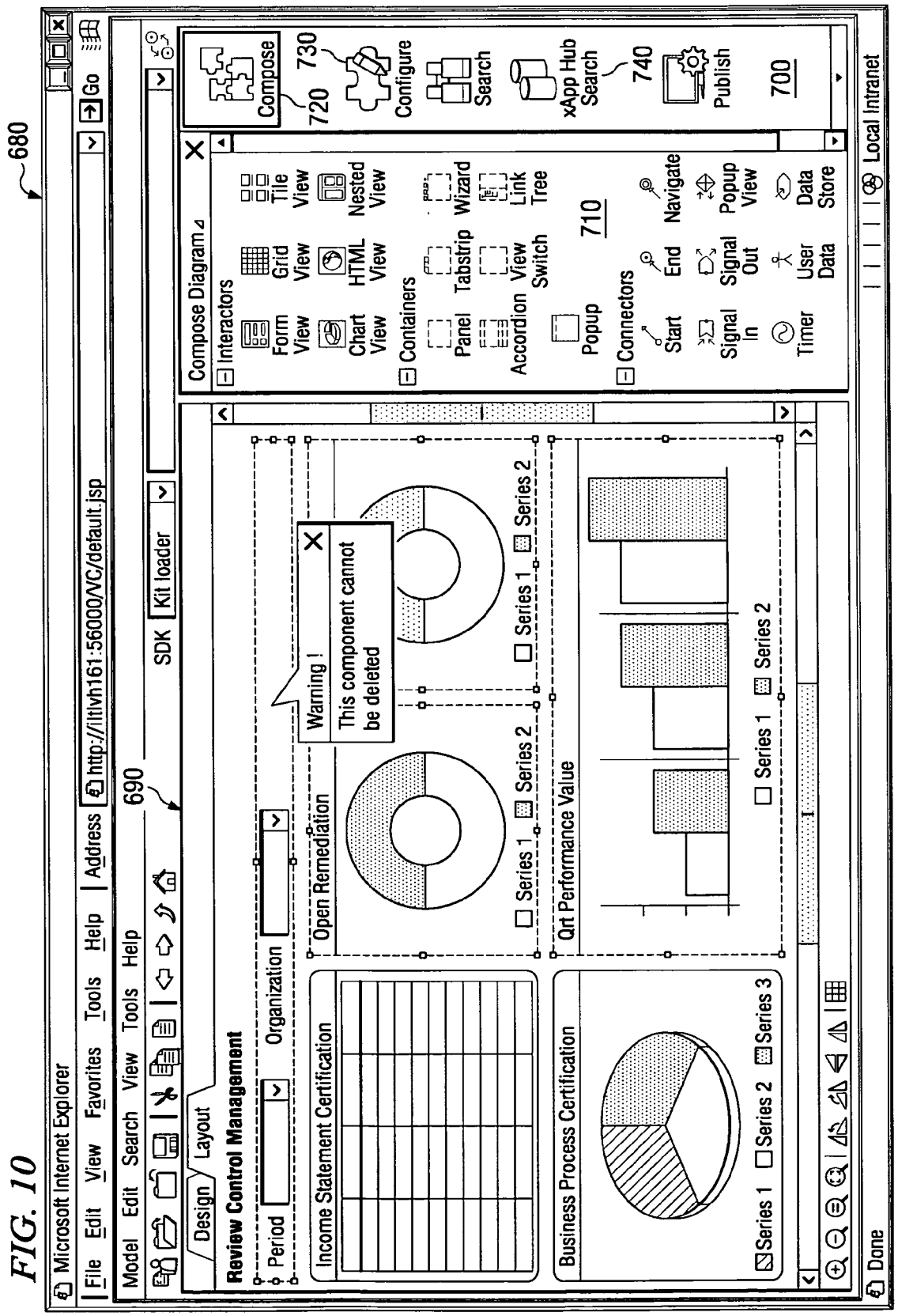

FIG. 9 shows a load screen for a workbench used to adapt the selected xApp to the user's requirements. FIG. 10 shows the workbench 680 used for adapting and configuring the selected xApp. The xApp's UI 690 may be provided on the workbench 680 along with a toolbar 700. The toolbar 700 contains the general functions of the workbench 680, while a second toolbar 710 contains specific functions related to one of the general functions. Thus, as shown, the second toolbar 710 contains the "compose" functions, since the "compose" button 720 has been selected. The "compose" button 720 and associated functions in toolbar 710 allows the user to create the xApp. The "configure" button 730 allows the user to configure an element or object of the xApp. The "xApp Hub Search" button 740 allows the user to search the hub for one or more additional xApps (also referred to as "components" or "objects") for inclusion into the application being configured. As shown, four components are selected for deletion from the xApp's UI, one of which is indicated as not being removable.

Figure 11:
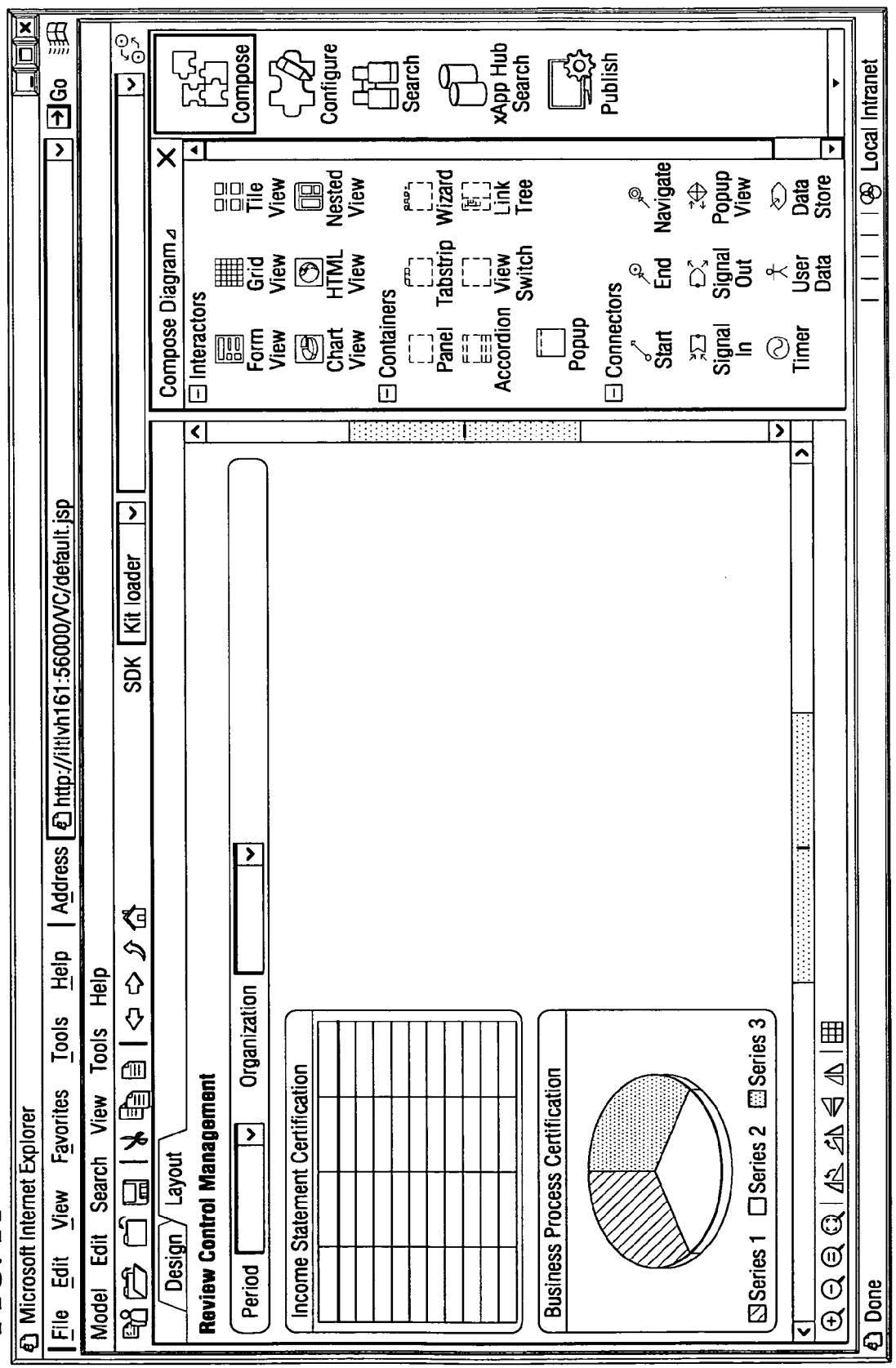
Figure 12:
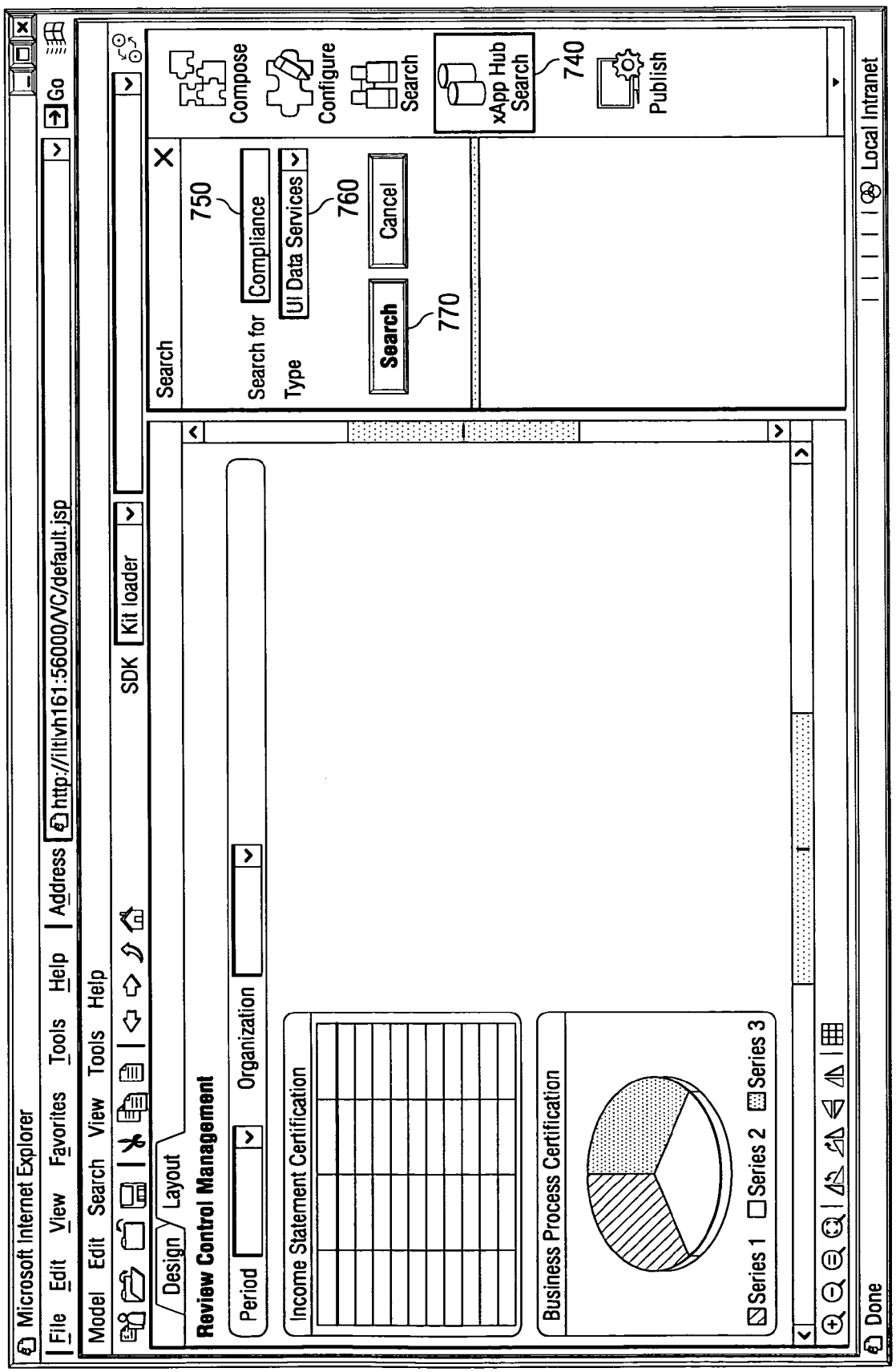
Figure 13:
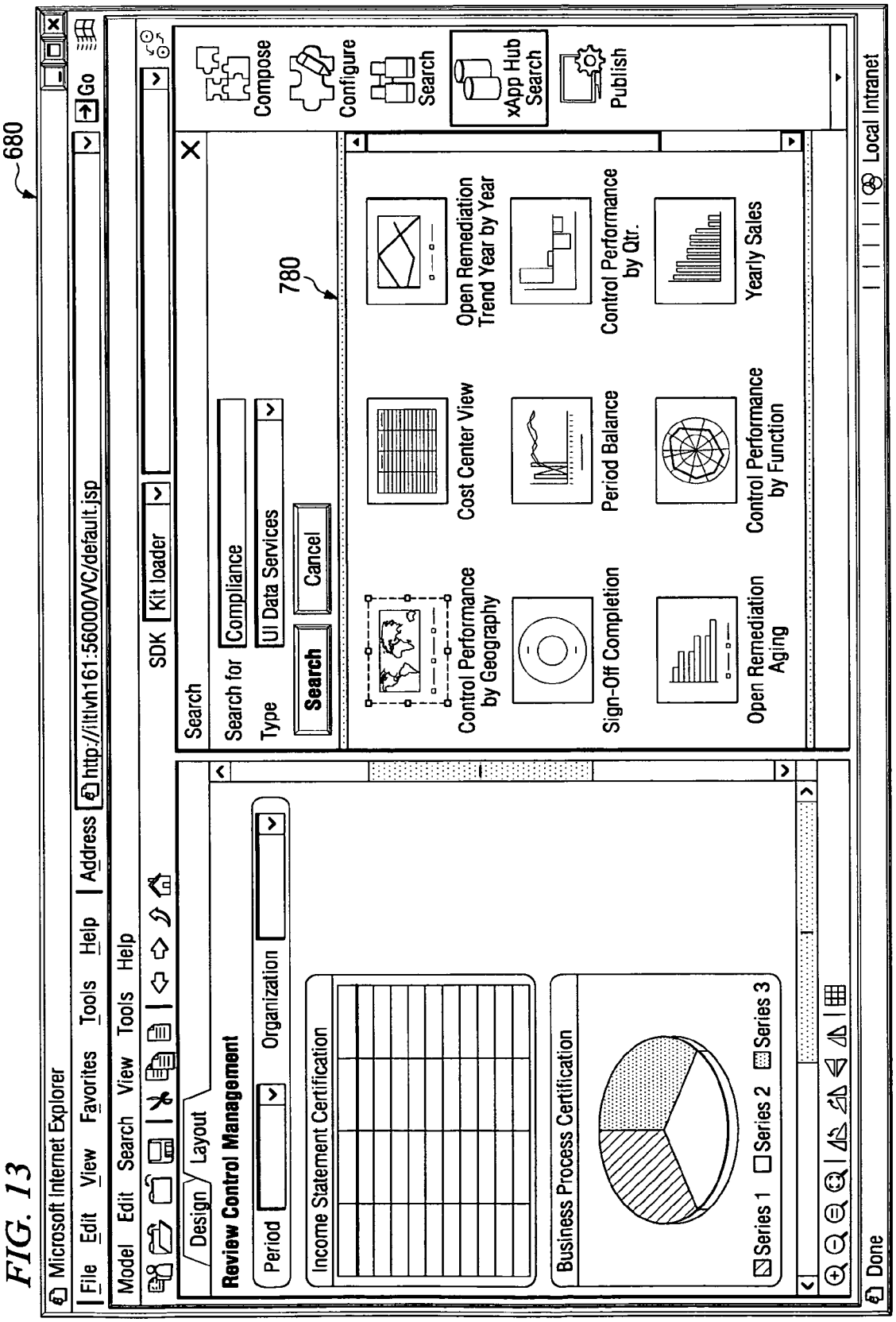
Figure 14:
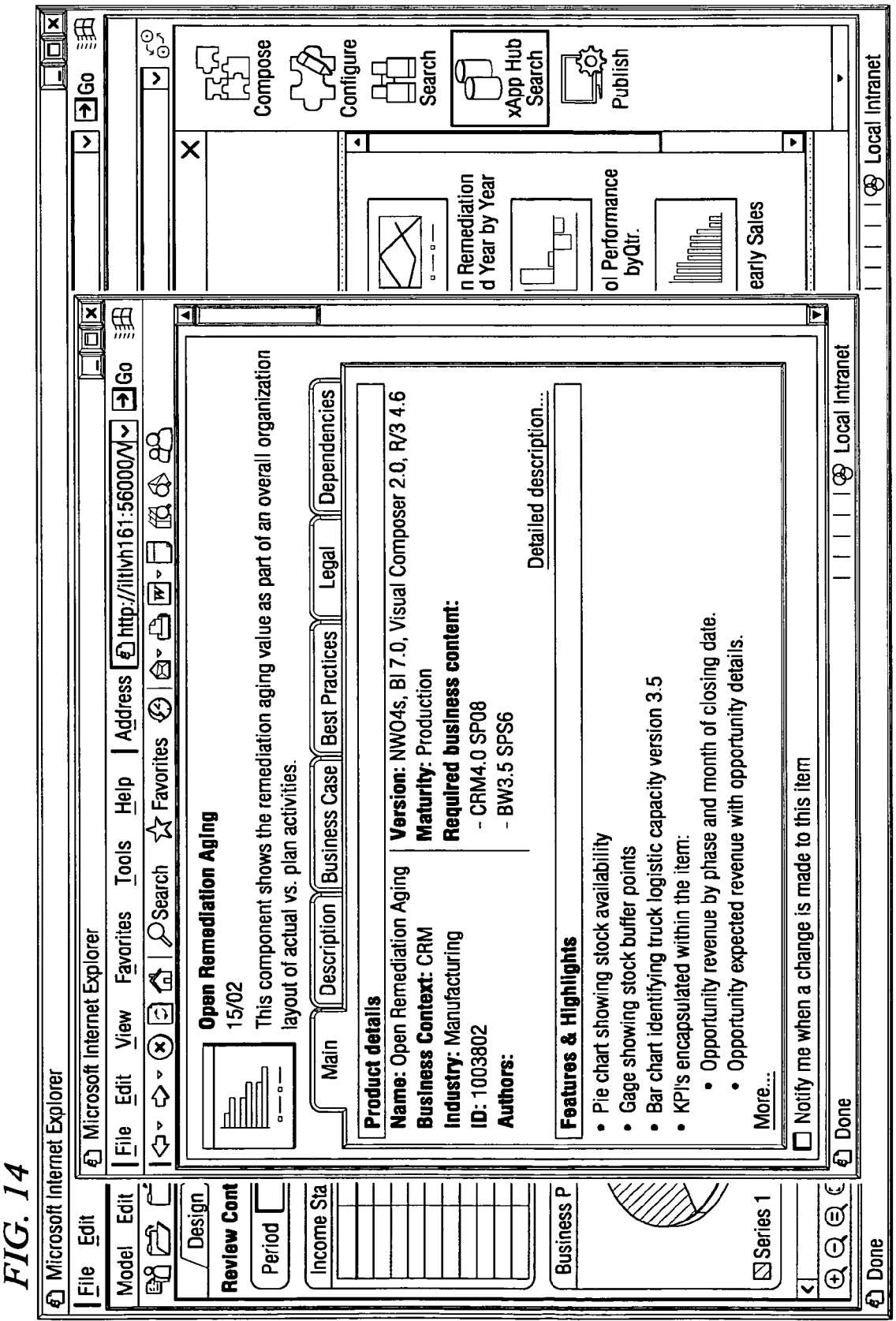
Figure 15:
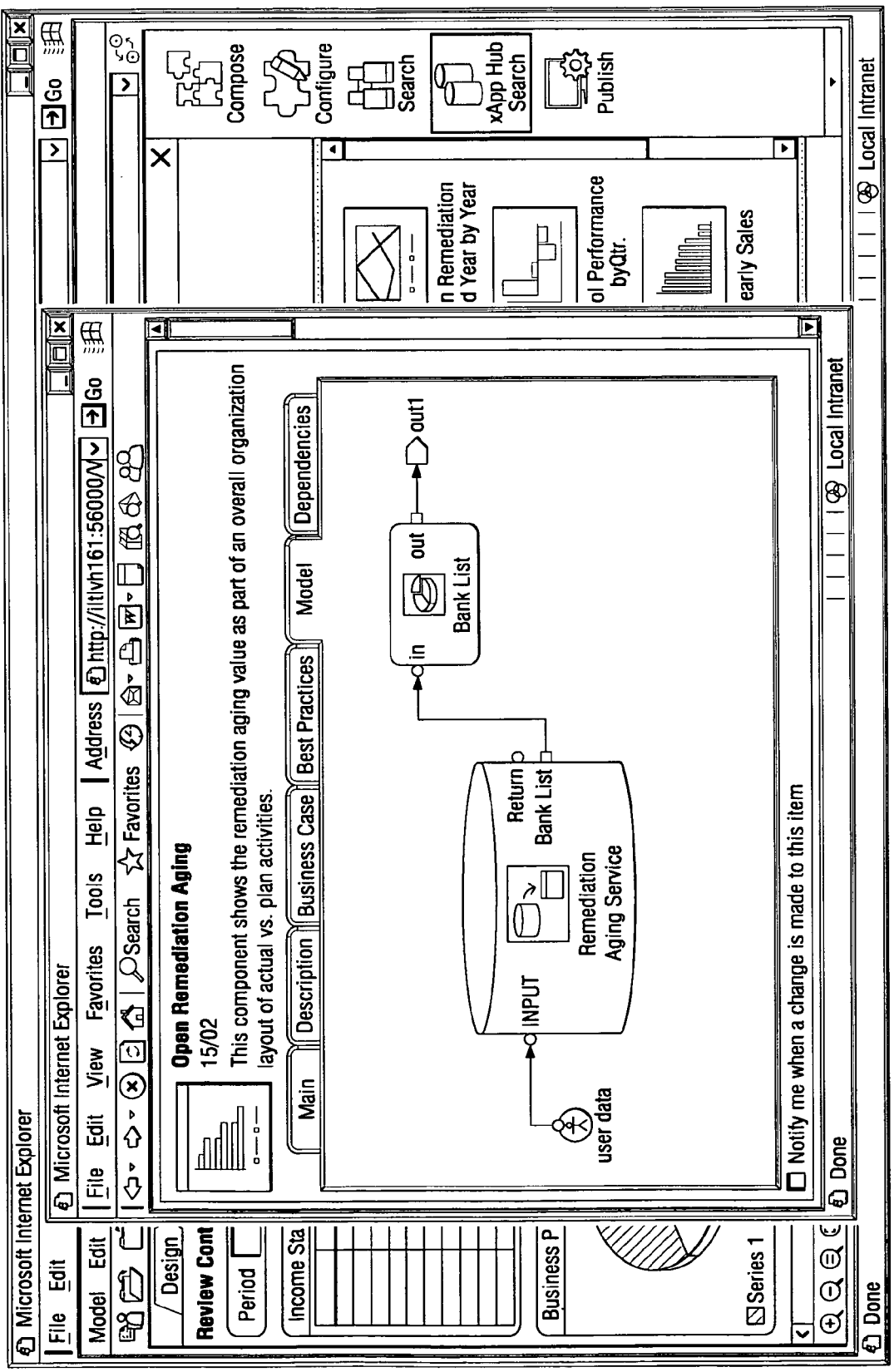
Figure 16:
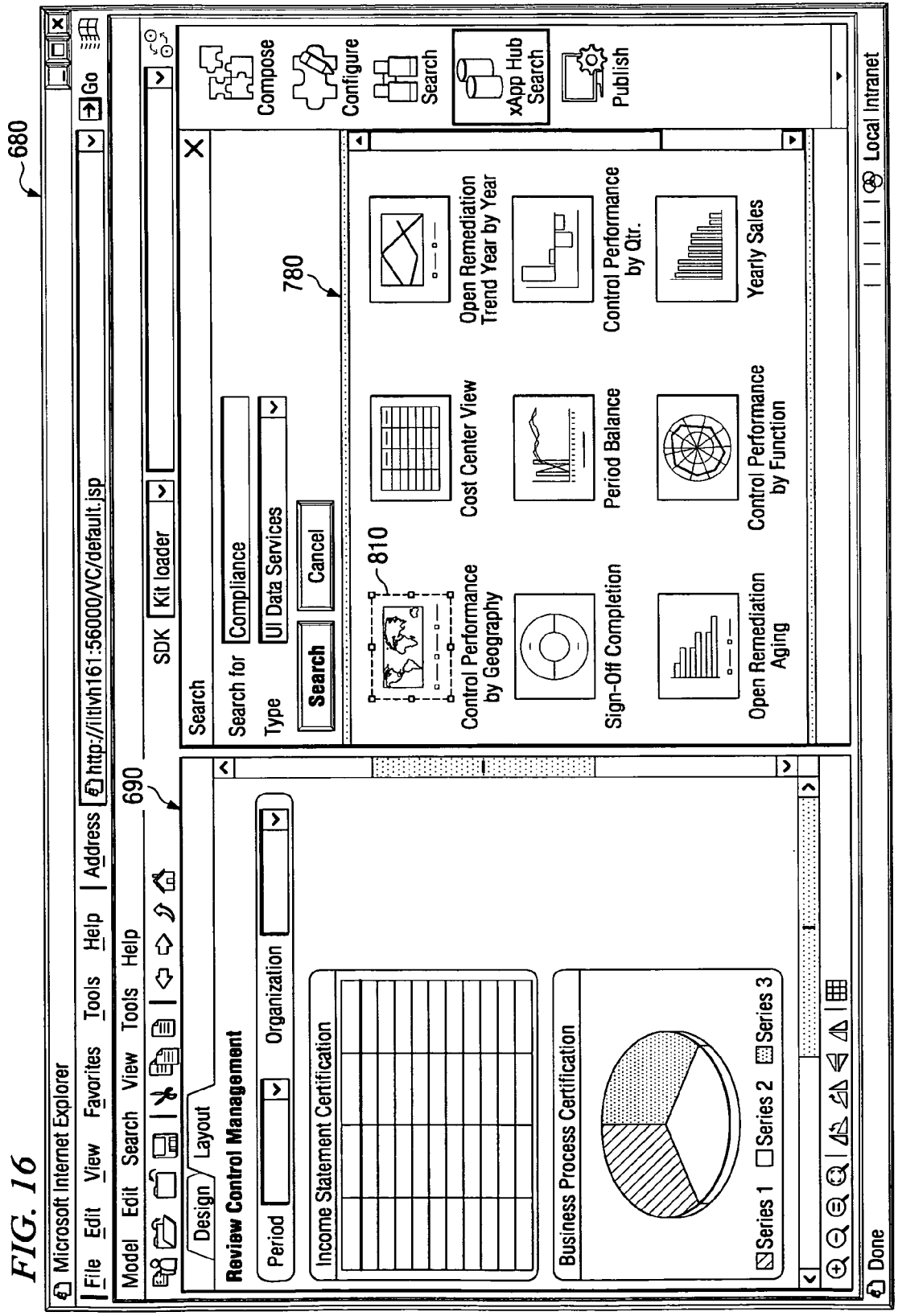
Figure 17:
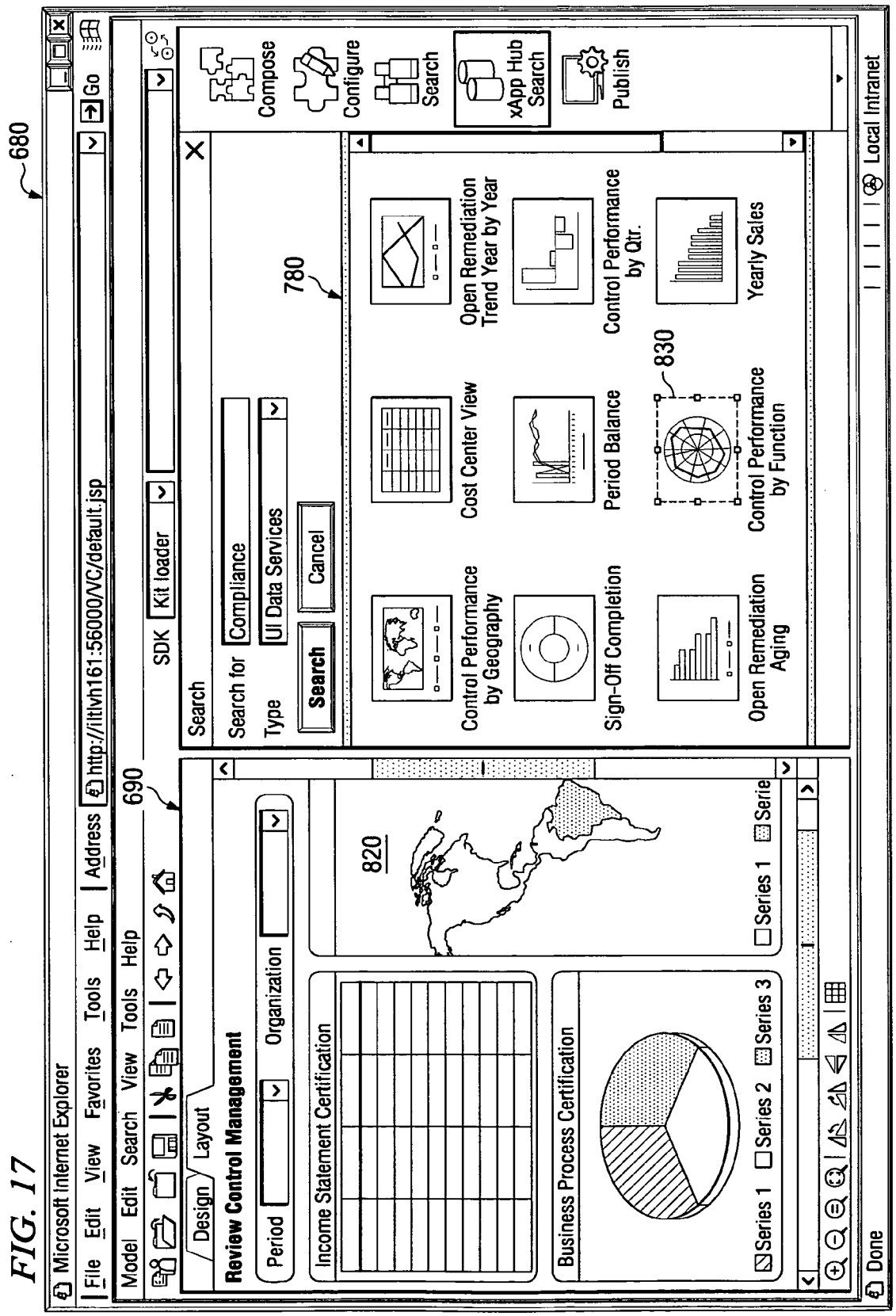
Figure 18:
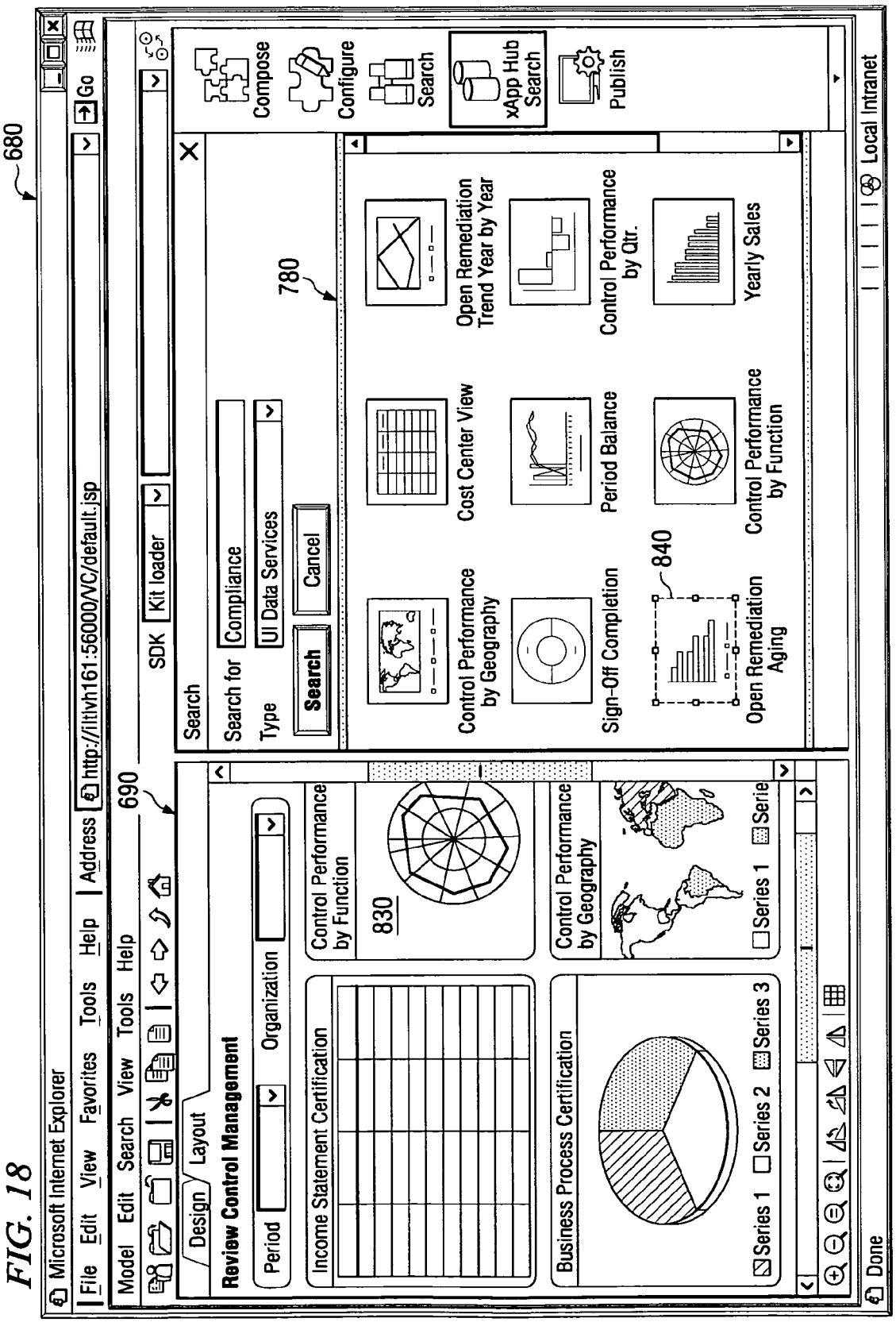
Figure 19:
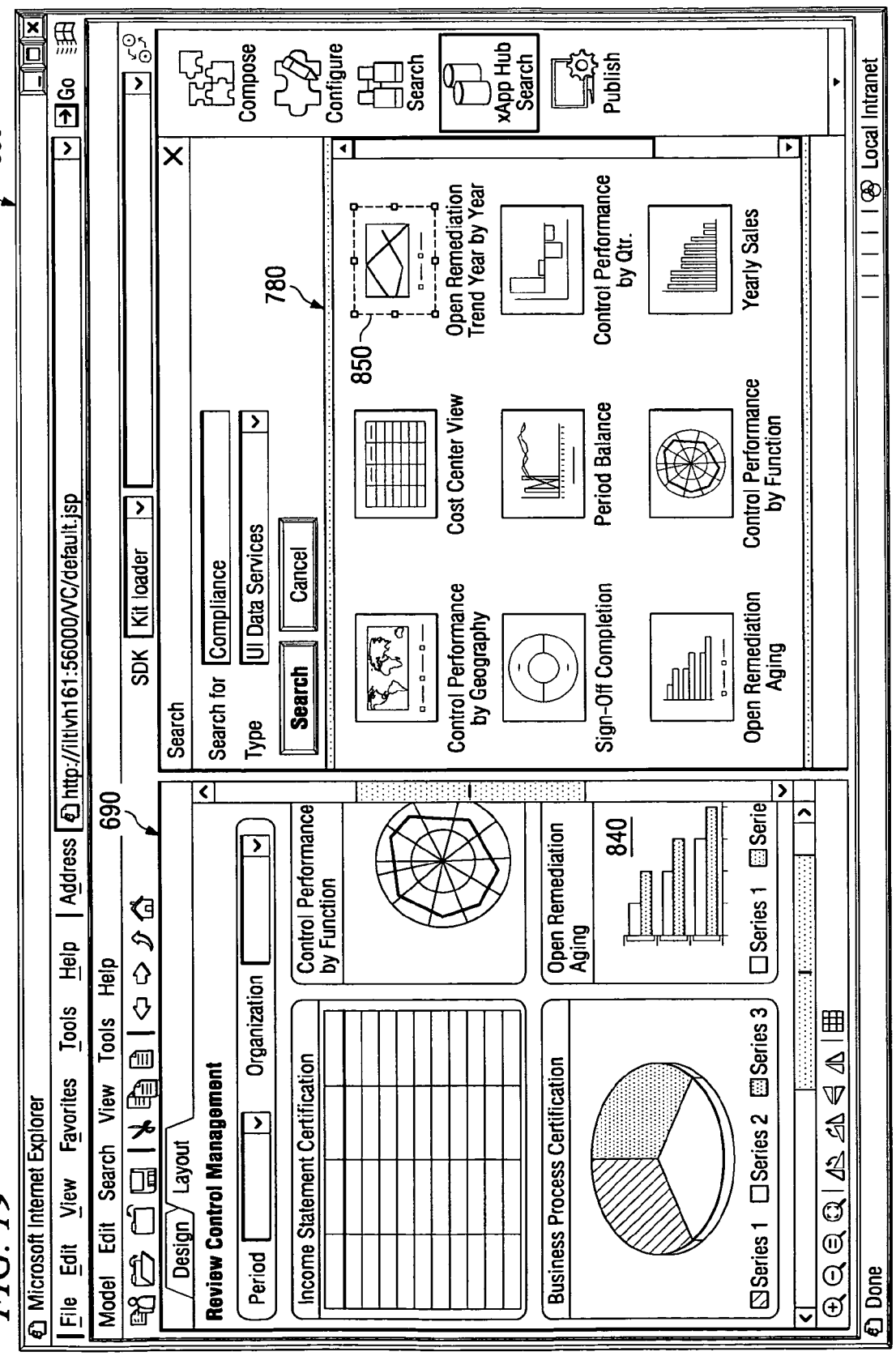

FIG. 11 shows the UI with three components removed. In FIG. 12, the xApp Hub Search button 740 is selected, and the associated toolbar is now displayed in the toolbar 710. A term, "compliance," is inputted into the search field 750 and an object type is inputted in the type field 760. The search may be executed by selecting the Search button 770. FIG. 13 shows the workbench 680 with the xApps corresponding to the search criteria of FIG. 12. The xApps are located in a field 780. FIG. 14 shows a GUI 790 similar to GUI 510, described above. GUI 790 contains additional information about a selected xApps from field 780. FIG. 15 shows the contents of the Model tab 800 of the GUI 790. The contents of Model tab 800 illustrates the model of selected xApp in graphical form. FIG. 16 shows the workbench 680, the xApps in the field 780, as well as the selected xApp 810. FIG. 17 shows the xApp 810 added to the UI 690 at 820 and a second xApp 830 selected from the field 780. The xApp 830 is shown added to the UI 690 as well as a third xApp 840 selected in the field 780 in FIG. 18. FIG. 19 shows the addition of the xApp 840 to the UI 690 as well as the selection of xApp 850 in the field 780.

Figure 20:
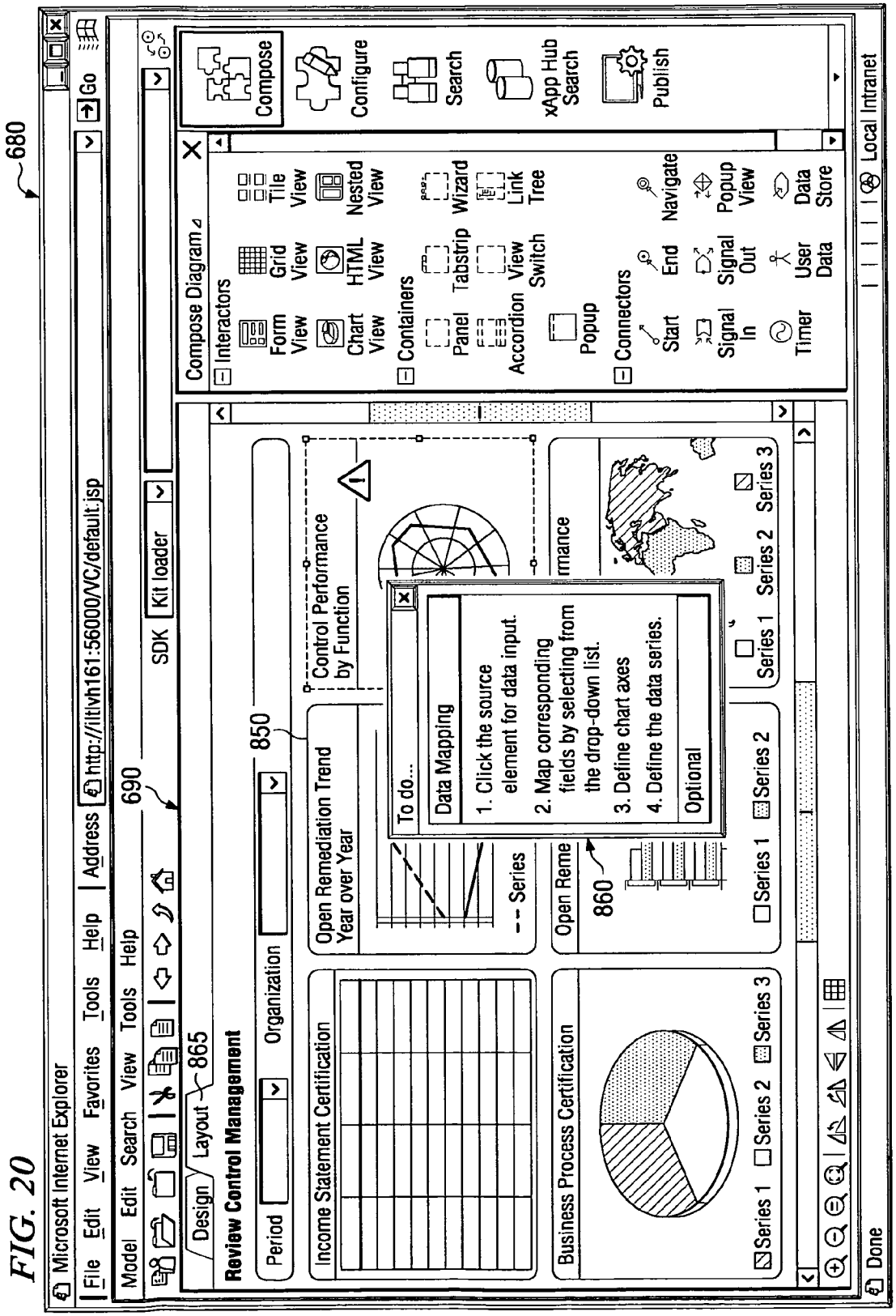
Figure 21:
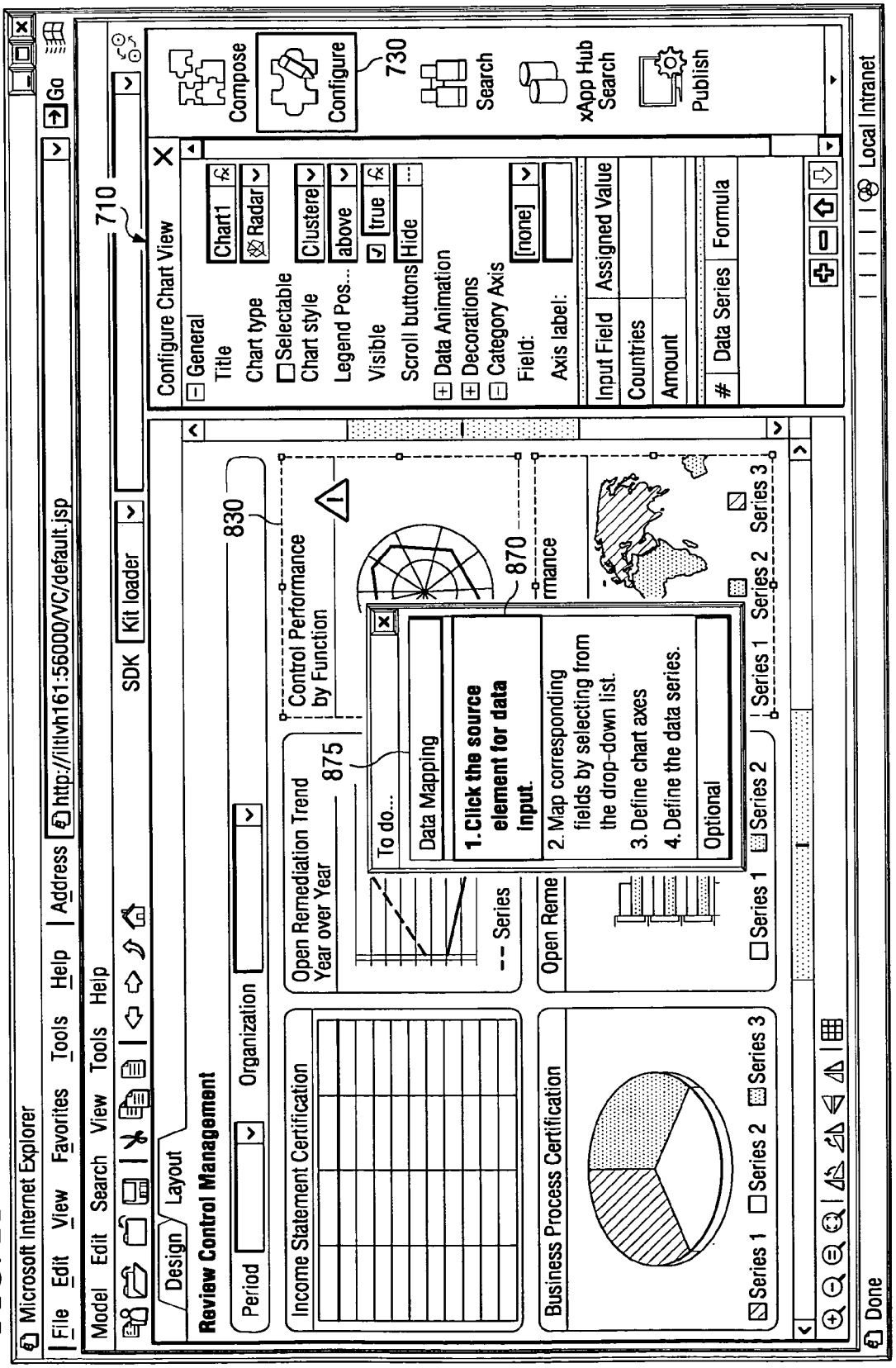
Figure 22:
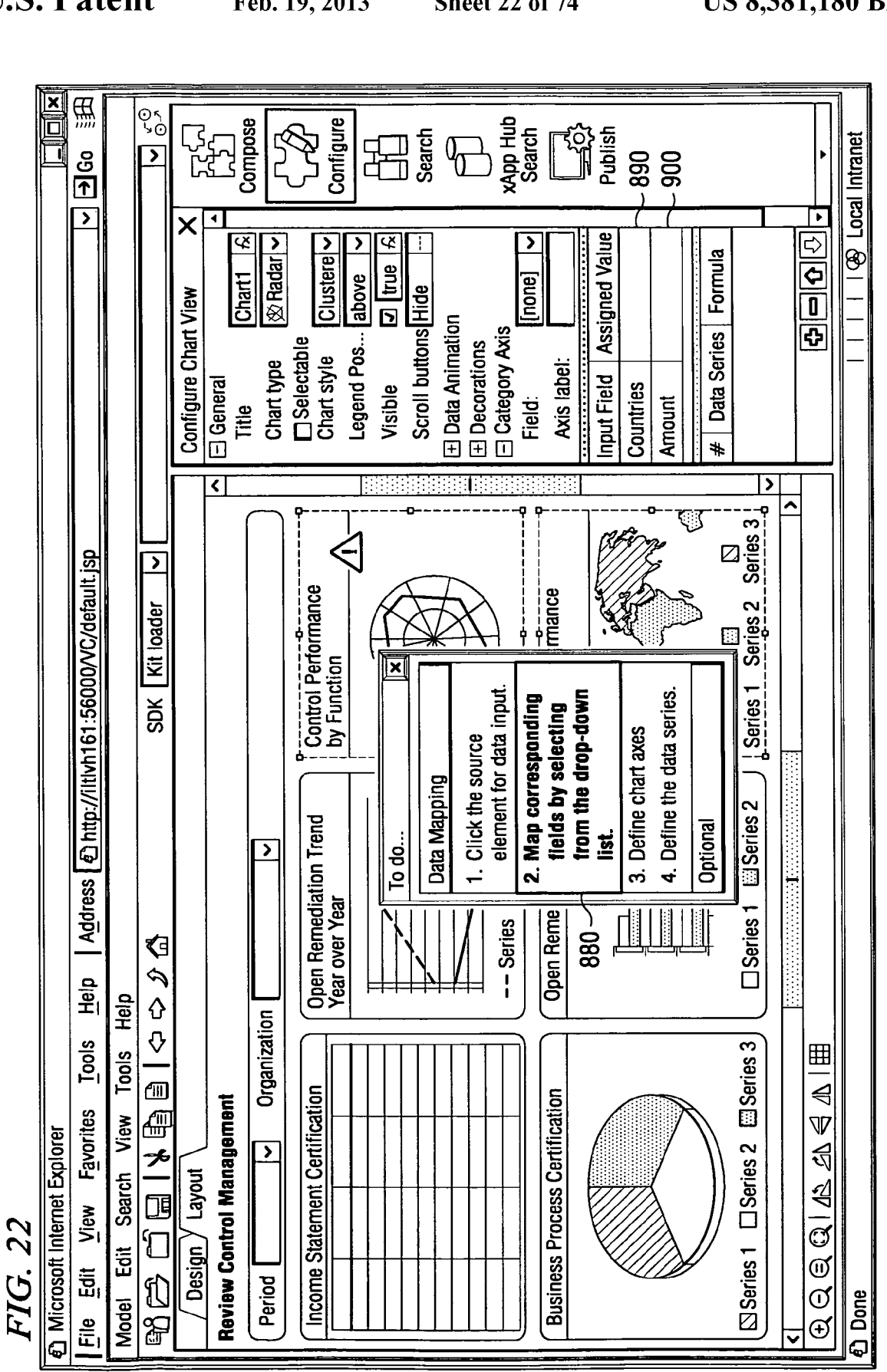
Figure 23:
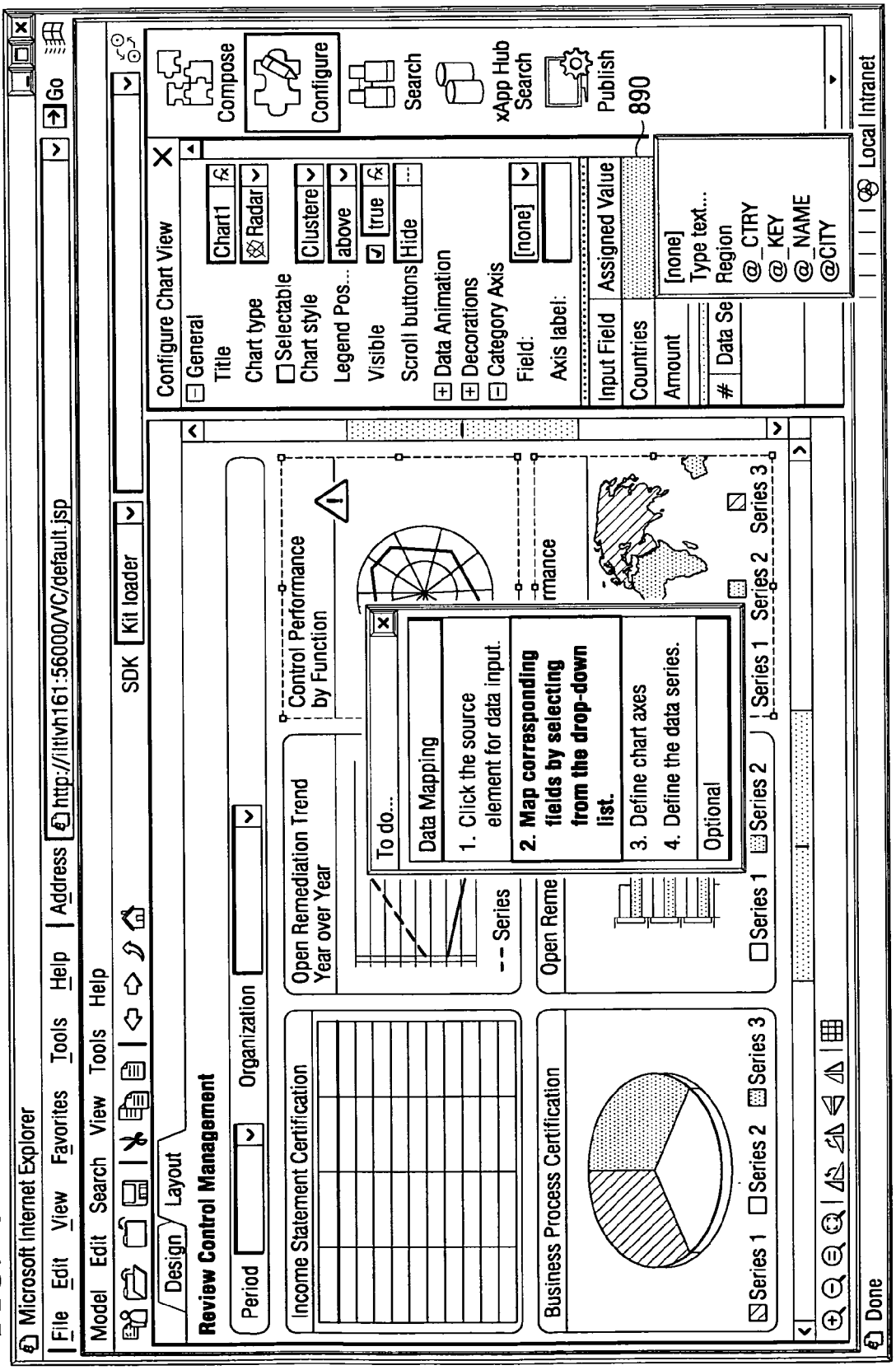
Figure 24:
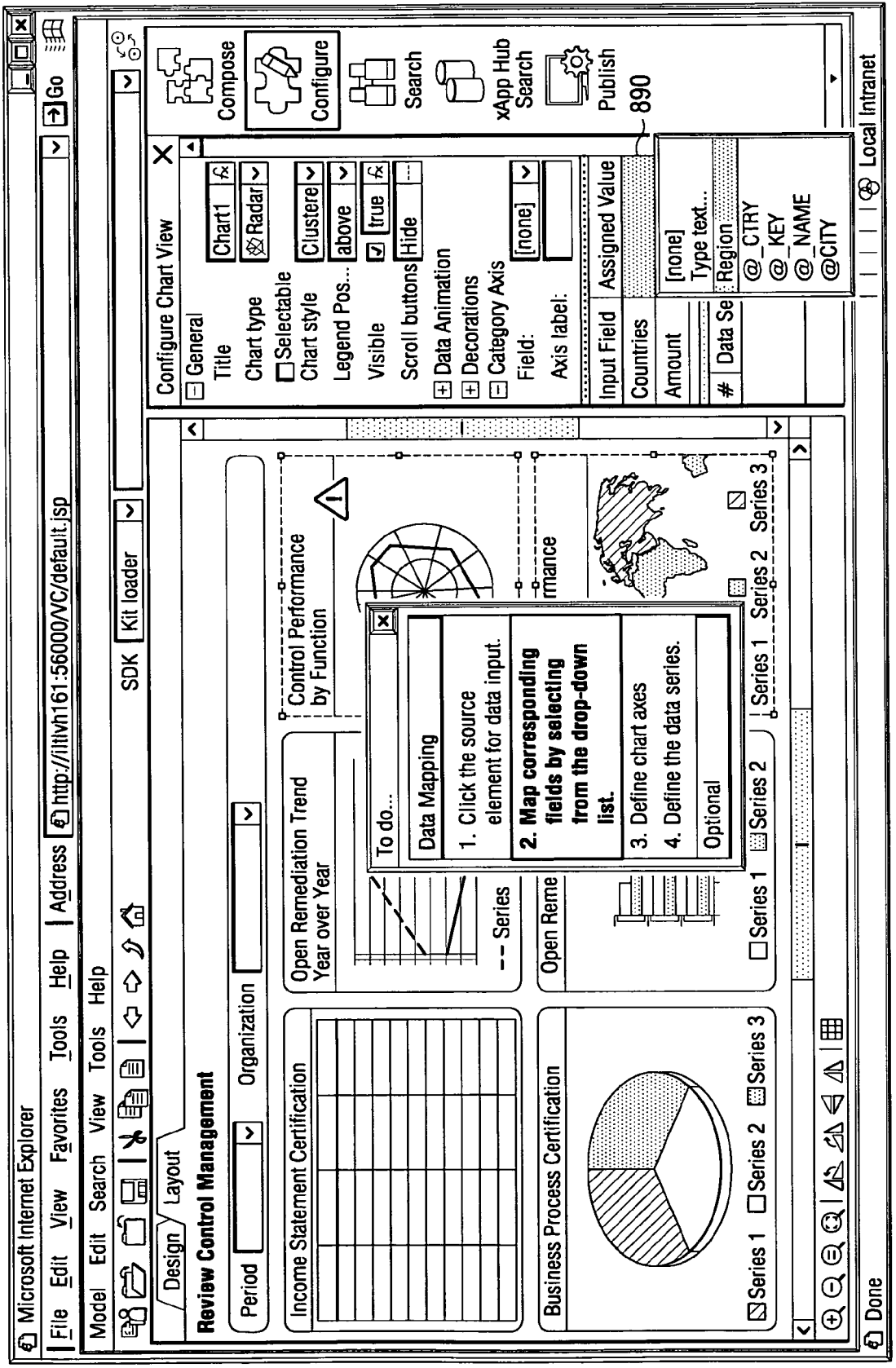
Figure 25:
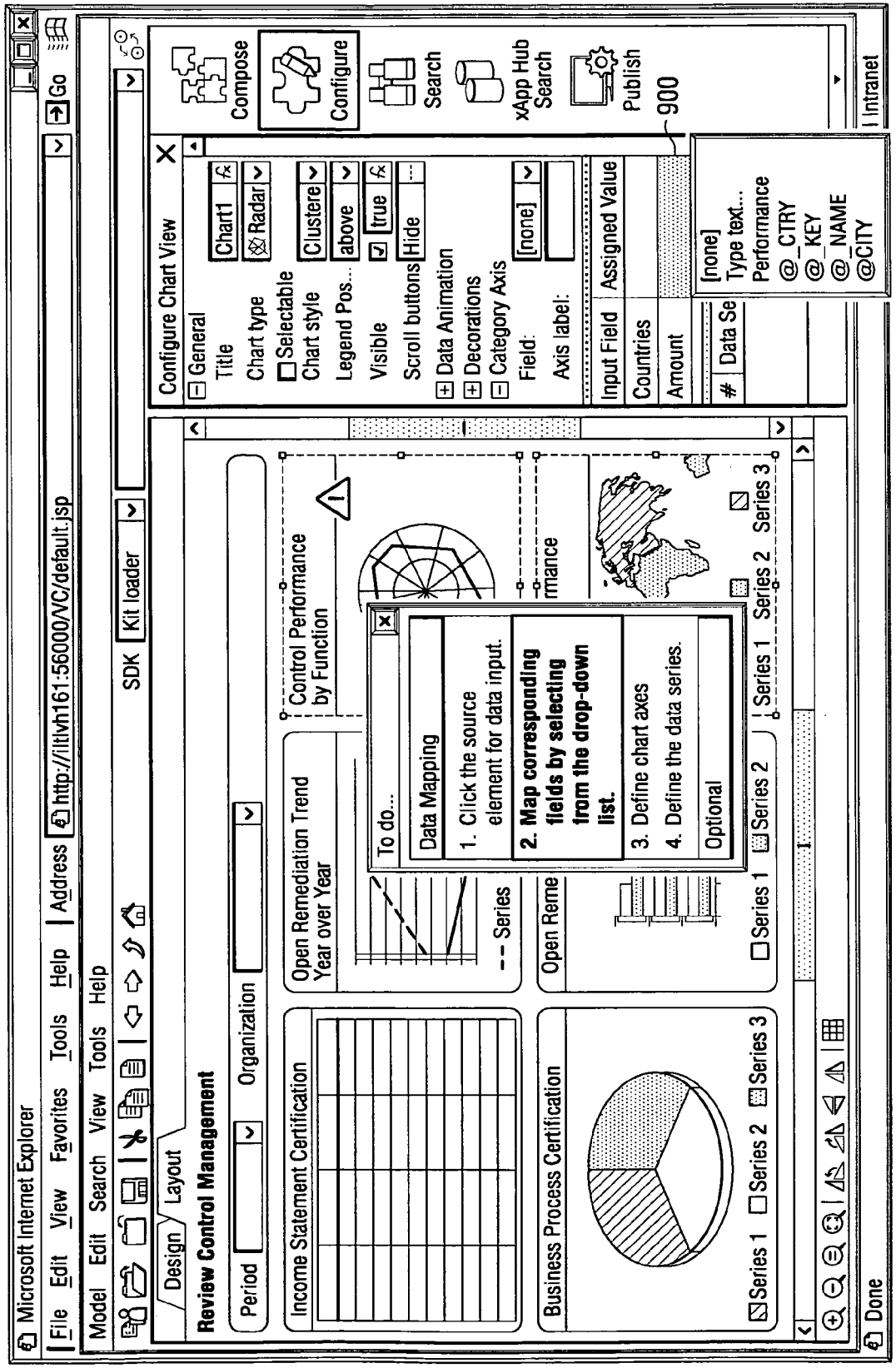
Figure 26:
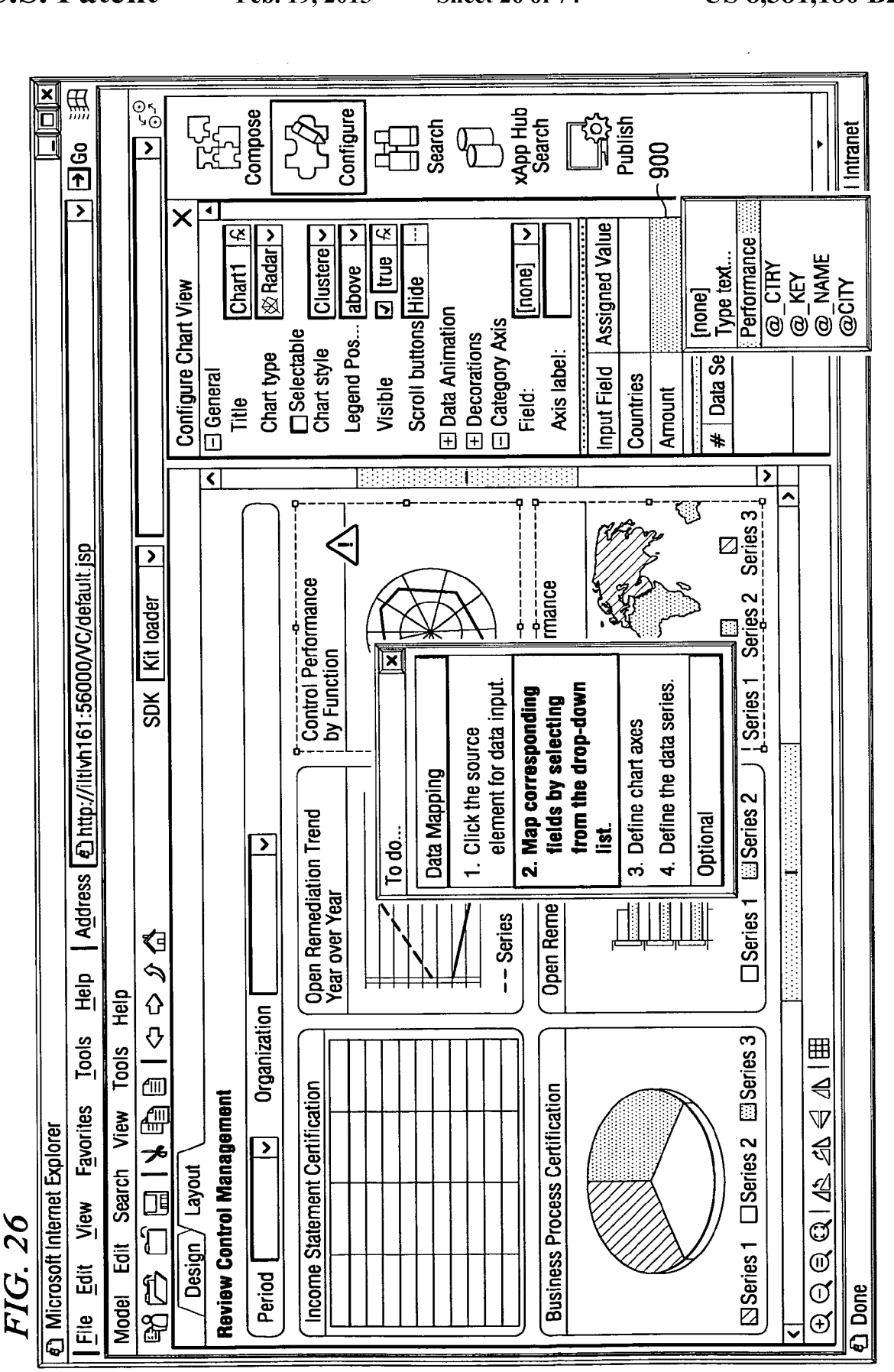
Figure 27:
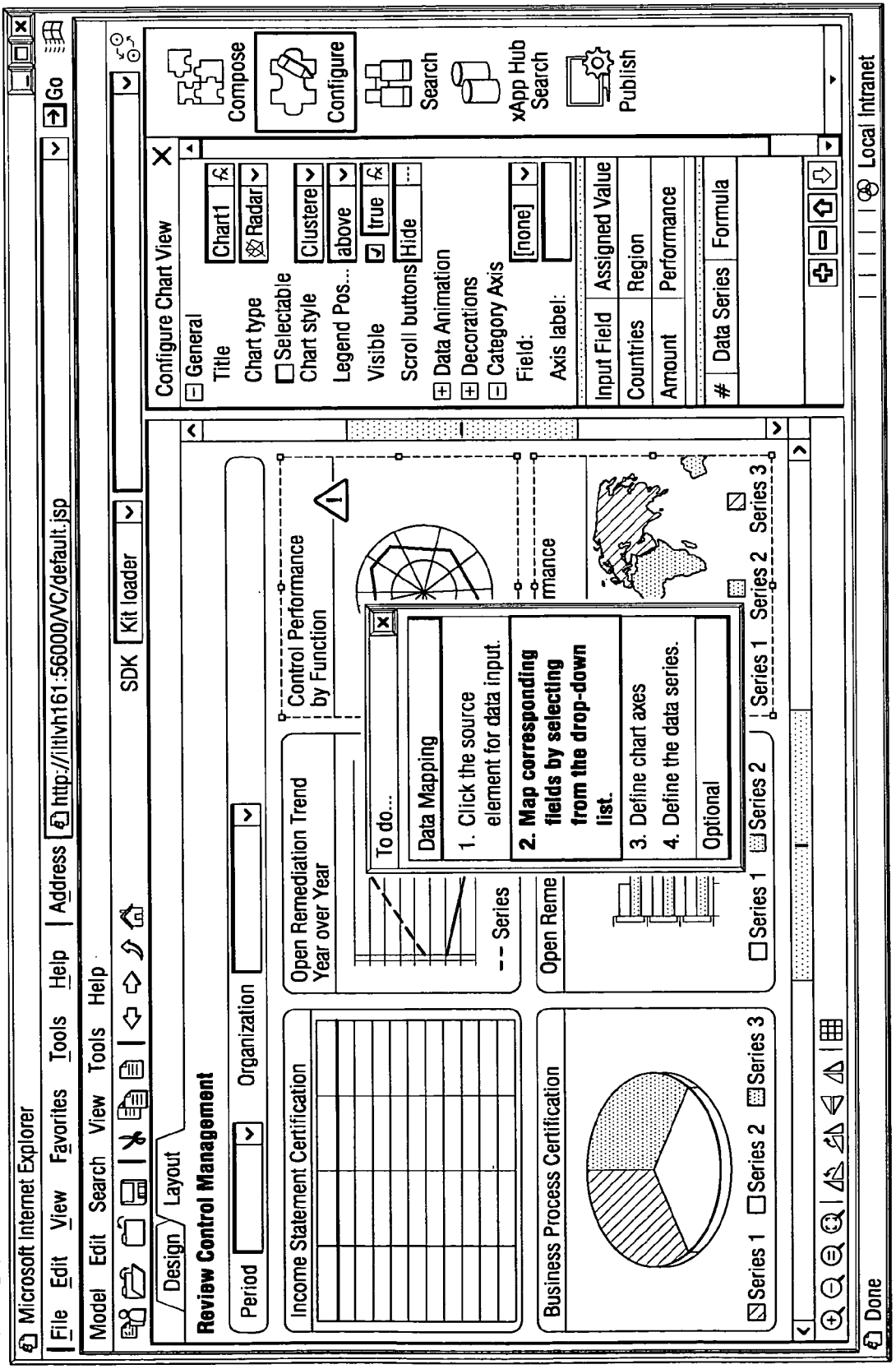

FIGS. 20-38 illustrates the configuration and gap-filling of the xApp 840 to function in a desired manner. FIG. 20 shows the xApps included in the application's UI 690 and includes a to-do list 860 corresponding to xApp 830. Further, the configuration of the different xApps, such as xApps 820-850, may be performed on a Layout tab 865. As explained above, a to-do list aids the user in configuring an xApp. Referring to FIG. 21, the configure button 730 is selected and the toolbar 710 contains the corresponding functions. As indicated at 870, the first item under a Data Mapping heading 875 on the to-do list 860 is highlighted and xApp 830 is correspondingly selected. As such, xApp 830 may be configured. Referring to FIG. 22, item two 880 of the to-do list 860 is highlighted, indicating to the user to select a field to be mapped using drop-down lists 890, 900. FIG. 23 shows a plurality of values available for mapping to the "Countries" field from the drop-down list 890. FIG. 24 shows the "region" values of the first drop-down list 890 being assigned to the "Countries" field. FIG. 25 shows a plurality of values available for mapping to the "Amount" field from the drop-down list 900. FIG. 26 shows the "performance" values of the drop-down list 900 being assigned to the "Amount" field. FIG. 27 shows the first drop-down list 890 having the "region" values selected, and the second drop-down list 900 having the "performance" values selected.

Figure 28:
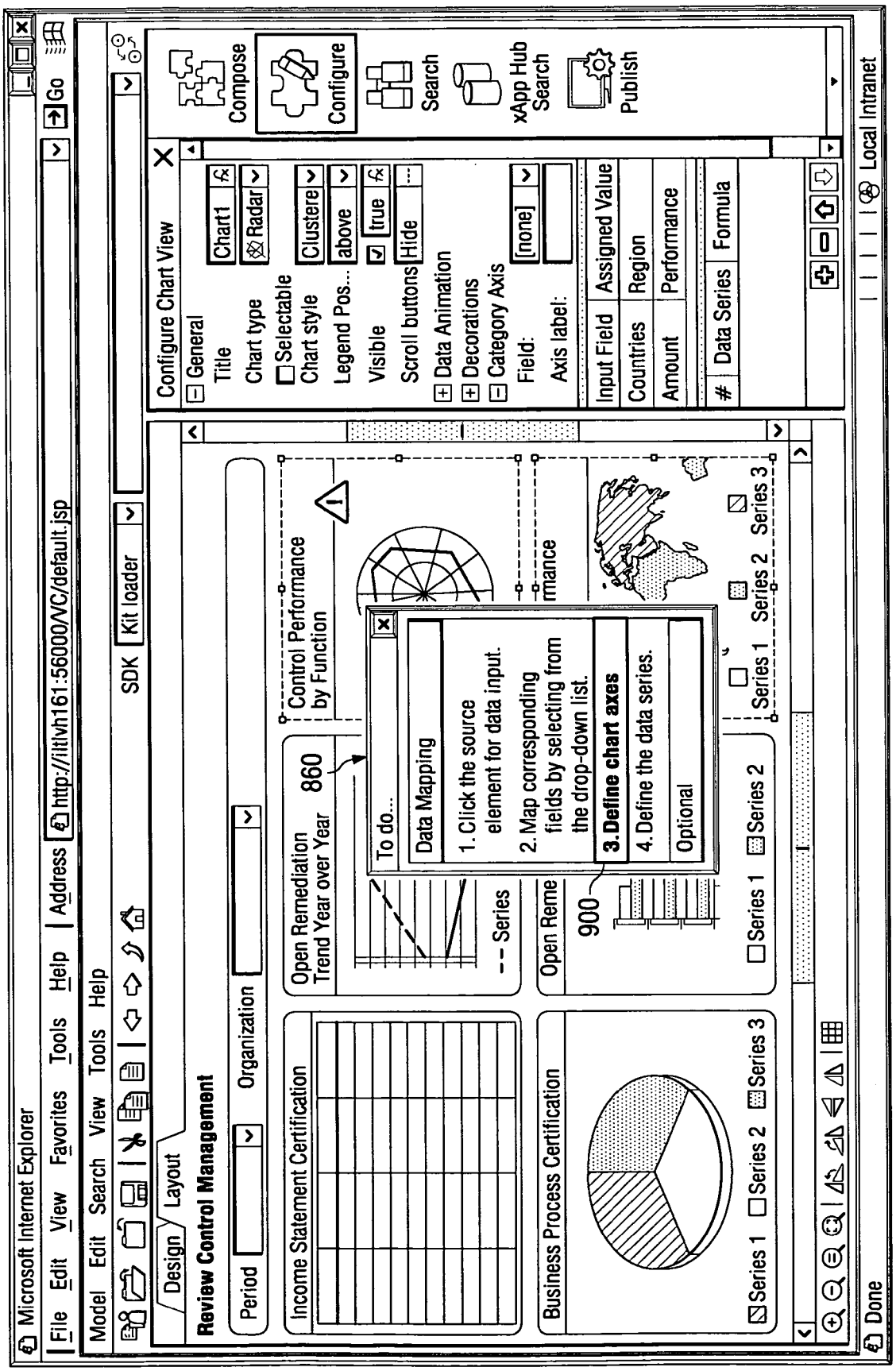
Figure 29:
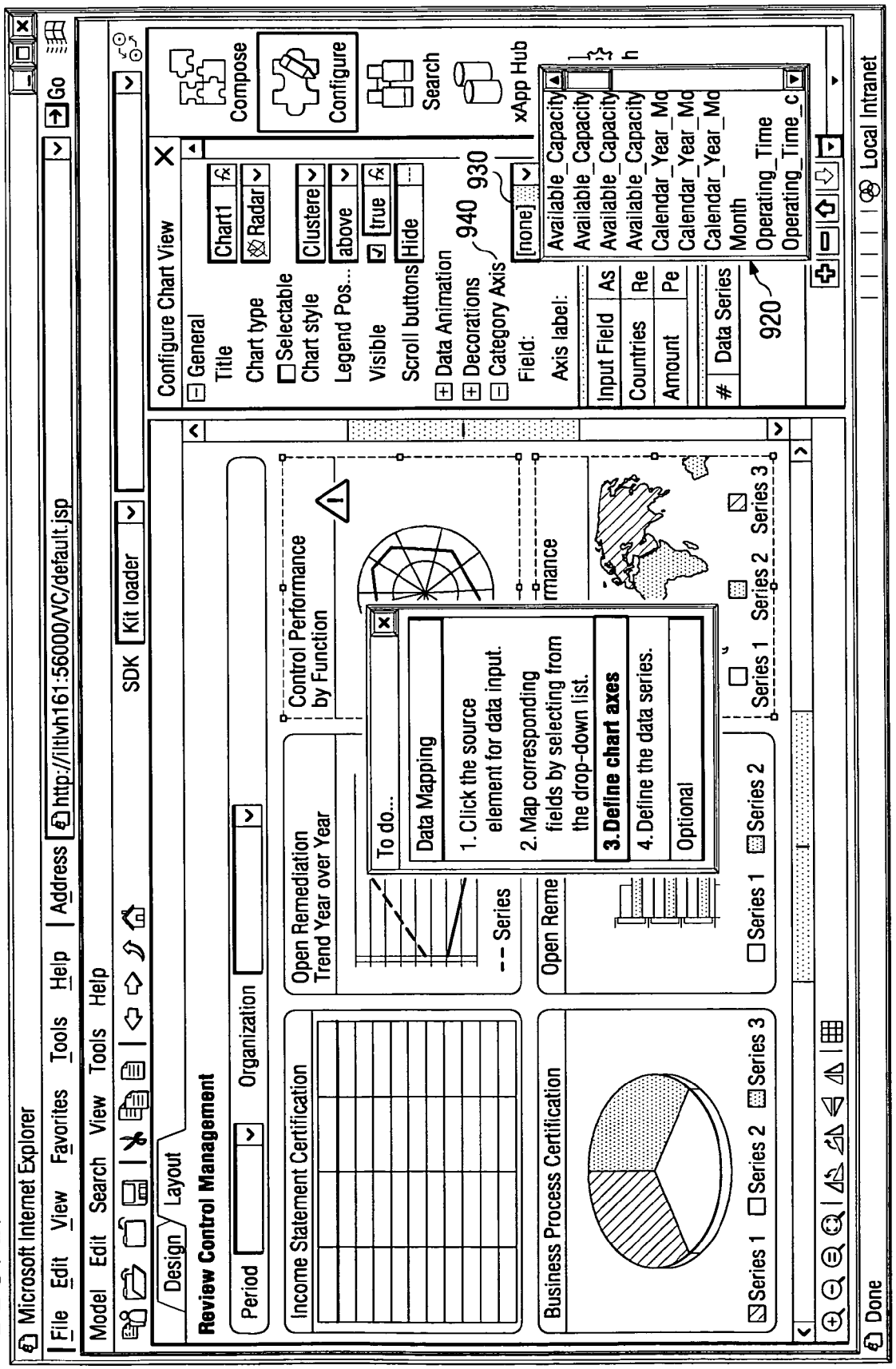
Figure 30:
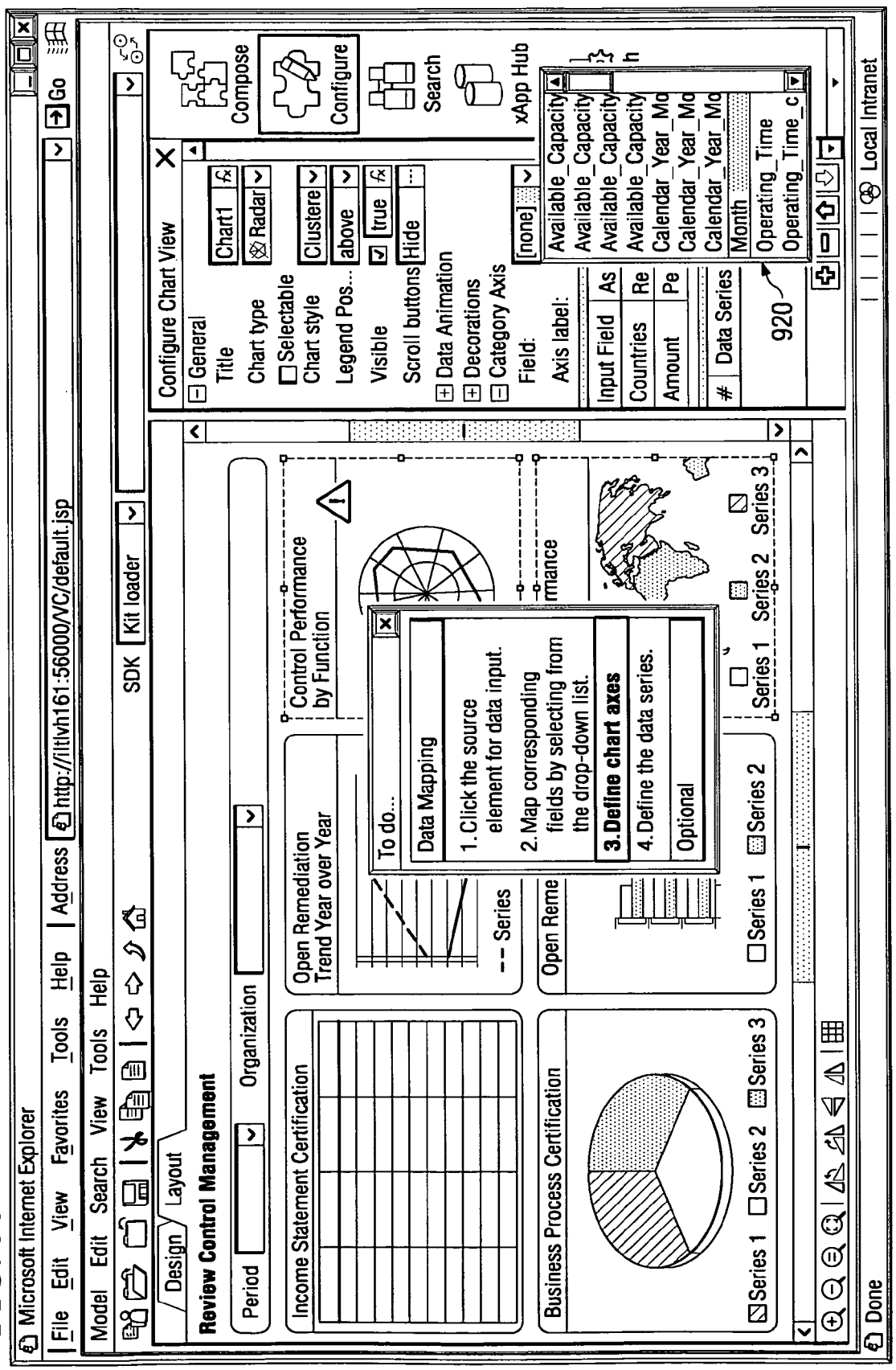
Figure 31:
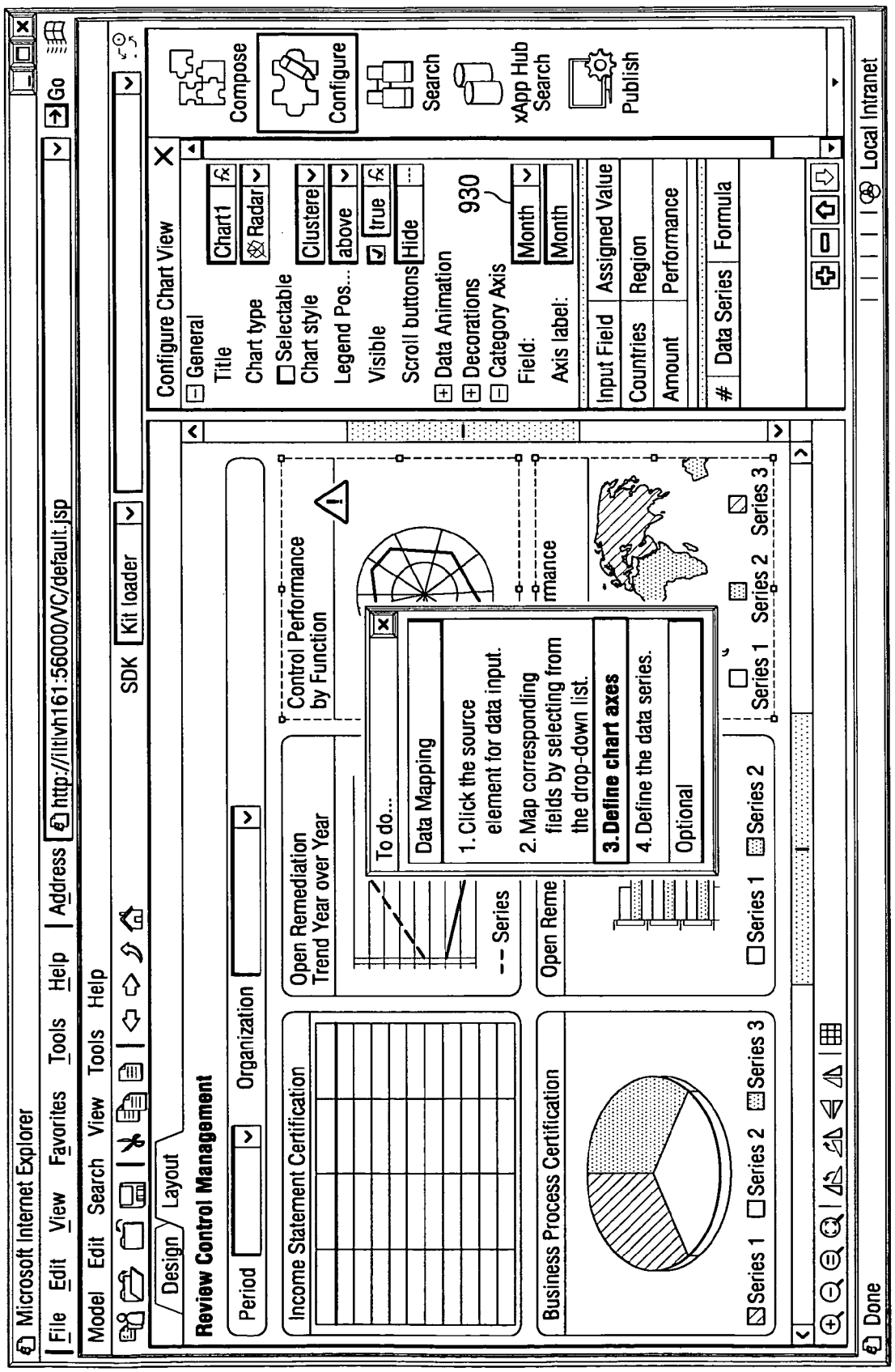
Figure 32:
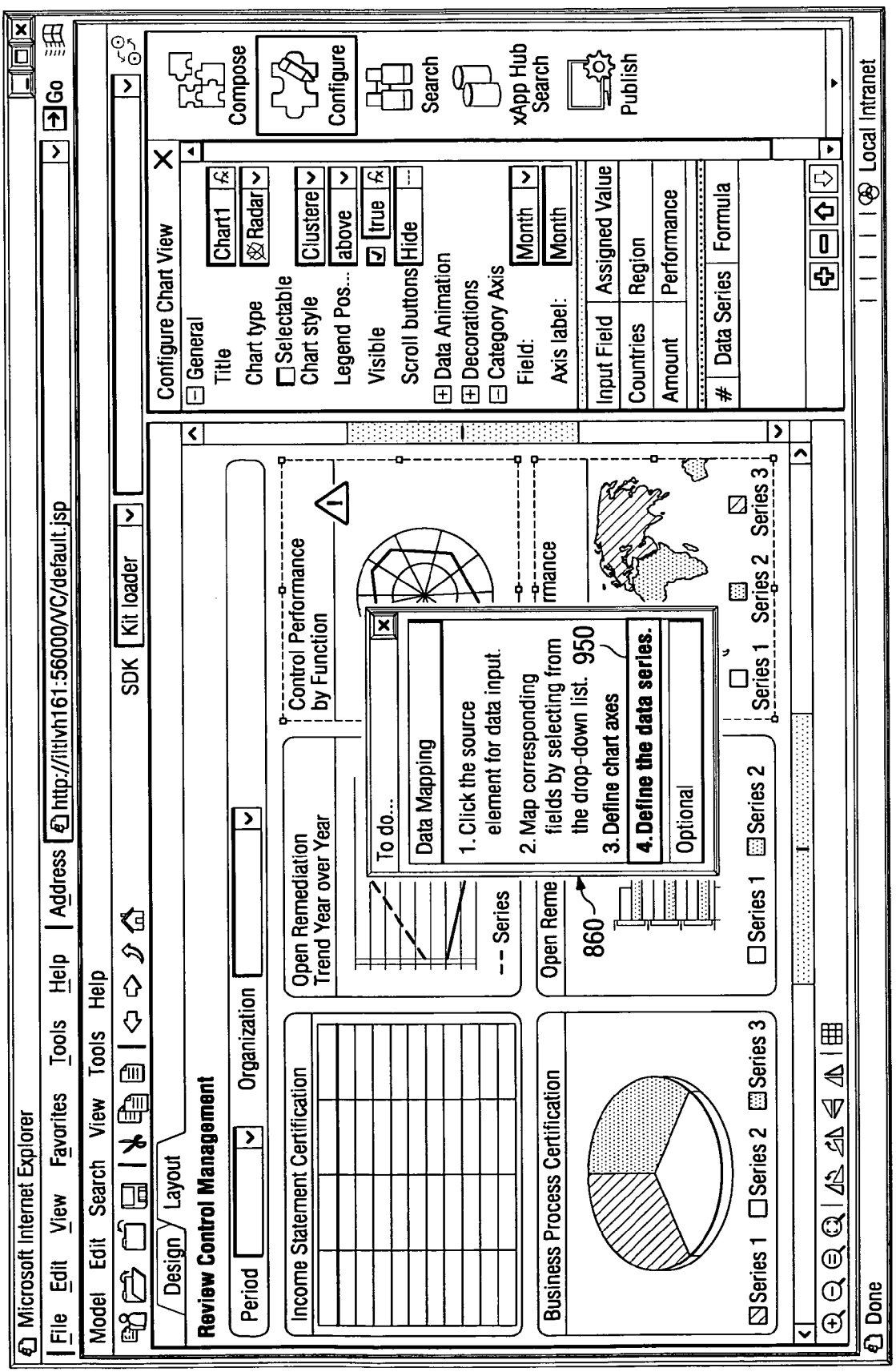
Figure 33:
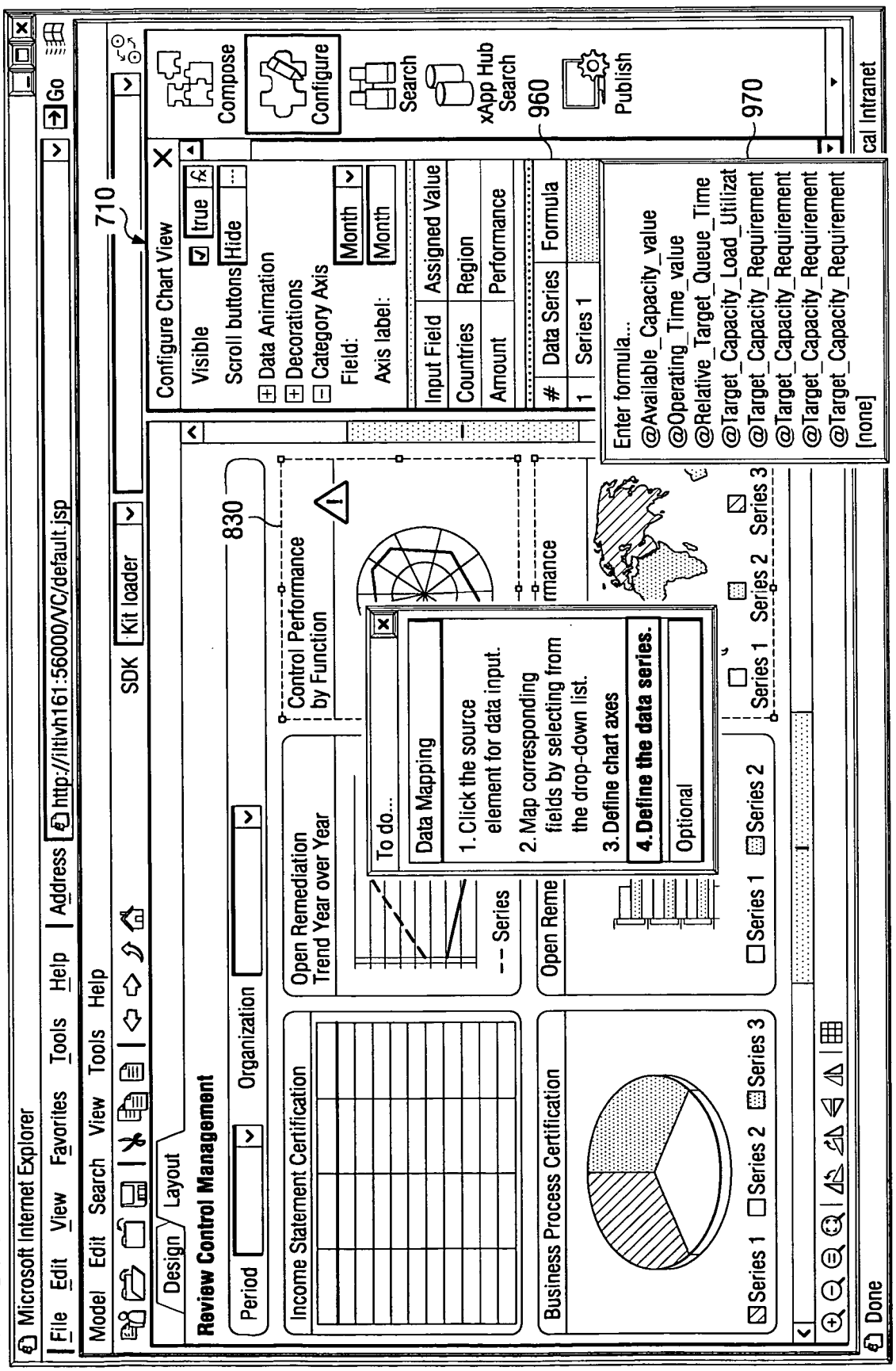
Figure 34:
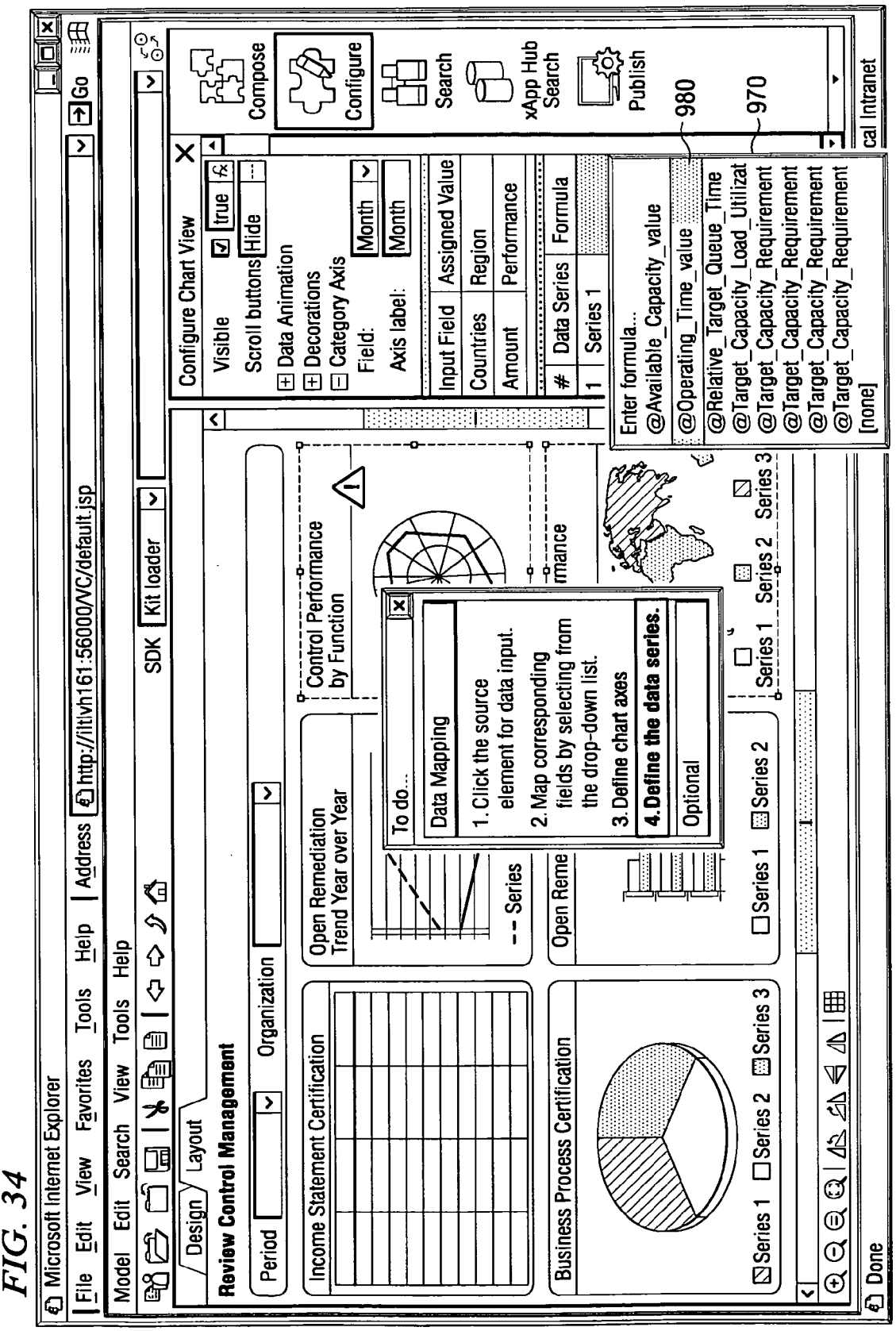
Figure 35:
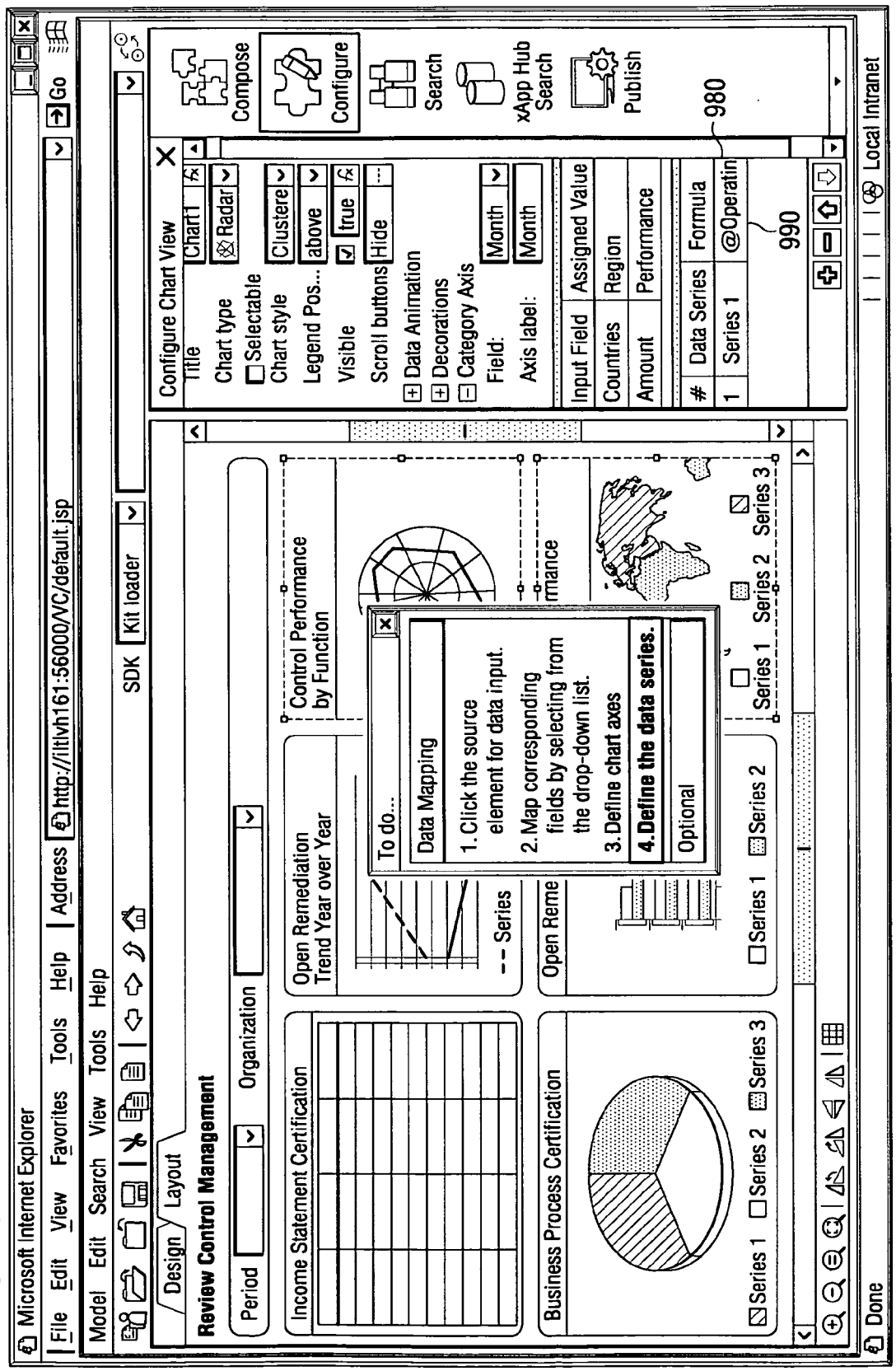
Figure 36:
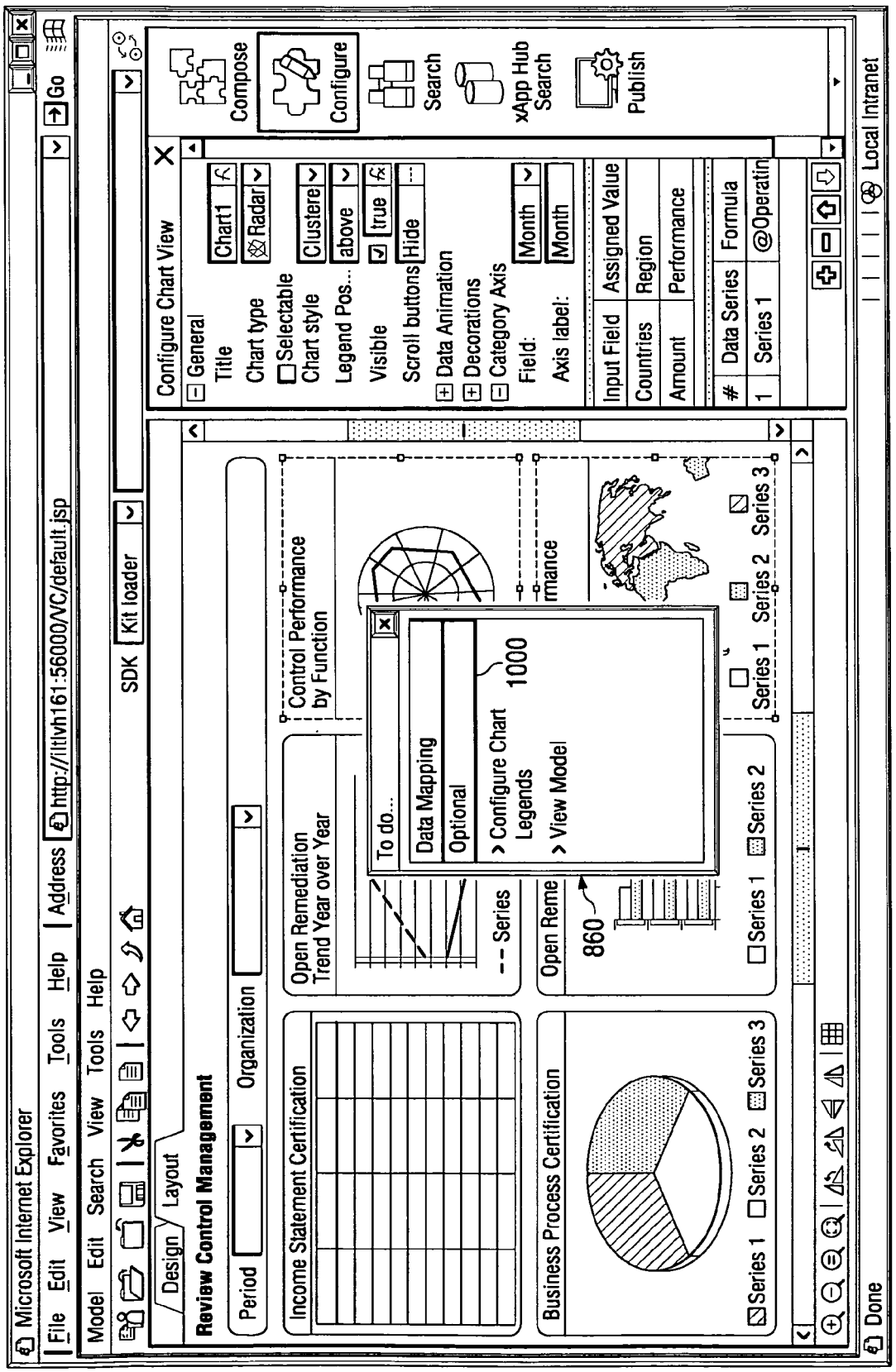
Figure 37:
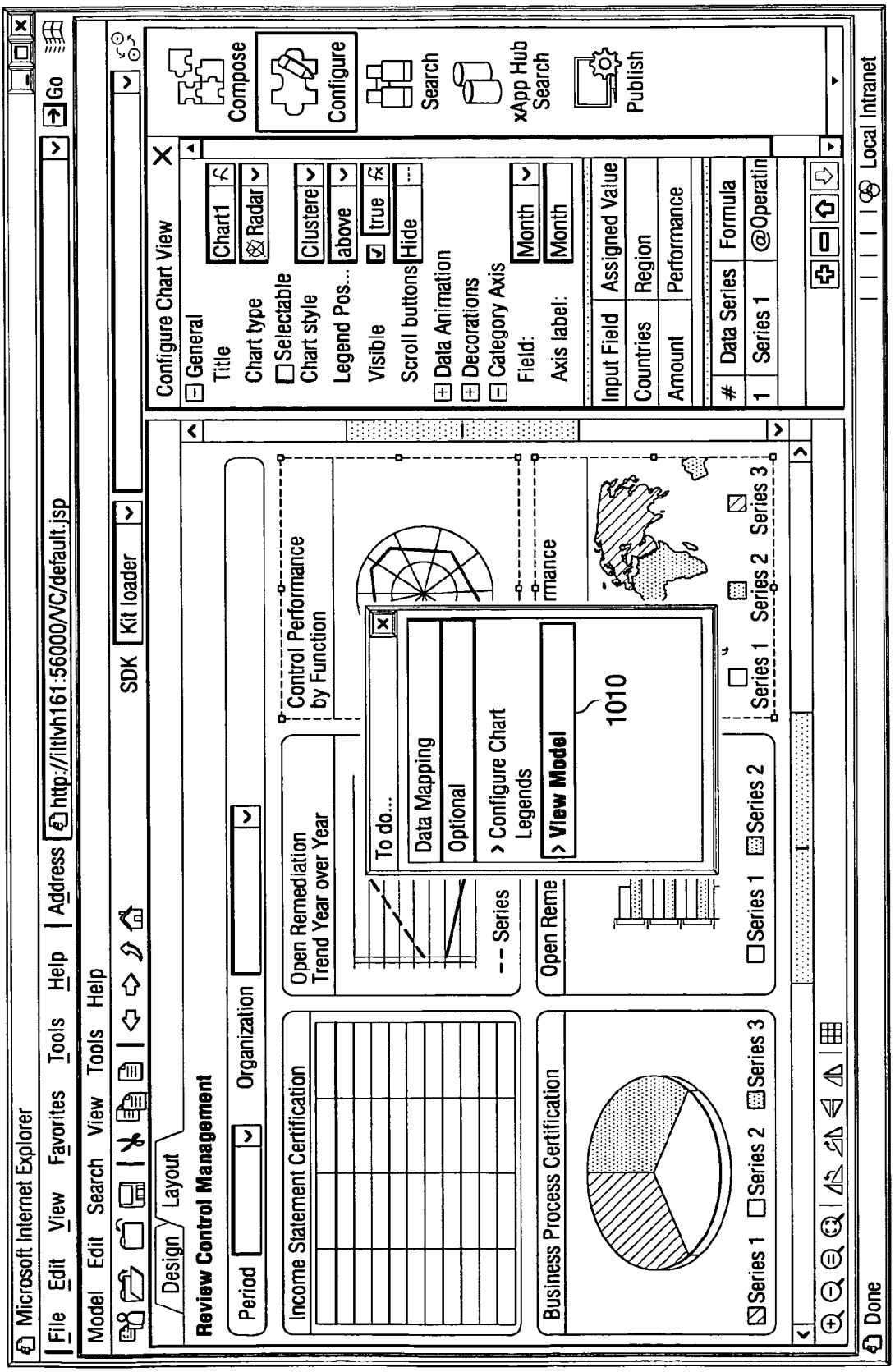
Figure 38:
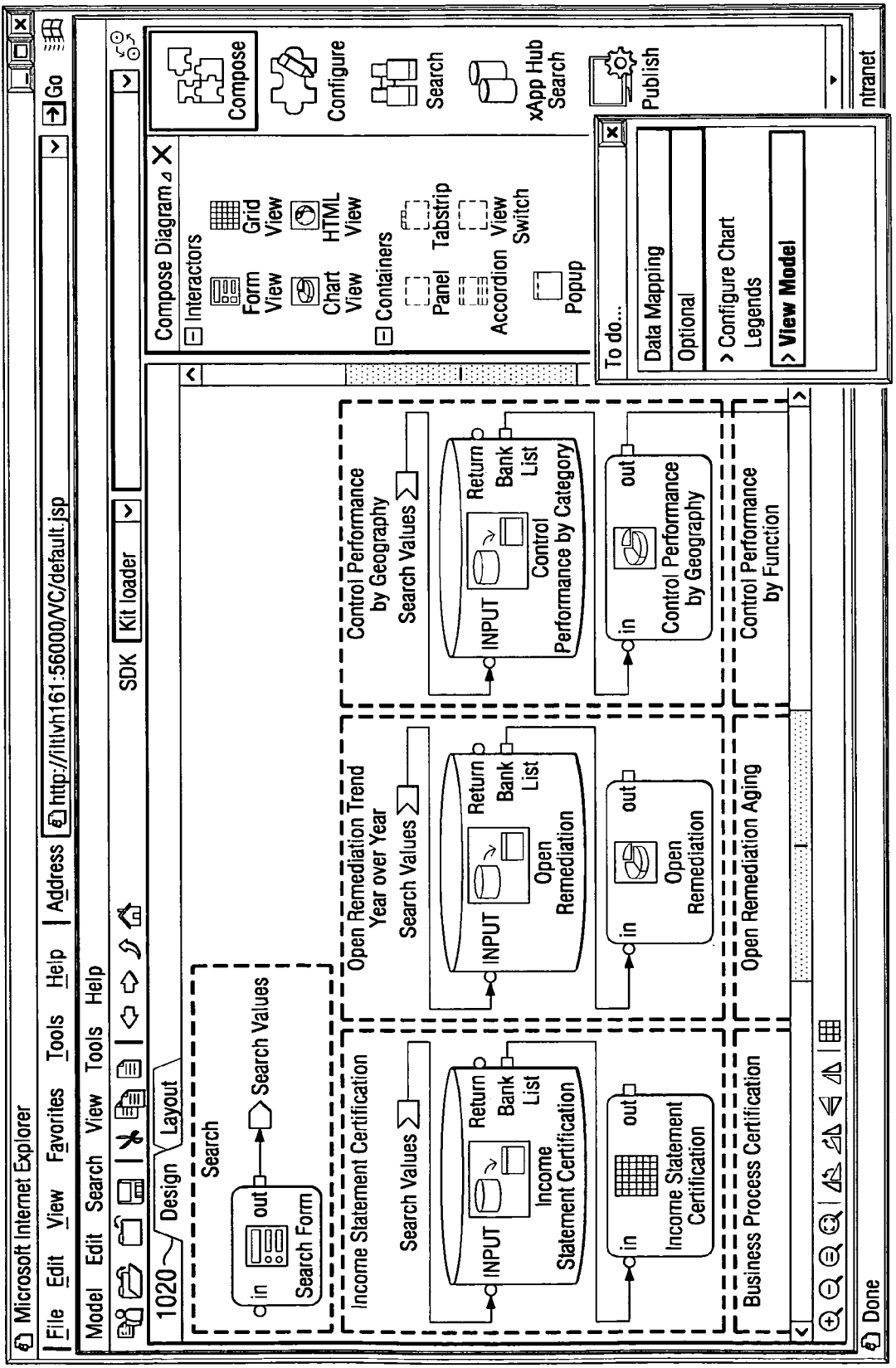
Figure 39:
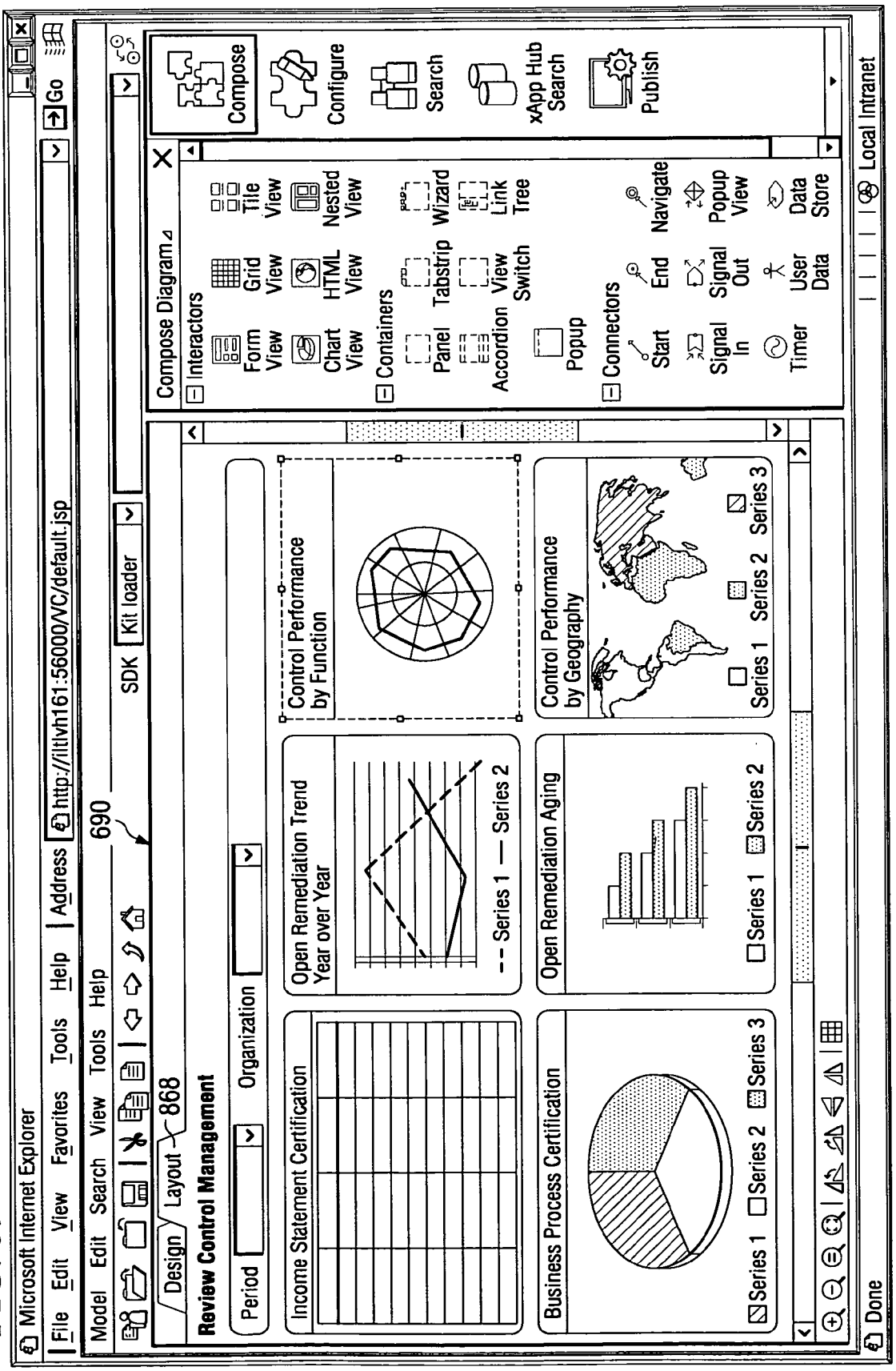

FIG. 28 shows the to-do list 860 in which item three 910 is highlighted, indicating that the chart axes should be defined. FIG. 29 shows a drop-down list 920 corresponding to field 930 under the Category Axis menu 940. FIG. 30 shows the "Month" item selected on the drop-down list 920, and FIG. 31 shows the field 930 with the selected "Month" item shown therein. FIG. 32 shows the fourth item 950 on the to-do list 860 highlighted, indicating that the data series of the selected chart should be defined. Referring to FIG. 33, a lower portion 960 of the toolbar 710 includes a list 970 of available data series for the selected xApp 830. FIG. 34 shows a selected data series 980 in the list 970. FIG. 35 shows the selected data series 980 in a field 990. FIG. 36 shows the to-do list 860 listing additional configuration options under an Optional heading 1000. Referring to FIG. 37, a second item 1010, labeled "View Model," is selected, and, correspondingly, FIG. 38 shows a graphical representation of all of the xApp models included in the application. The graphical representation of the models is provided under a Design tab 1020. FIG. 39 shows the UI 690 returned to the "Layout" view (by selection of the Layout tab 865).

Figure 40:
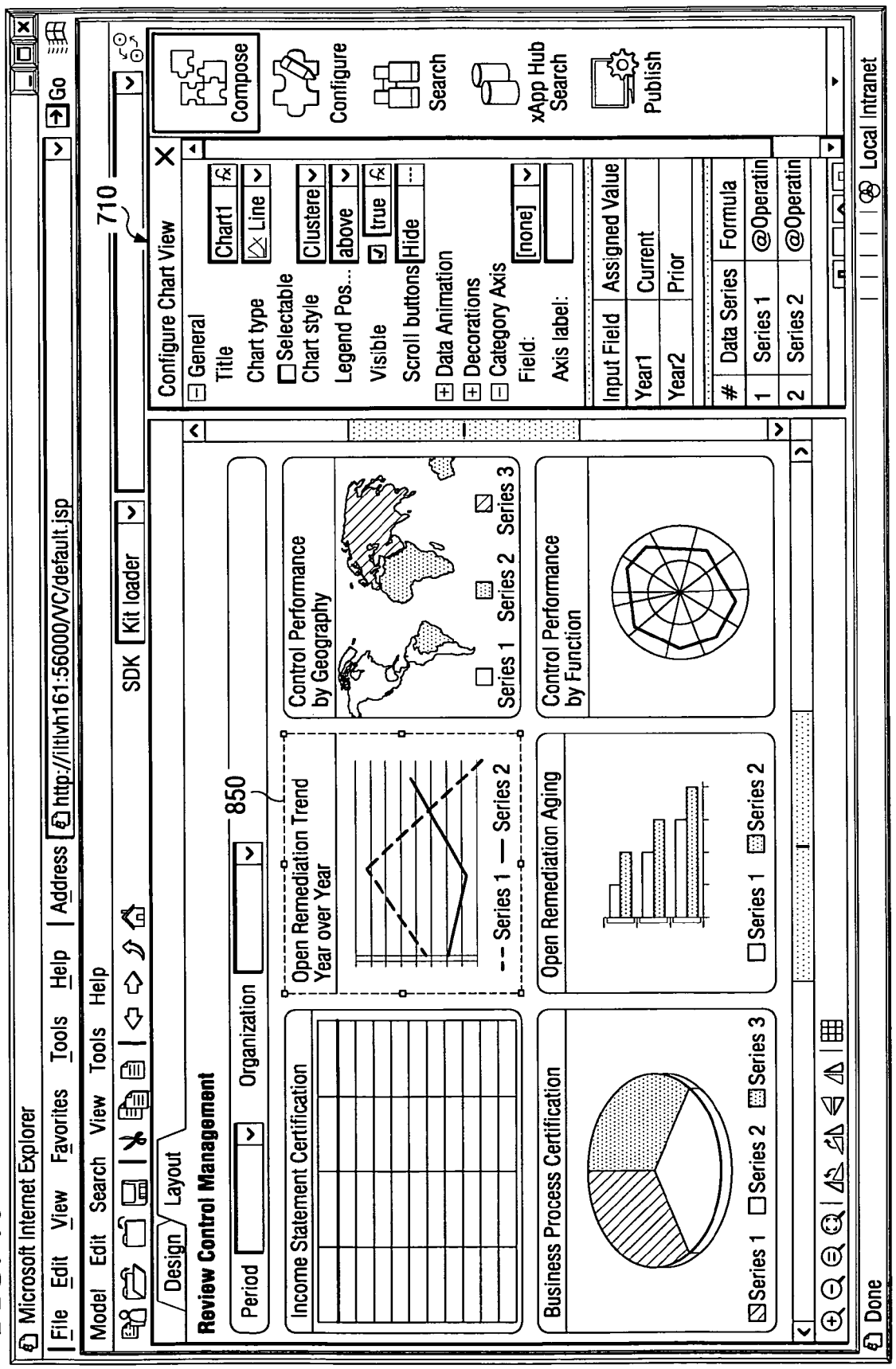
Figure 41:
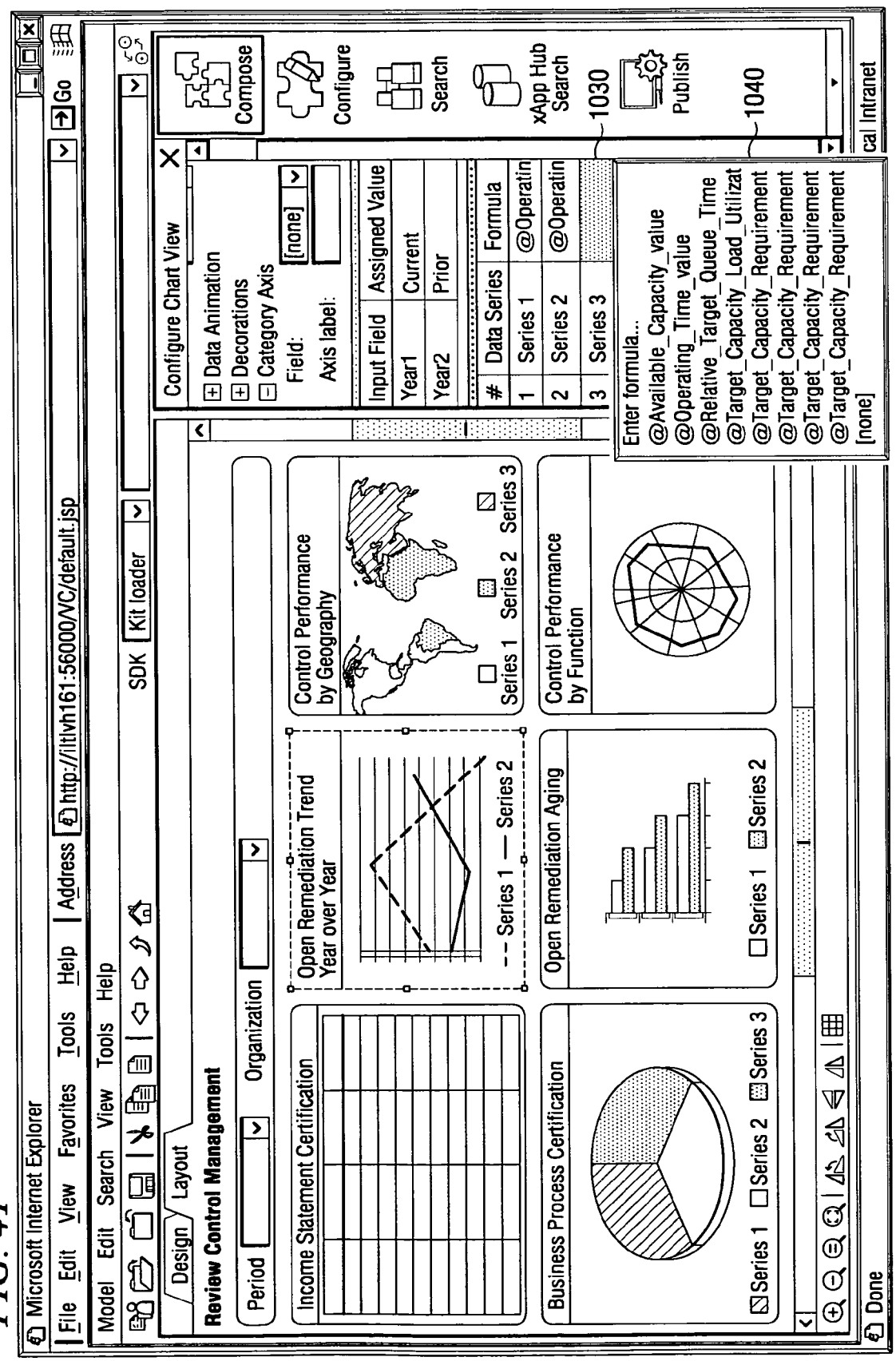
Figure 42:
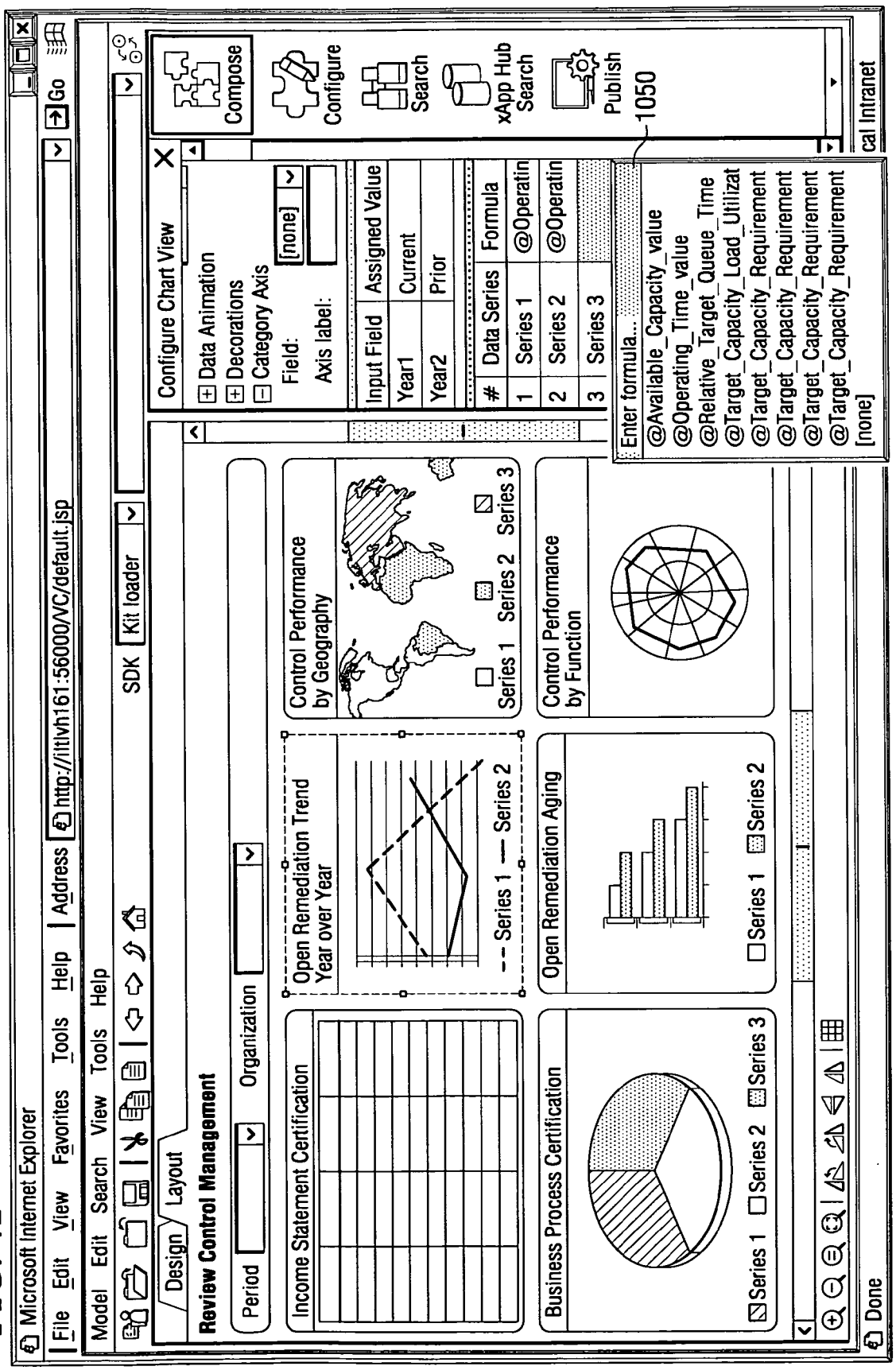
Figure 43:
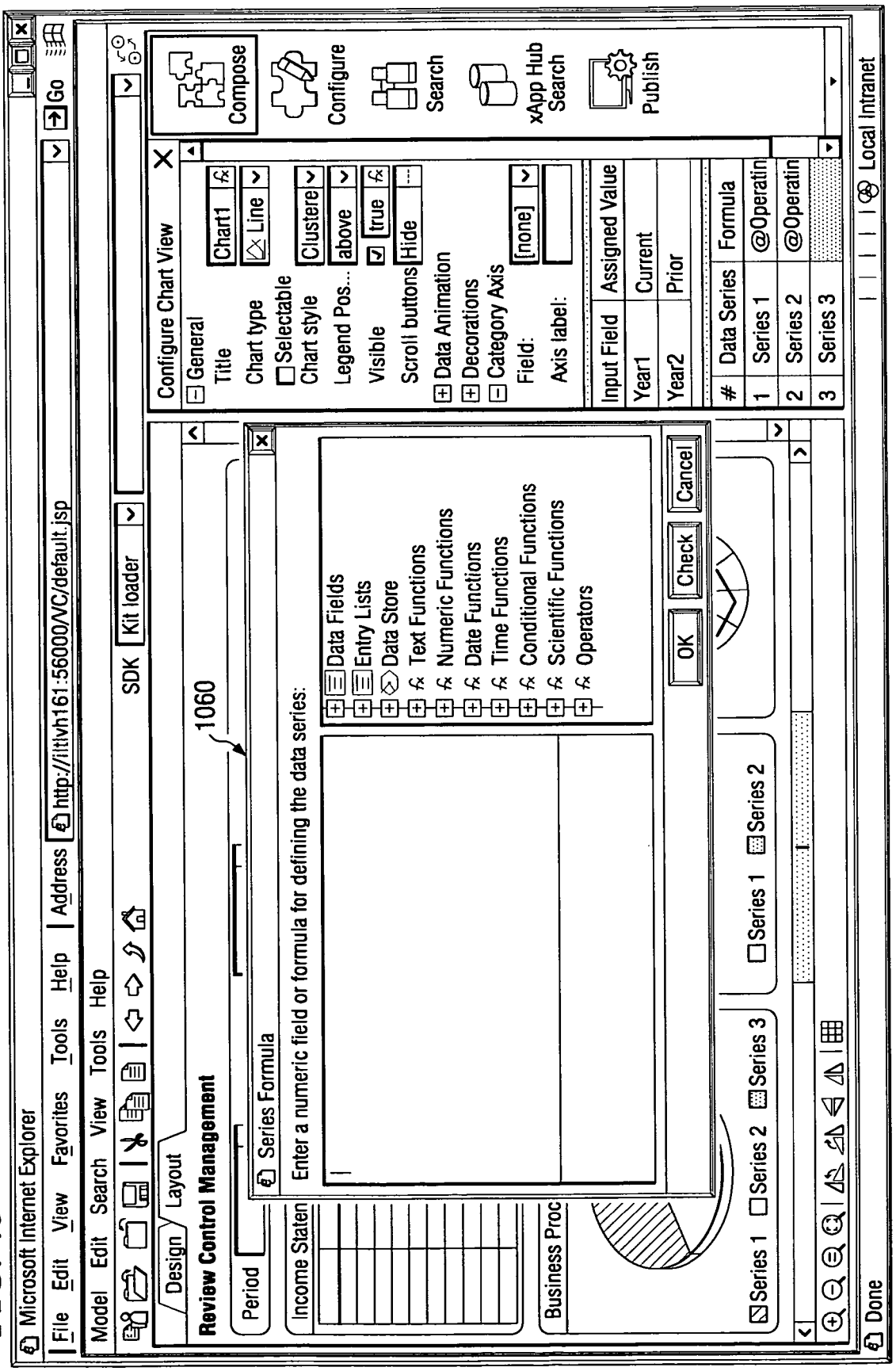
Figure 44:
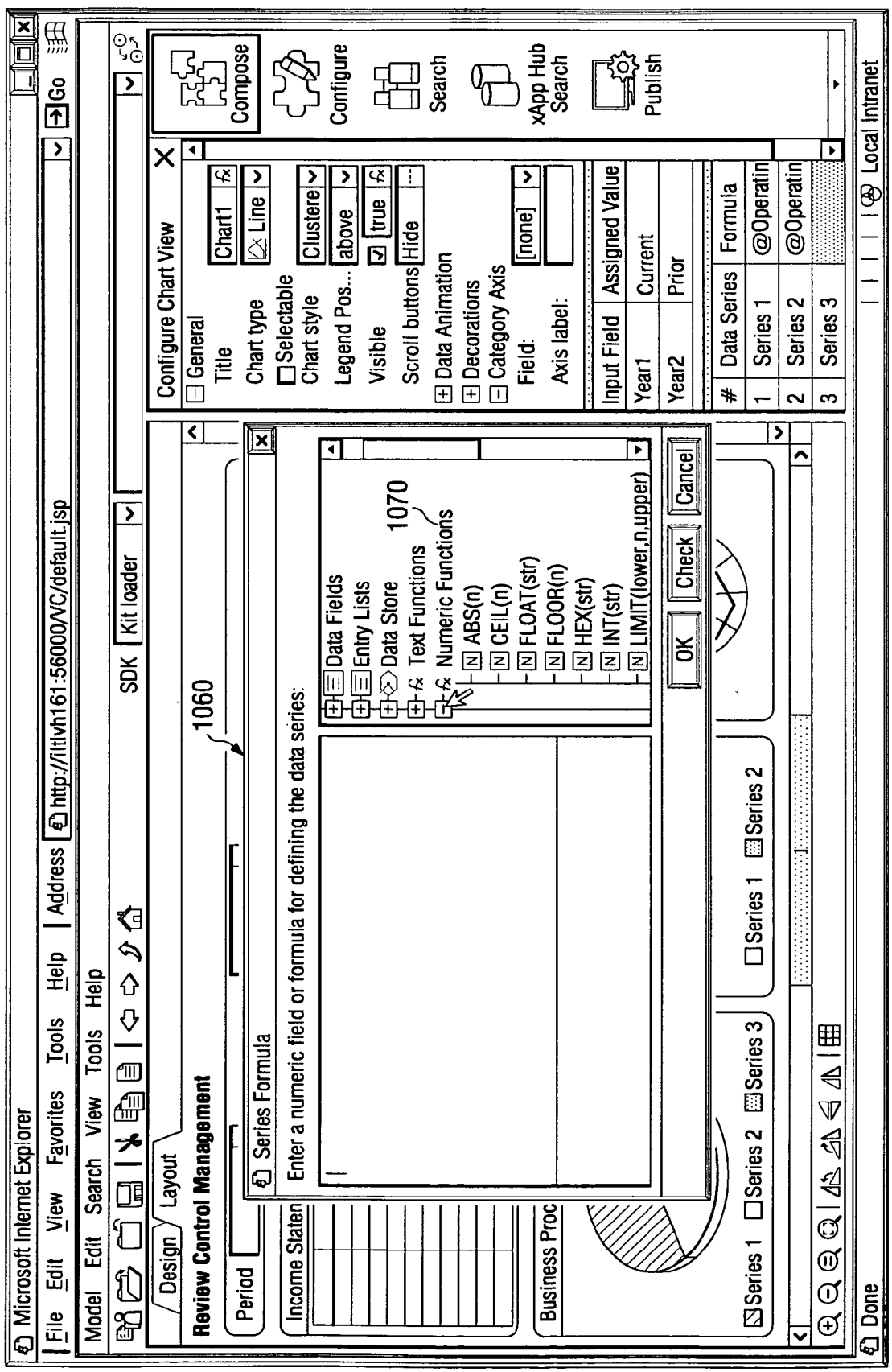
Figure 45:
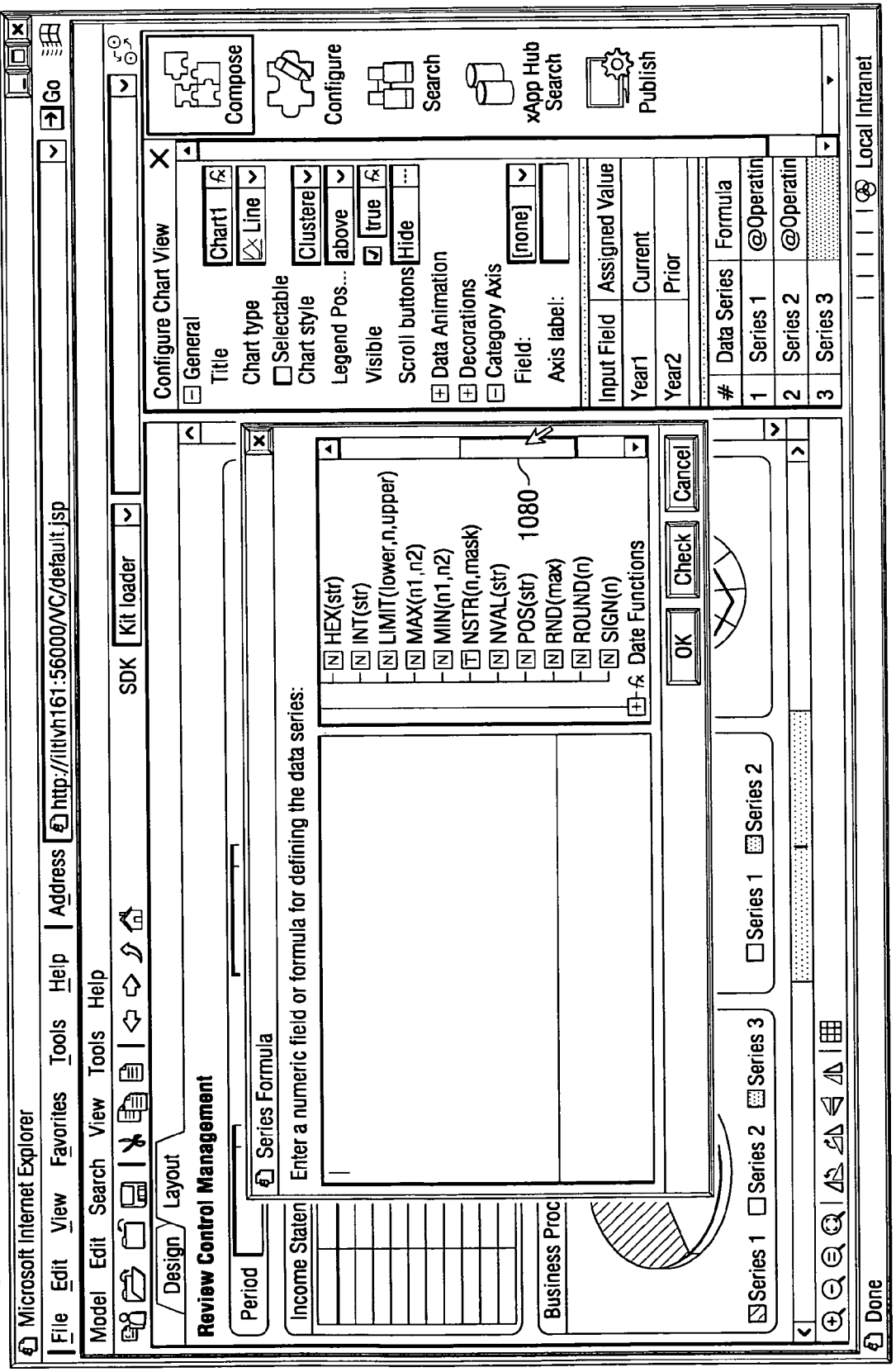
Figure 46:
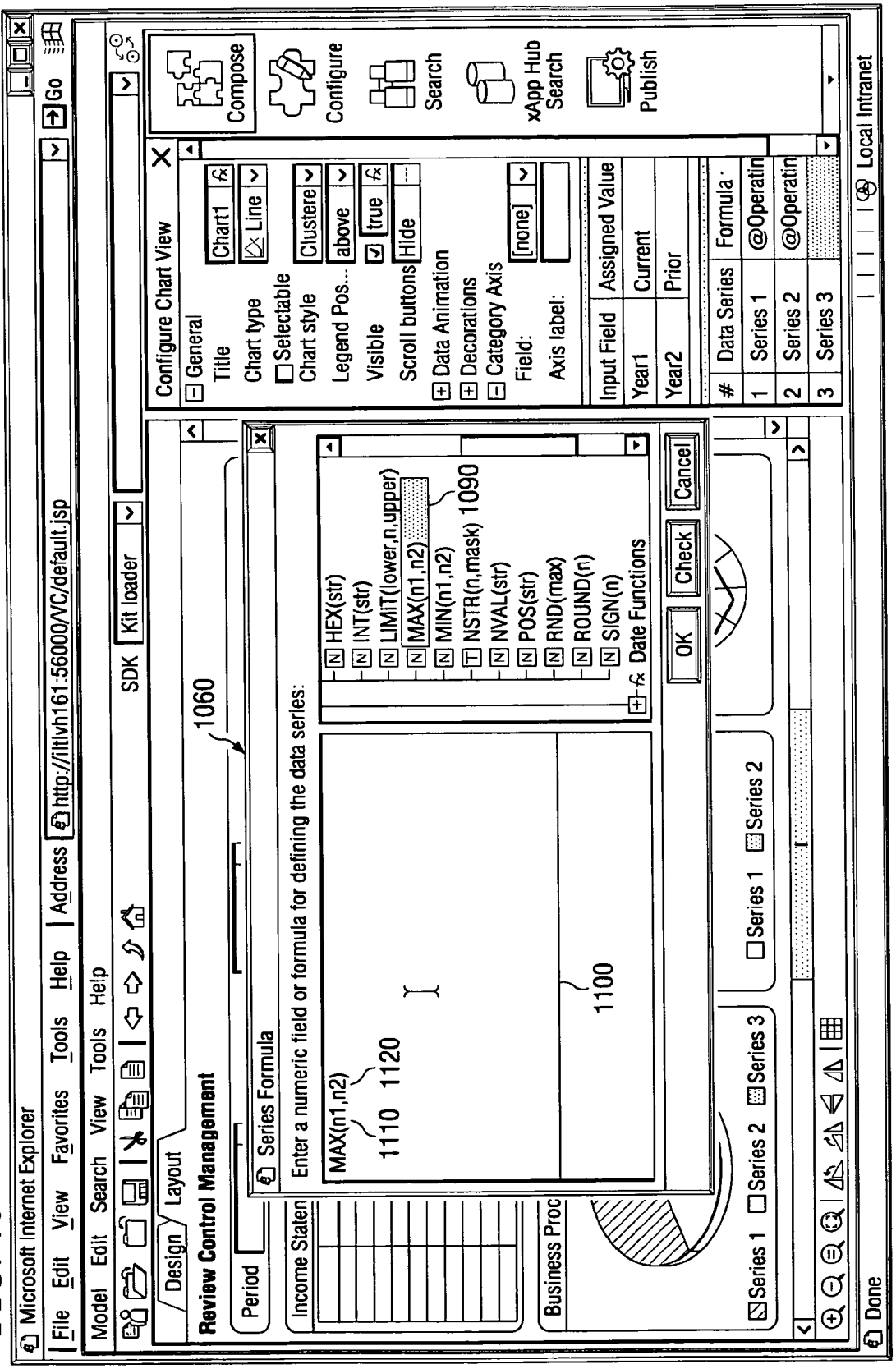
Figure 47:
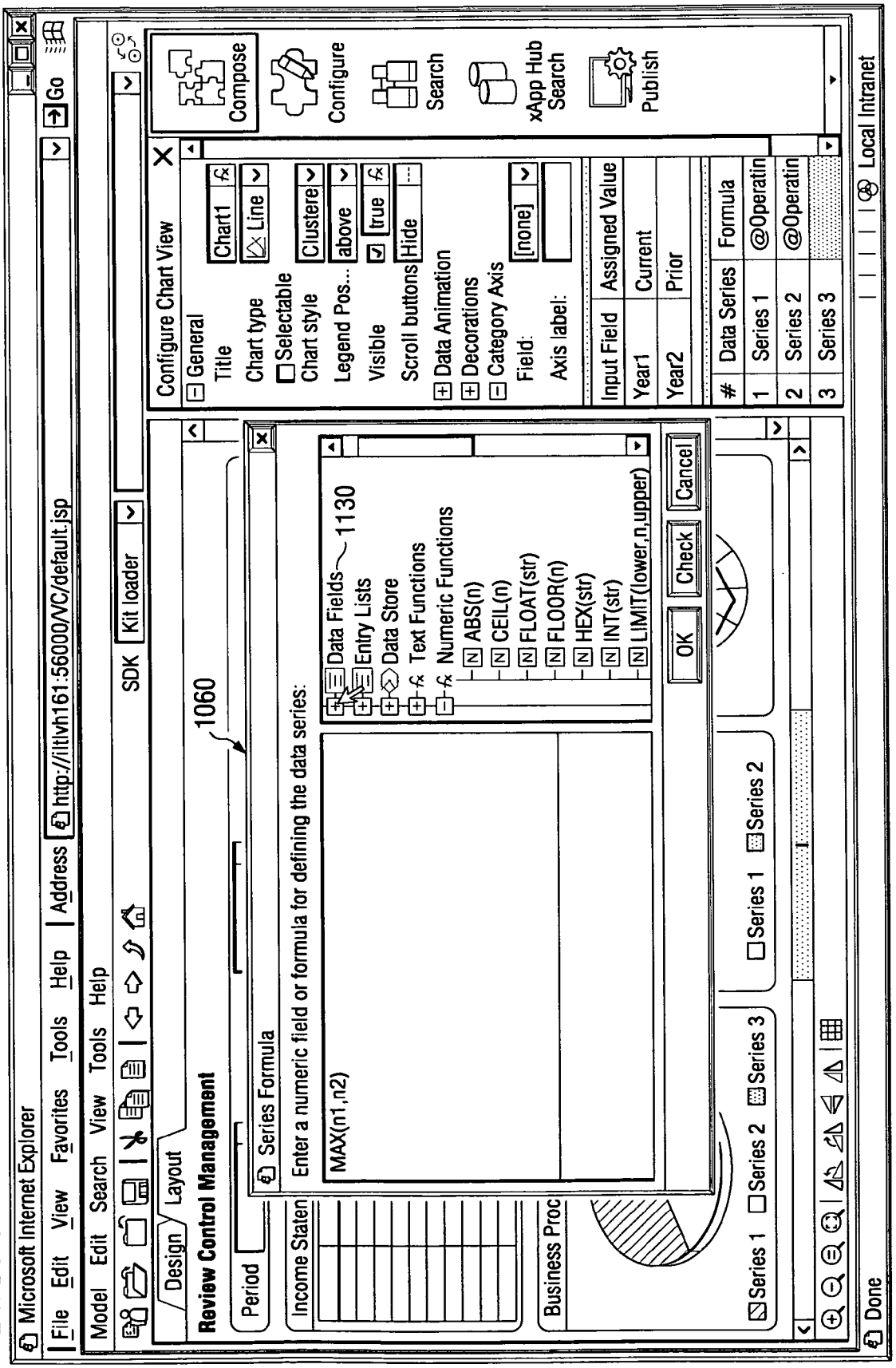
Figure 48:
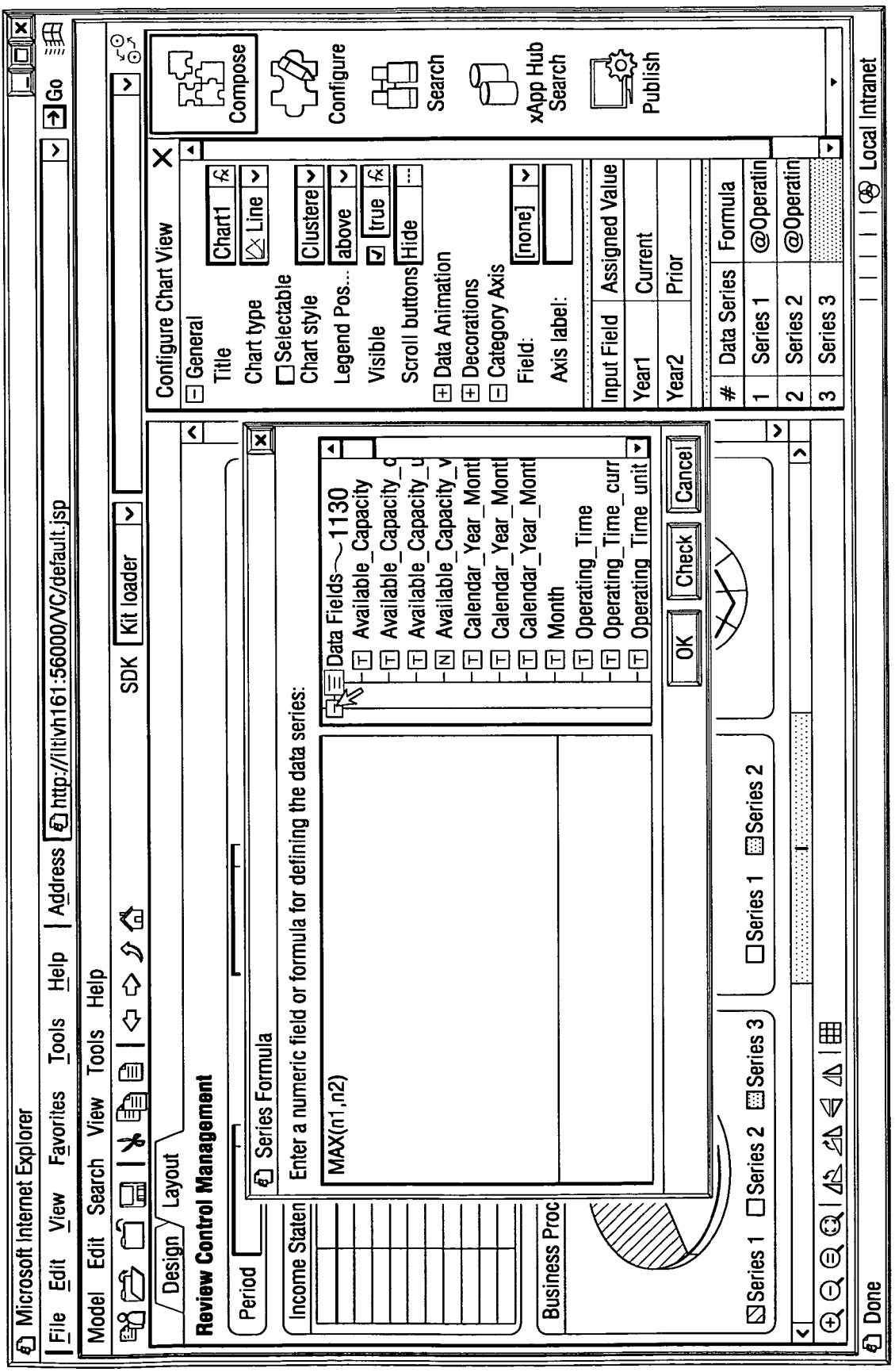
Figure 49:
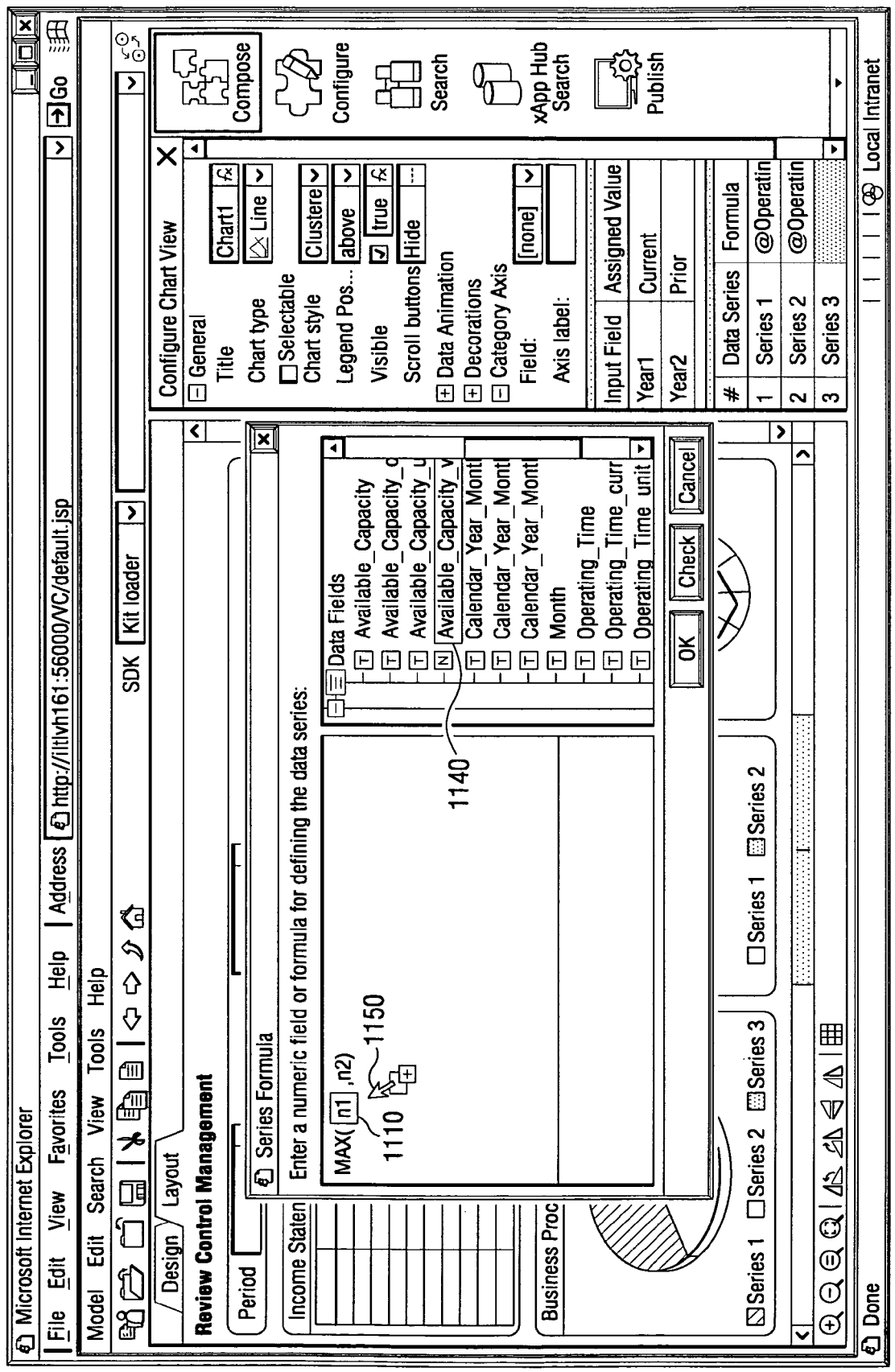
Figure 50:
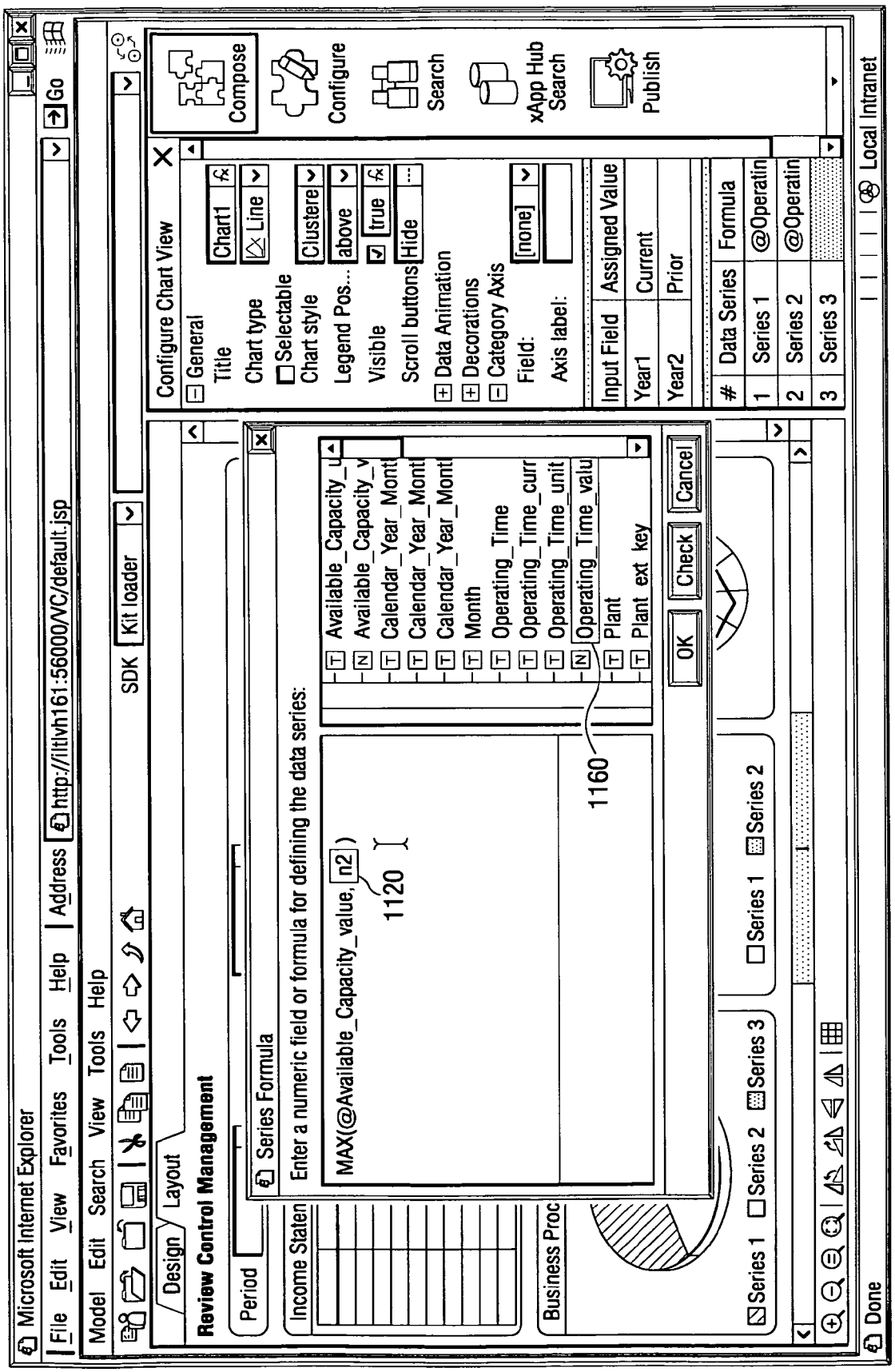
Figure 51:
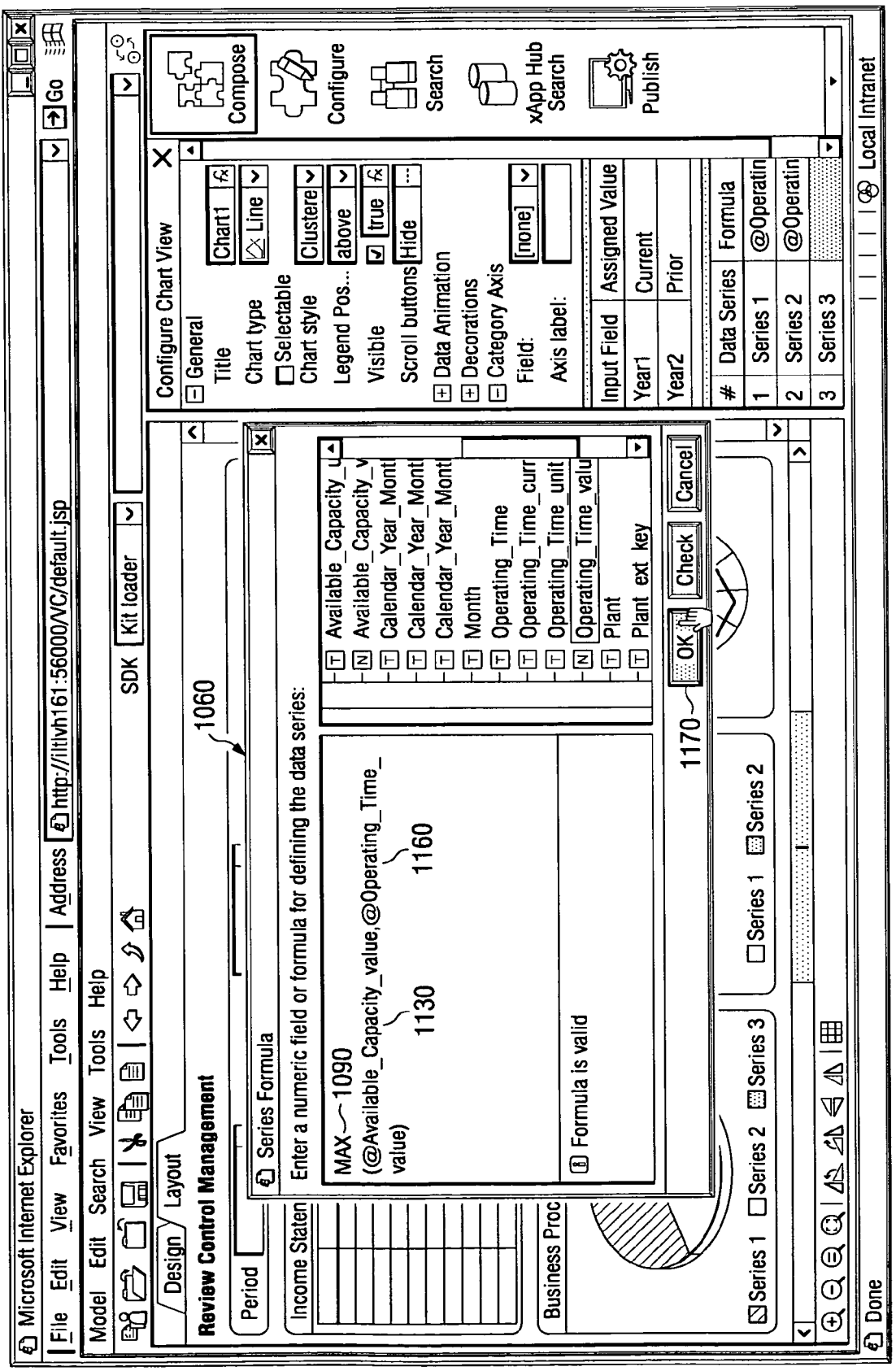
Figure 52:
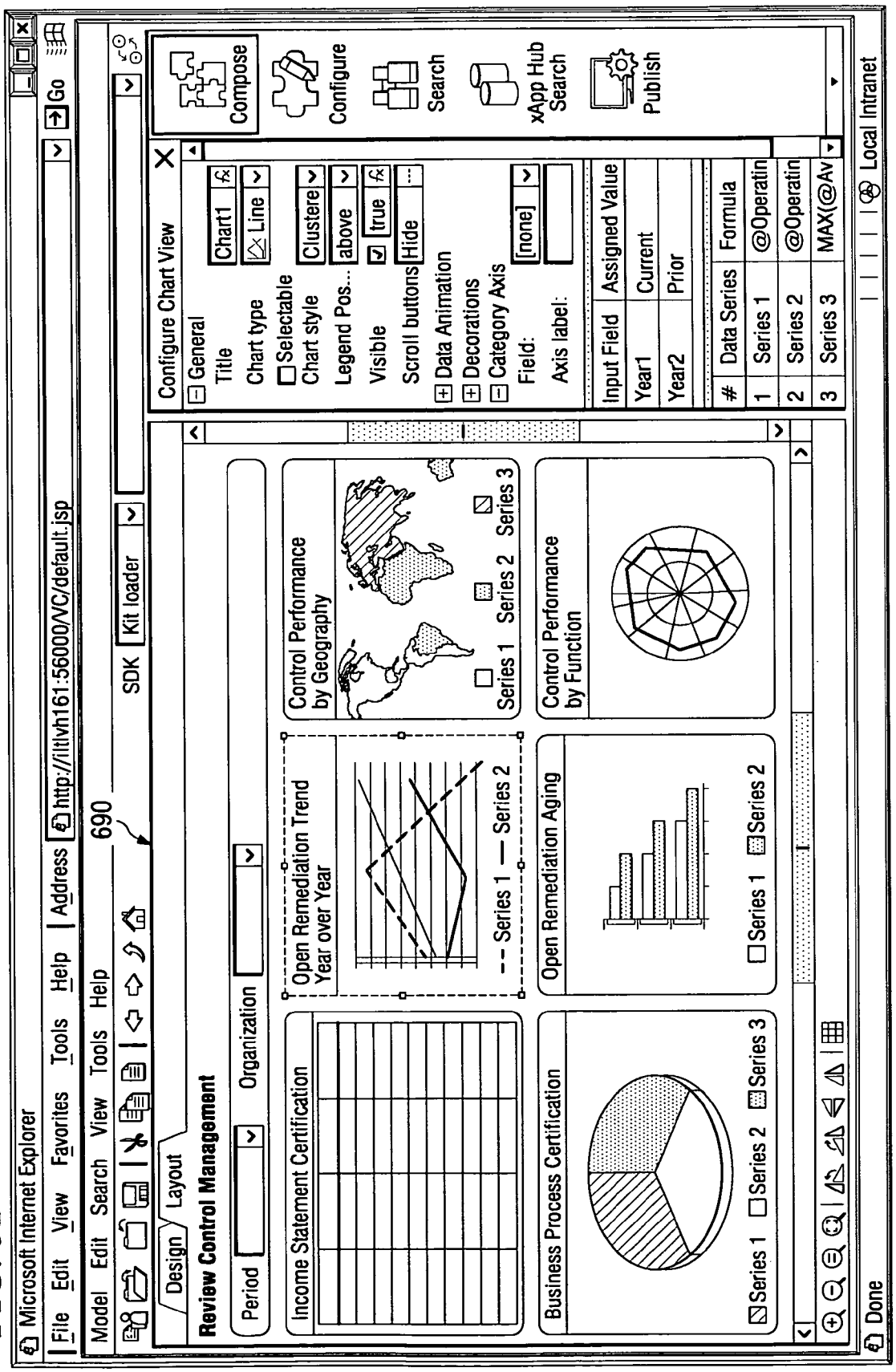

FIGS. 40-52 illustrates configuration and gap-filling of xApp 850. In FIG. 40, the xApp 850 is selected, and the toolbar 710 lists the tools for configuring the selected xApp. FIG. 41 indicates the addition of a new data series 1030 and a corresponding list 1040 of available data series for the new data series 1030. In FIG. 42, an Enter Formula selection 1050 is selected, causing an interactive window 1060 to appear as shown in FIG. 43. The window 1060 allows the user to custom define a series to be charted using a mathematical relationship or function. FIG. 44 shows an expansion of a Numerical Function directory 1070 in the window 1060 and several numerical functions listed thereunder. FIG. 45 shows use of a scroll bar 1080, which the user may use to parse through the available numerical functions provided under the Numerical Function directory 1070. In FIG. 46, a mathematical function 1090 is selected, and a corresponding textual representation of the numerical function 1090 is presented in a user-manipulated portion 1100 of the window 1060. In this example, the selected numerical function 1090 has two available variables 1110, 1120 (n1, n2). FIG. 47 shows selection of a Data Field 1130, and FIG. 48 shows available data fields listed under the Data Fields selection 1130. In FIG. 49, a selected data field 1140 ("Available_Capacity_value") is selected and dragged 1150 to the variable 1110. Consequently, the selected data field 1140 is linked or bound as the variable 1110 of the selected mathematical function 1090. FIG. 50 shows selection of a second data field 1160 for linking or binding as the variable 1120. FIG. 51 shows names of both selected data fields 1130, 1160 as the variables 1110, 1120 in the textual representation of the numerical function 1090 in the user-manipulated portion 1100 of the window 1060. The OK button 1170 is also selected. FIG. 52 shows that the window 1060 has been removed and the UI 690 of the application is again displayed.

Figure 53:
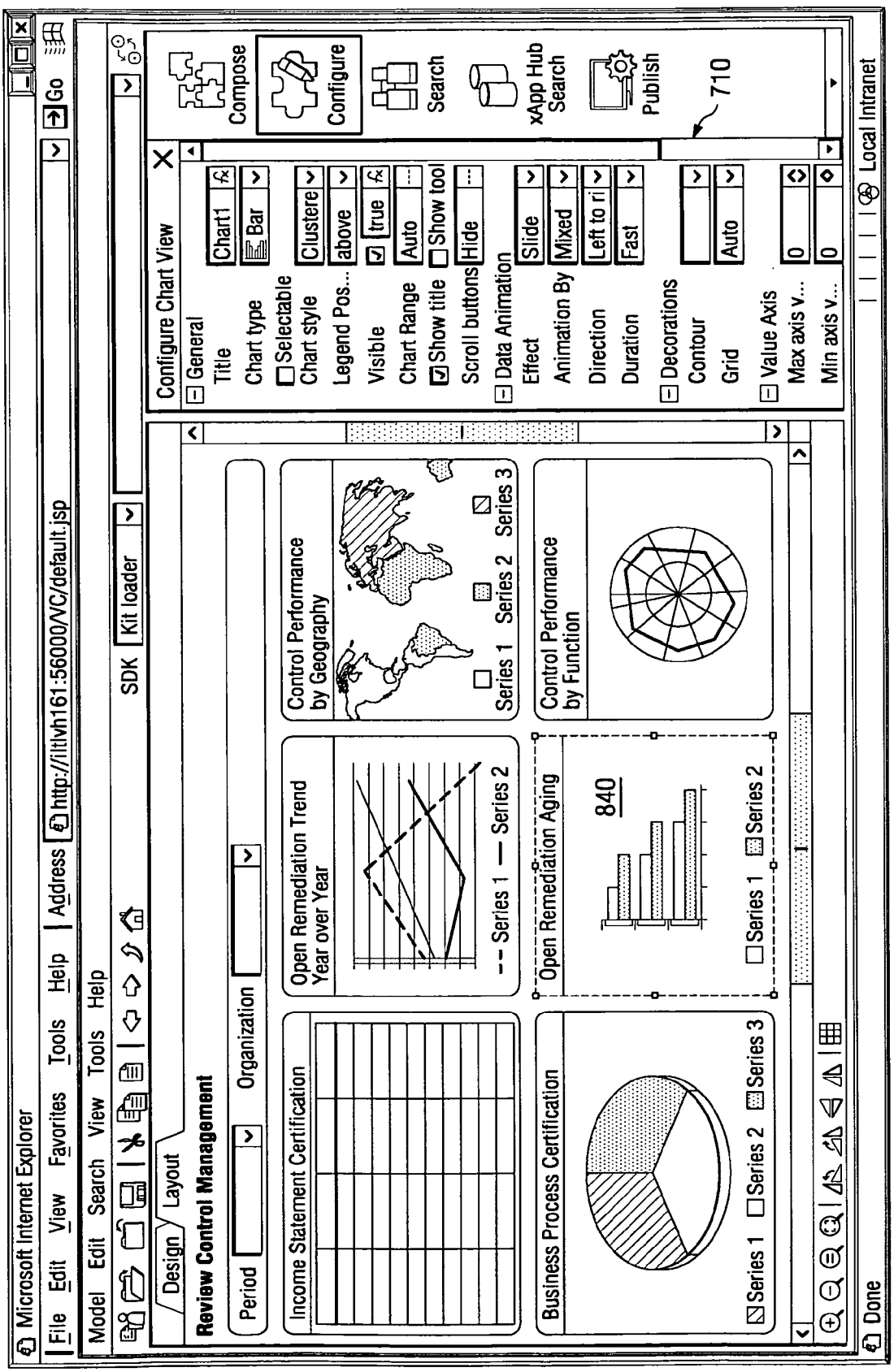
Figure 54:
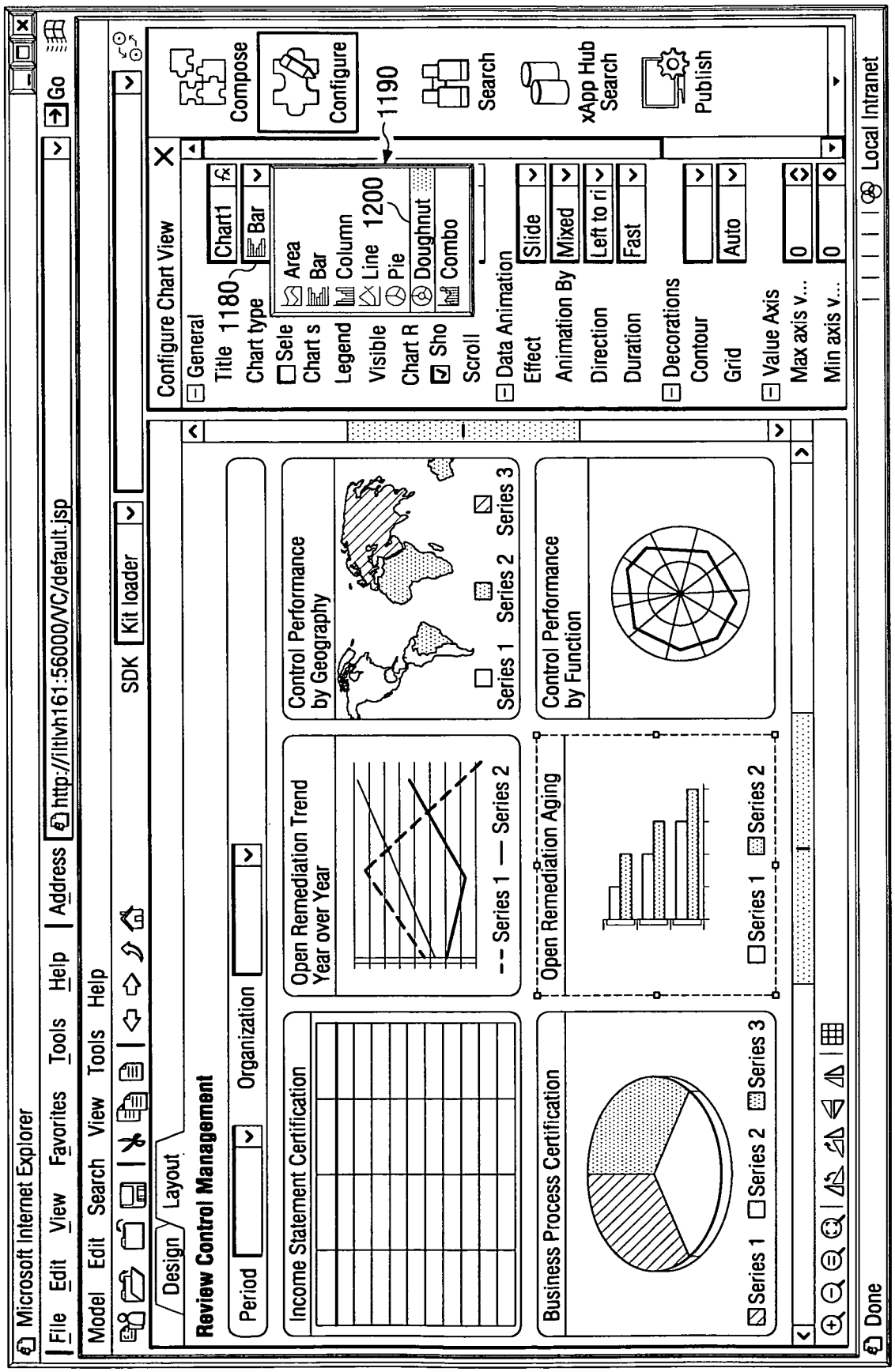
Figure 55:
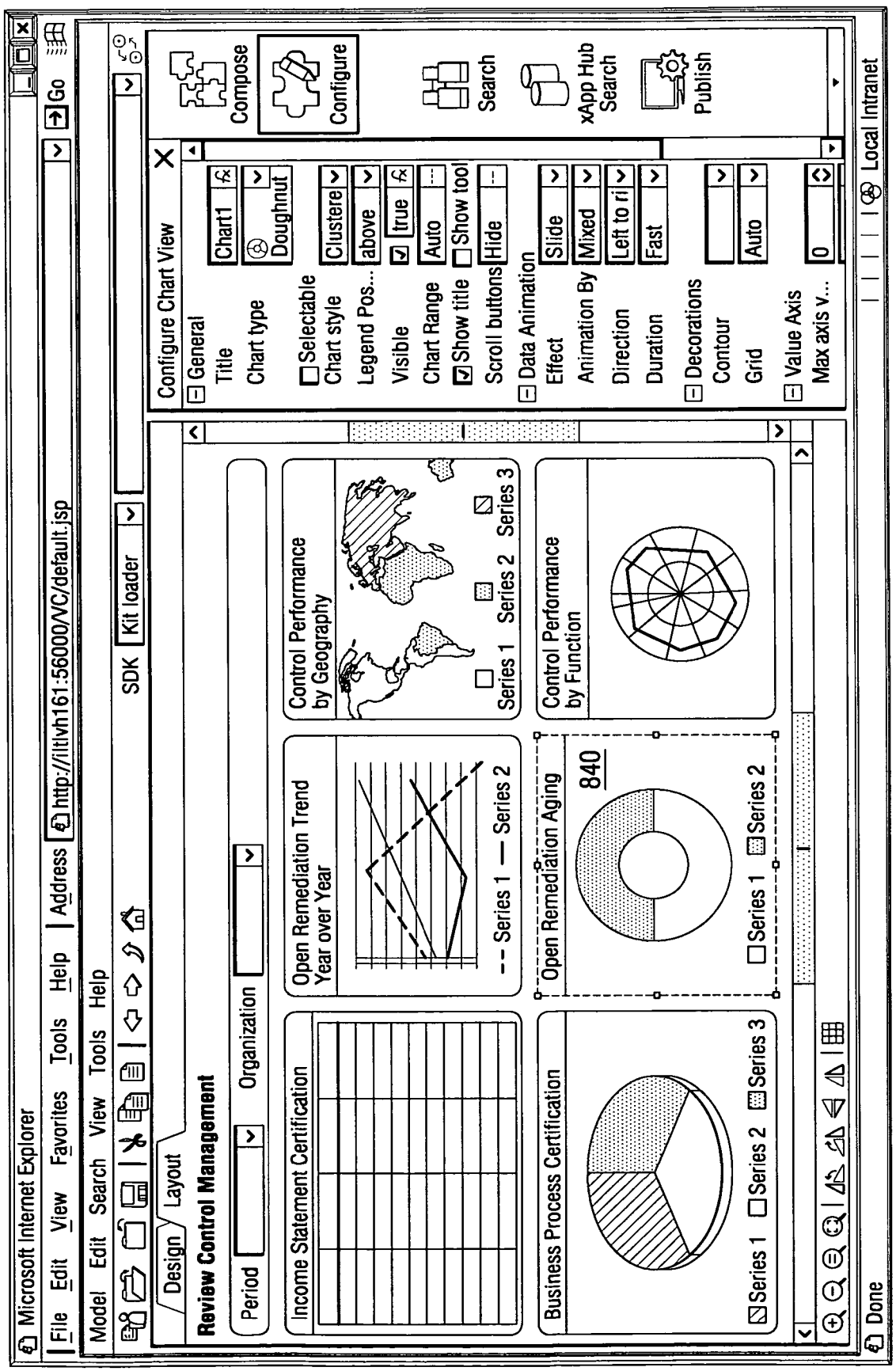
Figure 56:
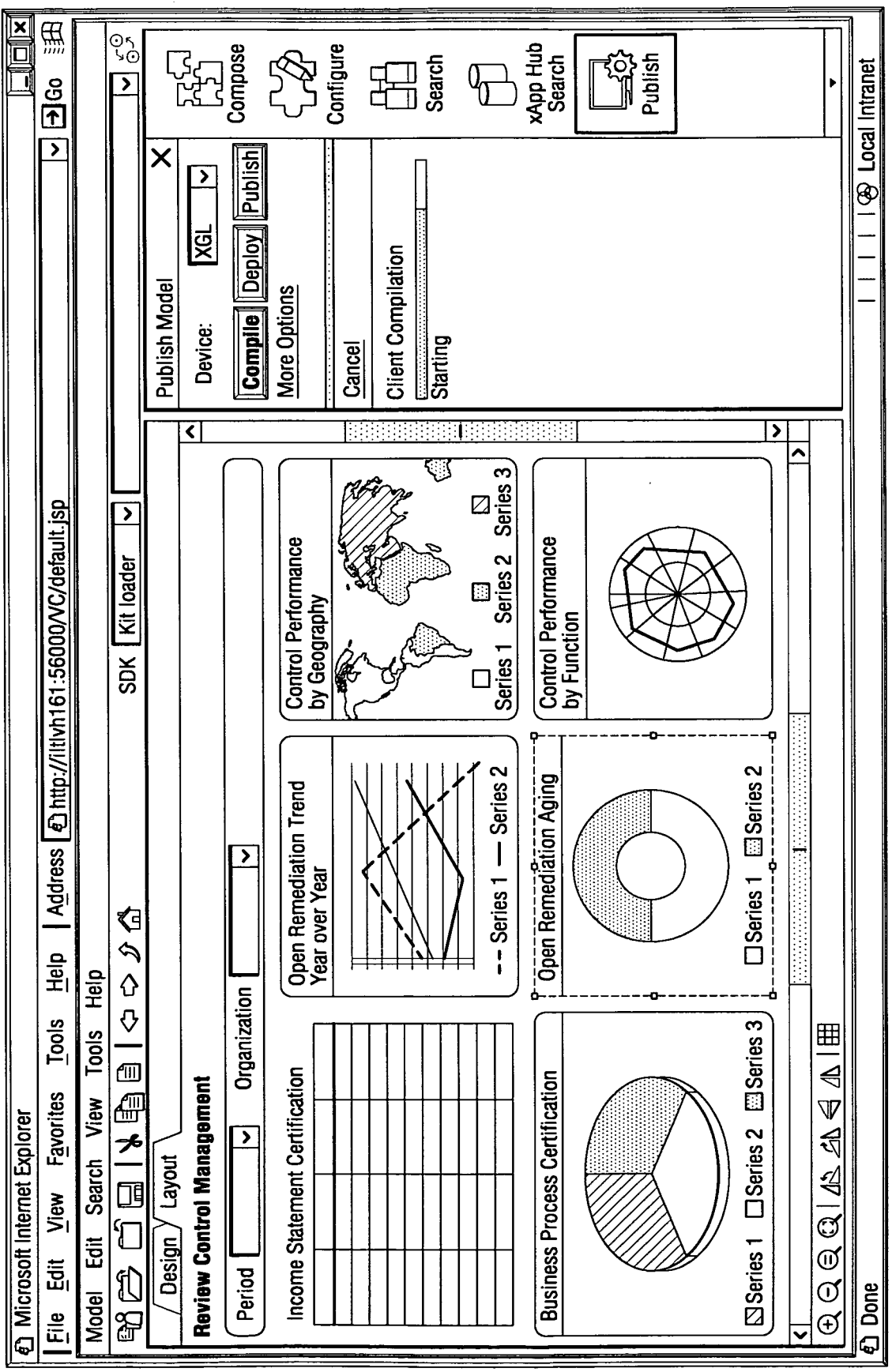
Figure 57:
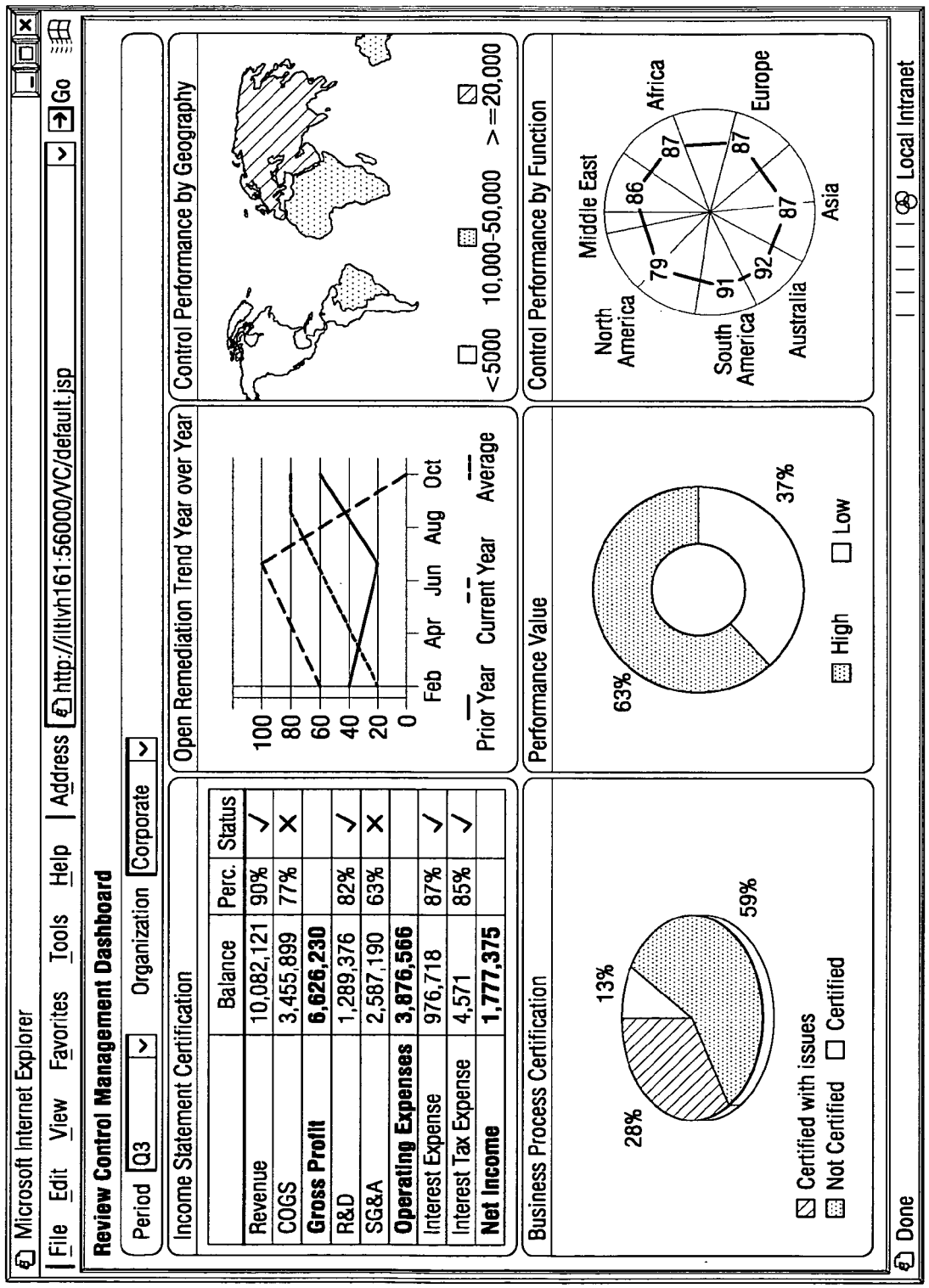

FIGS. 53-57 illustrates configuration and gap-filling of xApp 840. In FIG. 53, xApp 840 is selected and the toolbar 710 lists the tools for configuring the xApp 840. In FIG. 54, the chart type drop-down list 1180 is shown and numerous available graphical representations of chart types 1190 are shown. Accordingly, the user is able to change the chart type of the selected xApp 840 by merely selecting the desired type 1190 from the list 1180. As shown, a "Doughnut" chart type 1200 is selected. FIG. 55 shows that the chart type of the xApp 840 is changed to the selected chart type 1200. In FIG. 56, the Publish button 1210 is selected, causing each of the xApps included in the new application to be executed or otherwise prototyped. FIG. 57 shows the new or modified application after execution.

Figure 58:
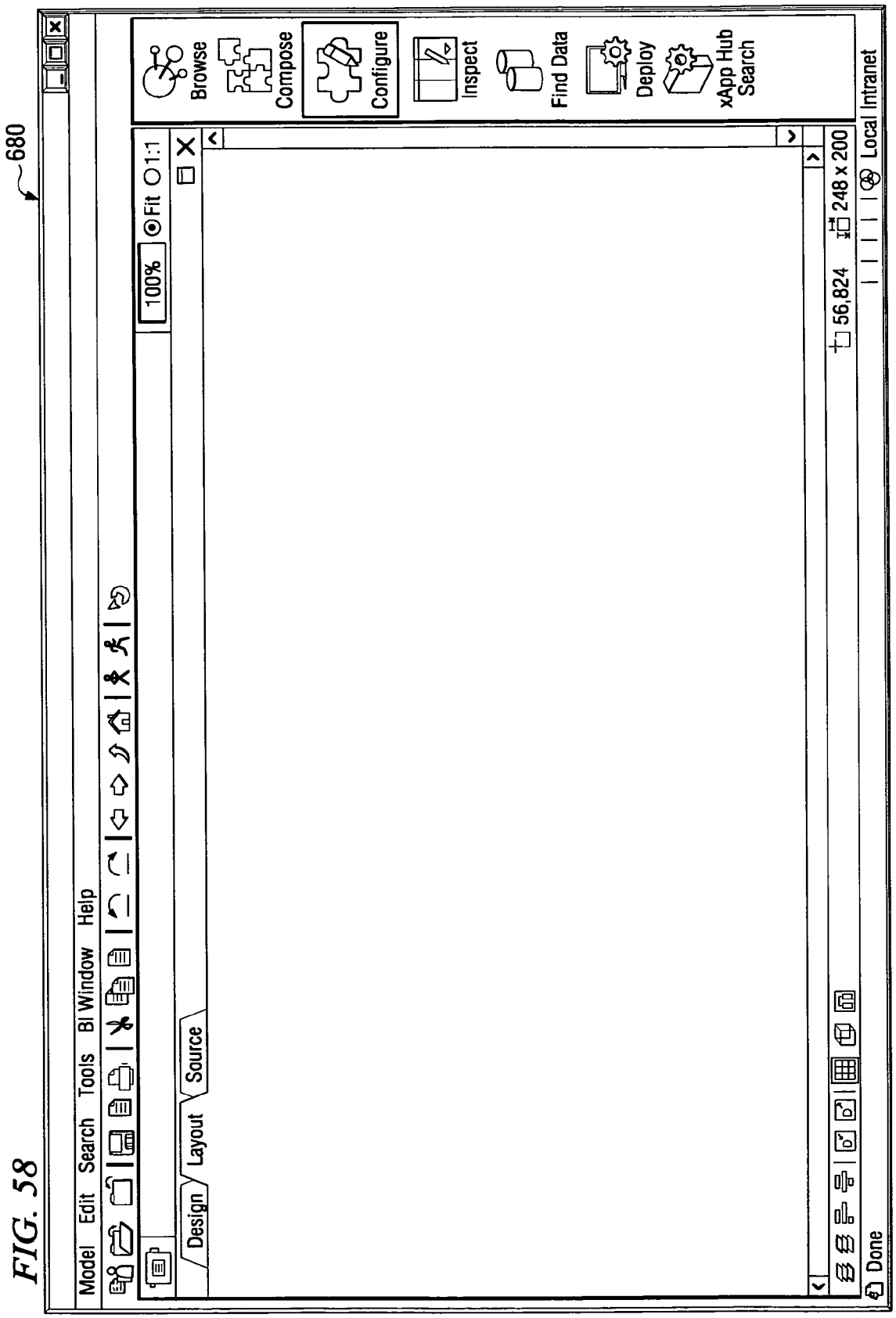
Figure 60:
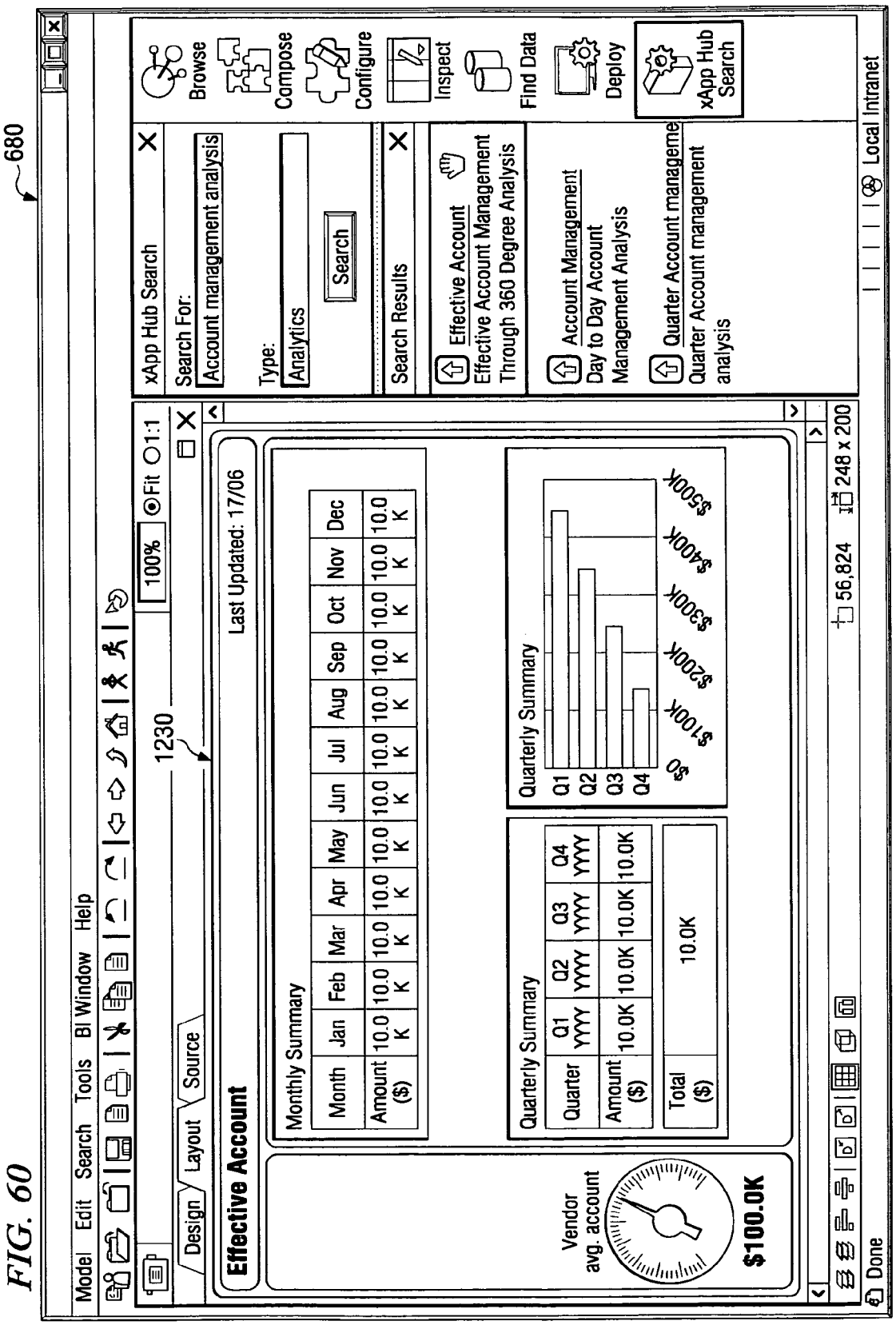
Figure 61:
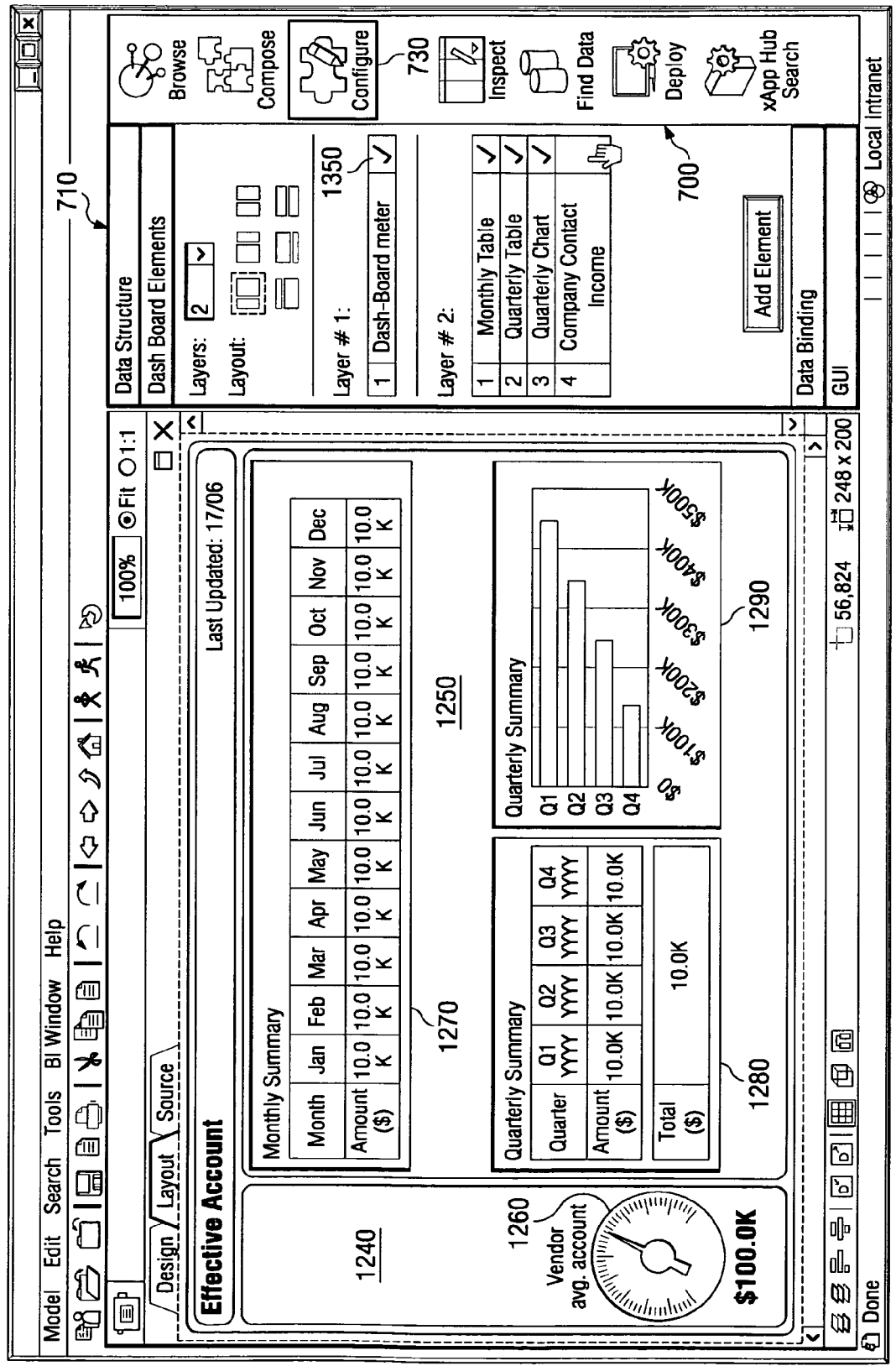
Figure 62:
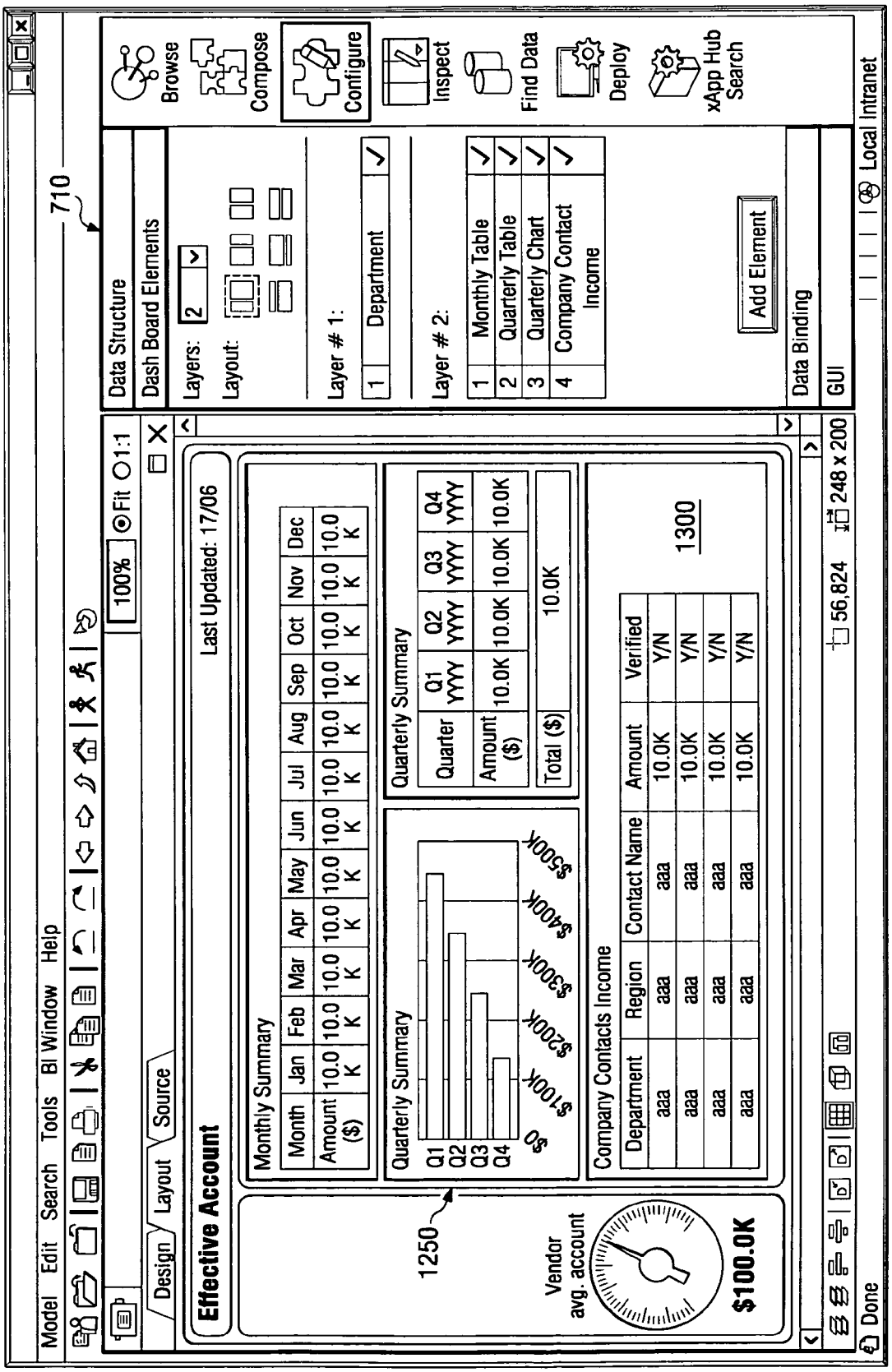
Figure 63:
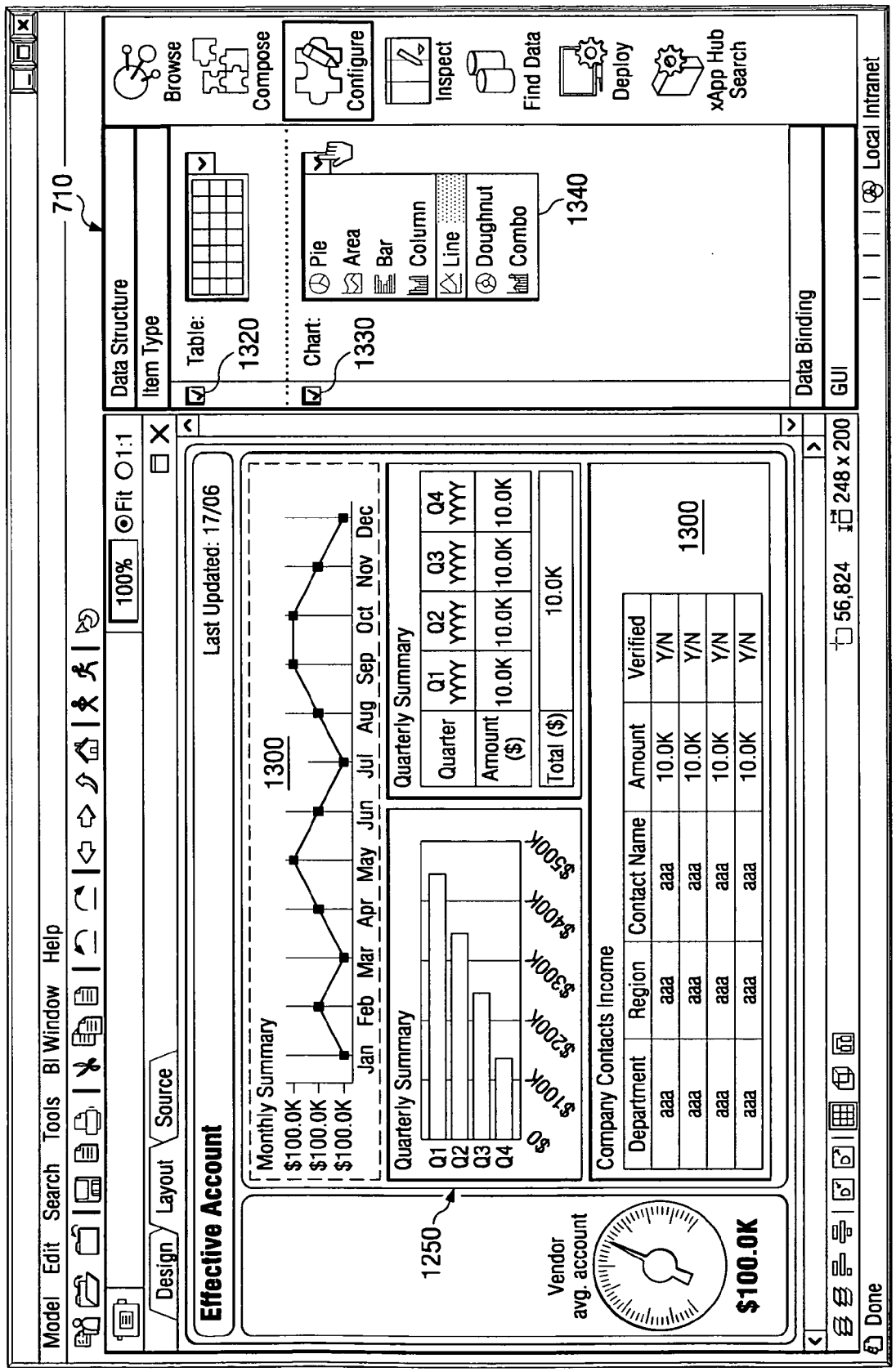
Figure 64:
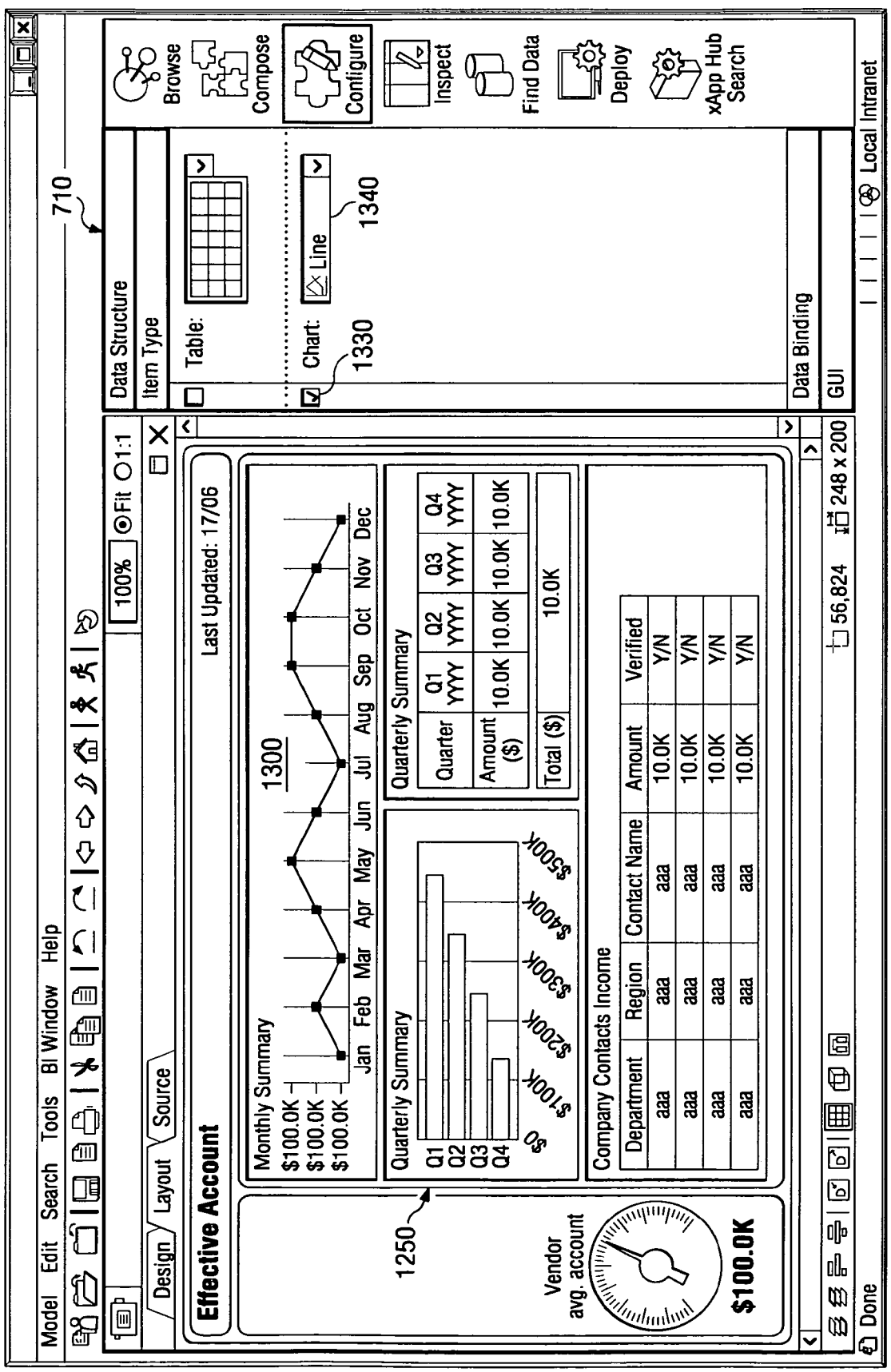

FIGS. 58-74 illustrate a further example of adapting an xApp into a desired application. FIG. 58 shows the workbench 680. In FIGS. 59 and 60, the xApp Hub Search button 740 is selected, causing a search toolbar 710 to appear. In the search field 750, a user may enter a search term, such as "account management analysis," and, in the type field 760, the user may enter an additional term corresponding to a type of xApp to be searched, such as "analytics." The search may be executed by selecting the Search button 770. The xApps identified by the inputted search terms are listed in the field 780. An xApp 1220 is selected and the corresponding UI 1230 for the xApp 1220 is displayed. In FIG. 60, the UI 1230 of the xApp being configured is displayed in the workbench 680. In FIG. 61, the Configure button 730 is selected from the toolbar 700, resulting in the corresponding configuration tools to be displayed in the toolbar 710. In the illustrated example, the xApp's UI 1230 includes two different layers, layer 1240 and layer 1250. The first layer 1240 includes a meter 1260 and the second layer 1250 includes four objects 1270, 1280, 1290, 1300, only three of which are shown in FIG. 61. As shown in the tool 710, the fourth object 1300 is not selected for display. FIG. 62 shows that the fourth object 1300 is selected in the toolbar 710 and is now displayed on the layer 1250. In FIG. 63, the first object 1270 is selected for configuration, and some available configuration options. For example, the user may select checkbox 1320 to display object 1300 as a table or select checkbox 1330 to display object 1300 as a chart. Further, the user may select the pull-down list 1340 to select a chart type defining how object 1300 is to be displayed. In FIG. 64, the checkbox 1330 is selected and the checkbox 1320 is not selected. Accordingly, the object 1300 is displayed as a chart using the selected chart type from the drop-down list 1340, e.g., a line chart.

Figure 65:
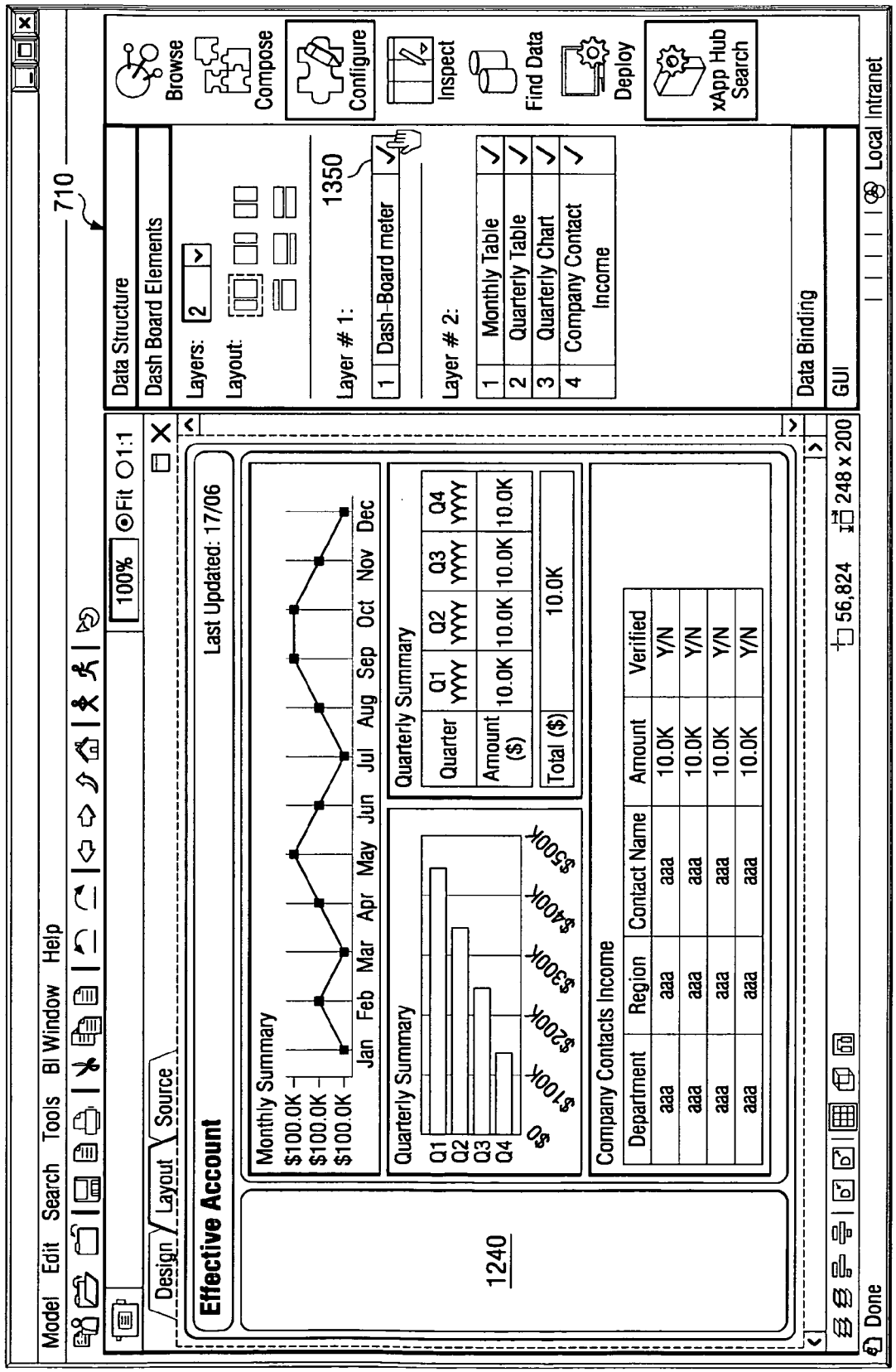
Figure 66:
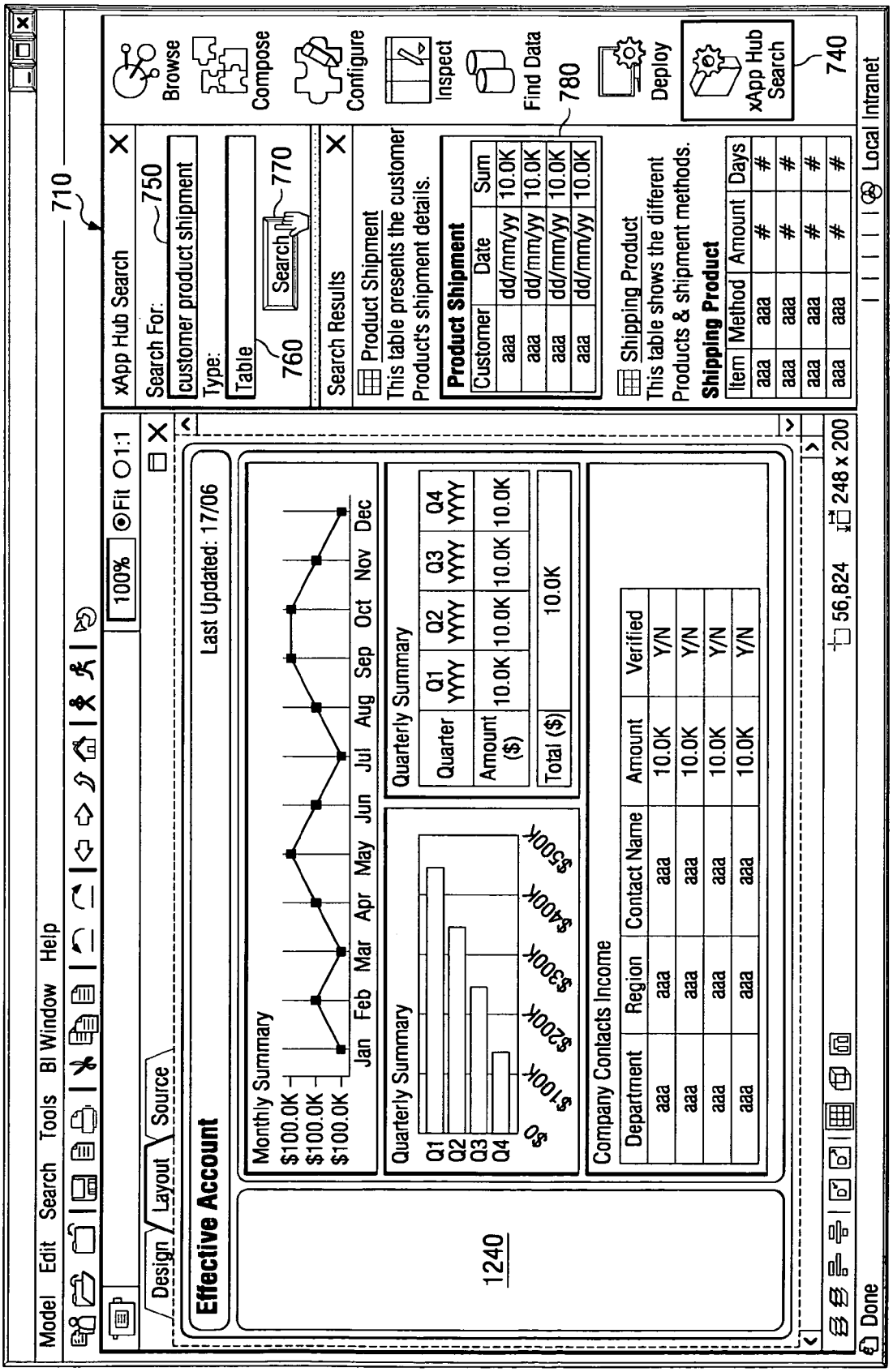
Figure 67:
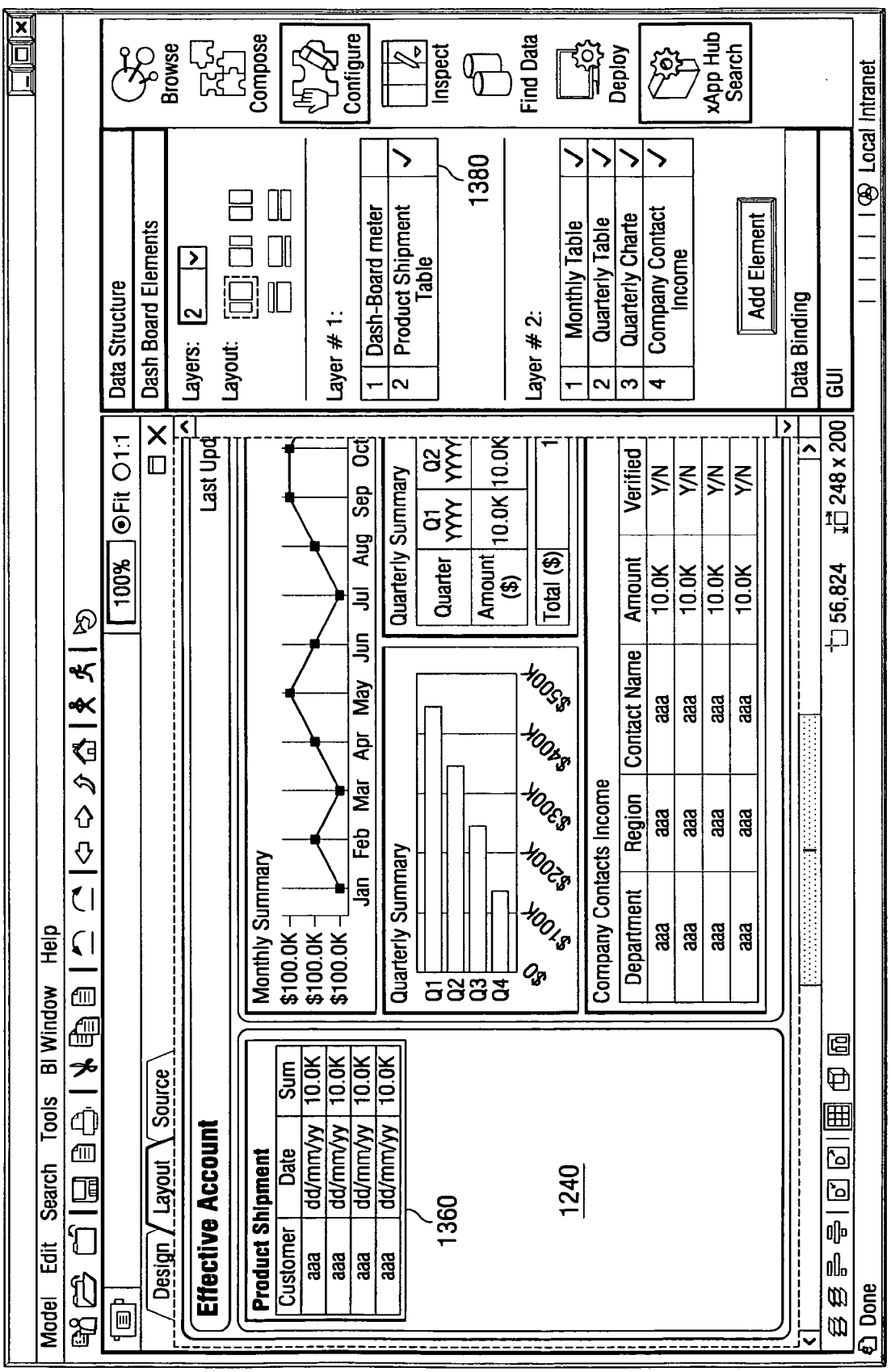

In FIG. 65, a checkbox 1350 under "Layer #1" is selected, causing the meter 1260 to be hidden in the first layer 1240. In FIG. 66, the xApp Hub Search button 740 is selected, permitting the user to search for other xApps. According, a search term "customer product shipment" is entered in the search field 750 and a term "table" is entered in the type field 760. After executing the search by selecting the Search button 770, search results are provided in the field 780. A Product Shipment xApp (object 1360) is selected, causing the object 1360 to be provided in the first layer 1240, as shown in FIG. 67. Further, an item 1370 is provided under the "Layer #1" portion of toolbar 710. Accordingly, a user may hide or unhide object 1380 by selecting a corresponding checkbox 1380.

Figure 68:
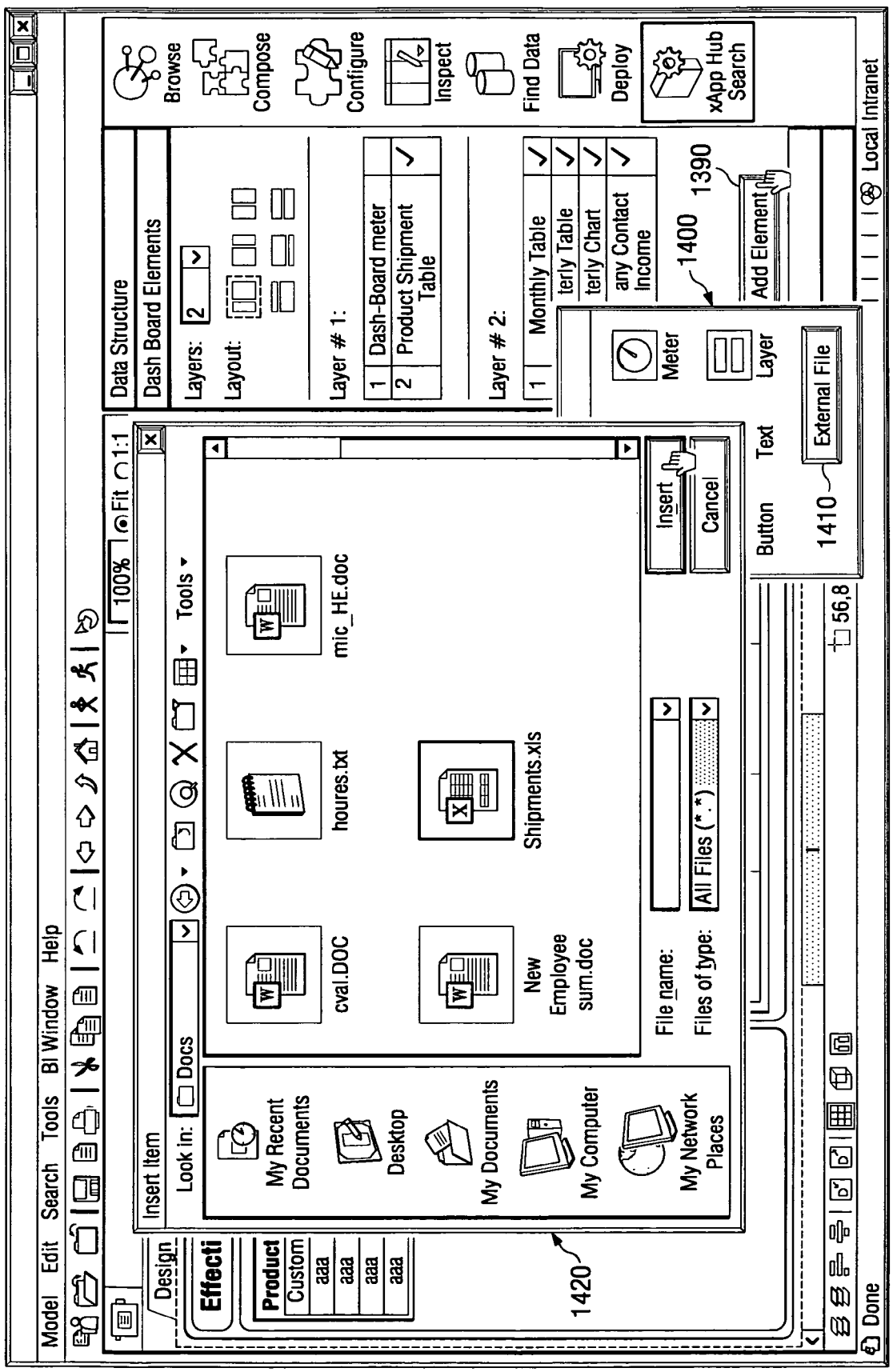
Figure 69:
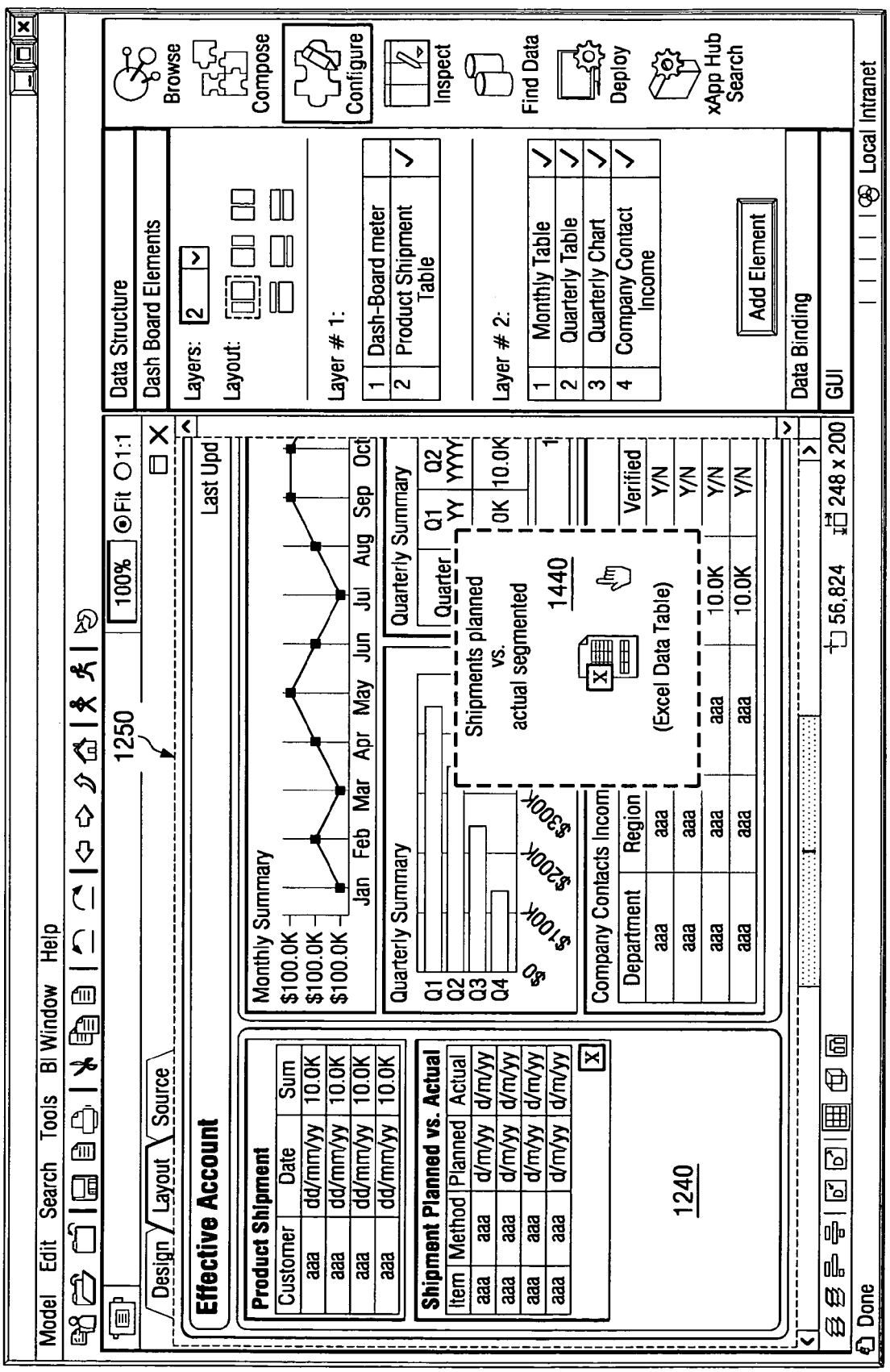
Figure 70:
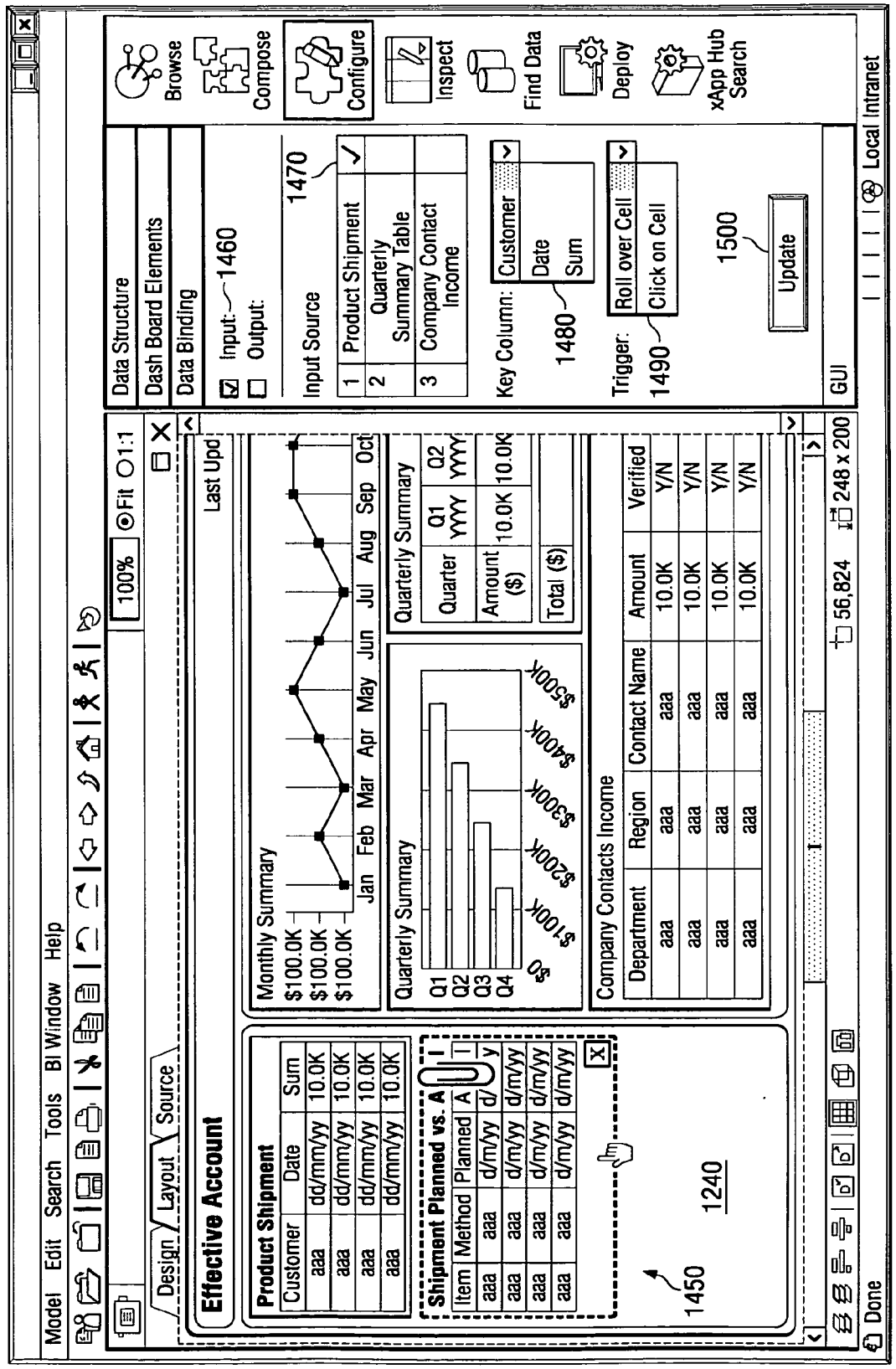
Figure 71:
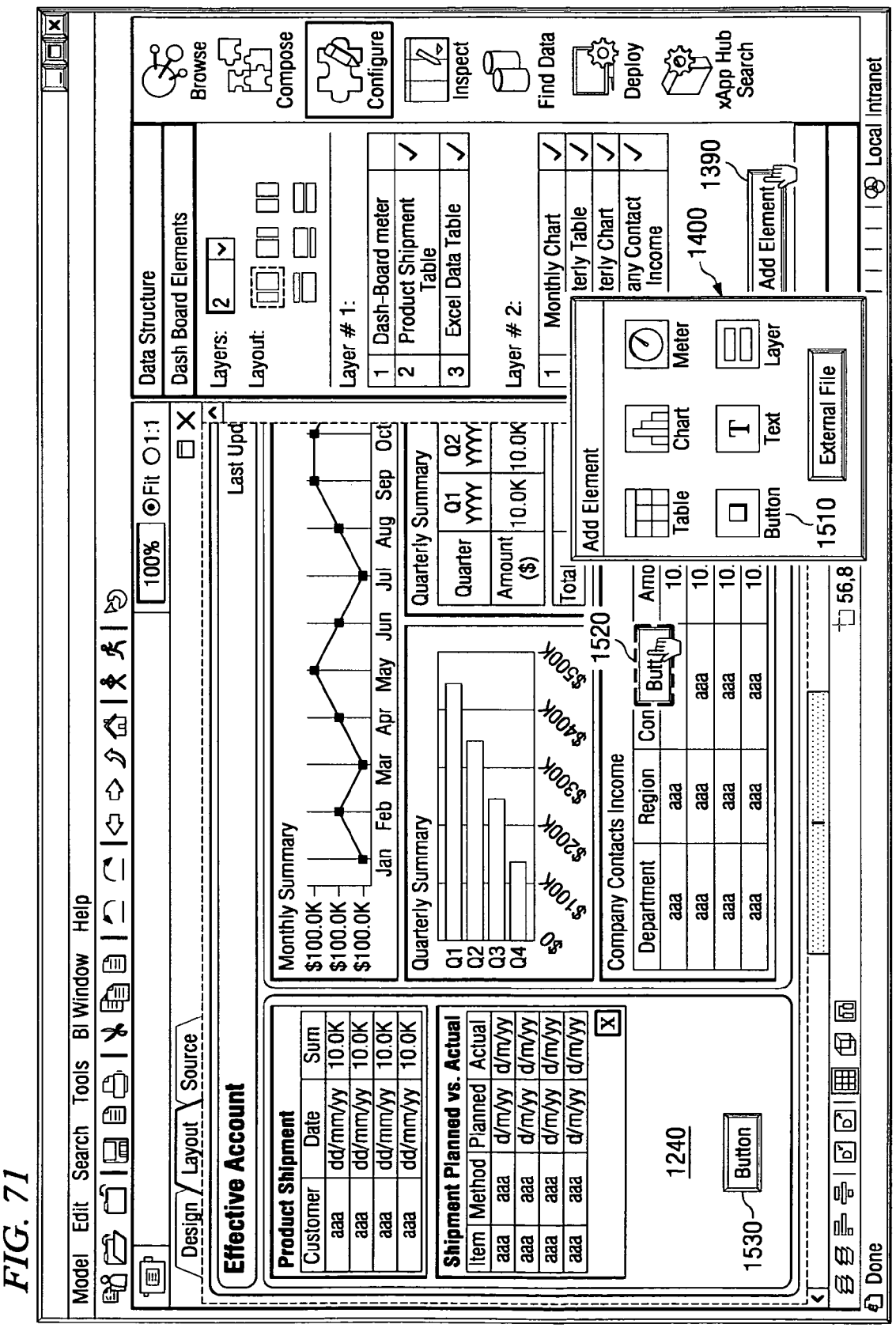

In FIG. 68, when the Add Element button 1390 (located in the toolbar 710) is selected, a window 1400 appears (also shown in FIG. 71). Window 1400 includes, for example, six component types that may be added to the application. As shown in FIG. 71, the user may add a table, chart, meter, button, text, layer, or an external file by selecting a corresponding icon. Referring again to FIG. 68, the External file button 1410 is selected, causing a window 1420 to appear. Window 1420 allows the user to identify a file to be added to the application, such as from a connected data repository. When a file is selected, the Insert button 1430 may be selected to add the file to the application. As shown in FIG. 69, once the file is inserted, an icon 1440 representing the inserted file is provided, and the user may drag and drop the icon 1440 into one of the first or second layers 1240, 1250. In FIG. 70, the inserted file is shown as component 1450 added to the first layer 1240. Also, the user may configure data to be input or output by the added file as well as other configuration options for the added file. For example, in toolbar 710, a checkbox 1460 is selected, indicating what data from the added file may input to or output from the application as well as a trigger to cause the input or output of the data. Similarly, a checkbox 1470 is selected, indicating that a Product Shipment data set is to be used as input data. Also, the user may identify a "key column" of the file inserted with a drop-down list 1480 and may identify a trigger by drop-down list 1490. An Update button 1500 may be selected to update the configuration of the component 1450.

Figure 72:
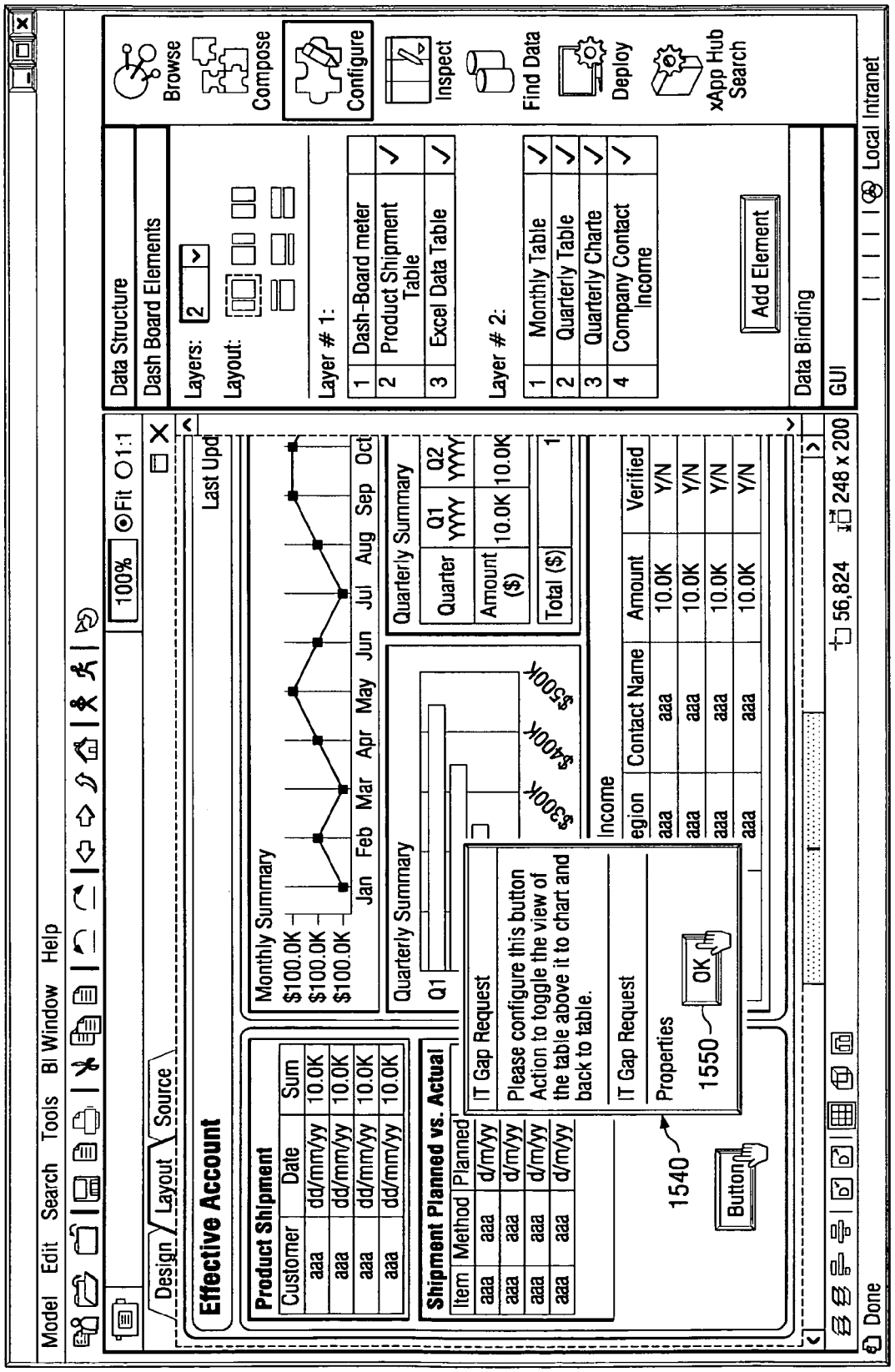
Figure 73:
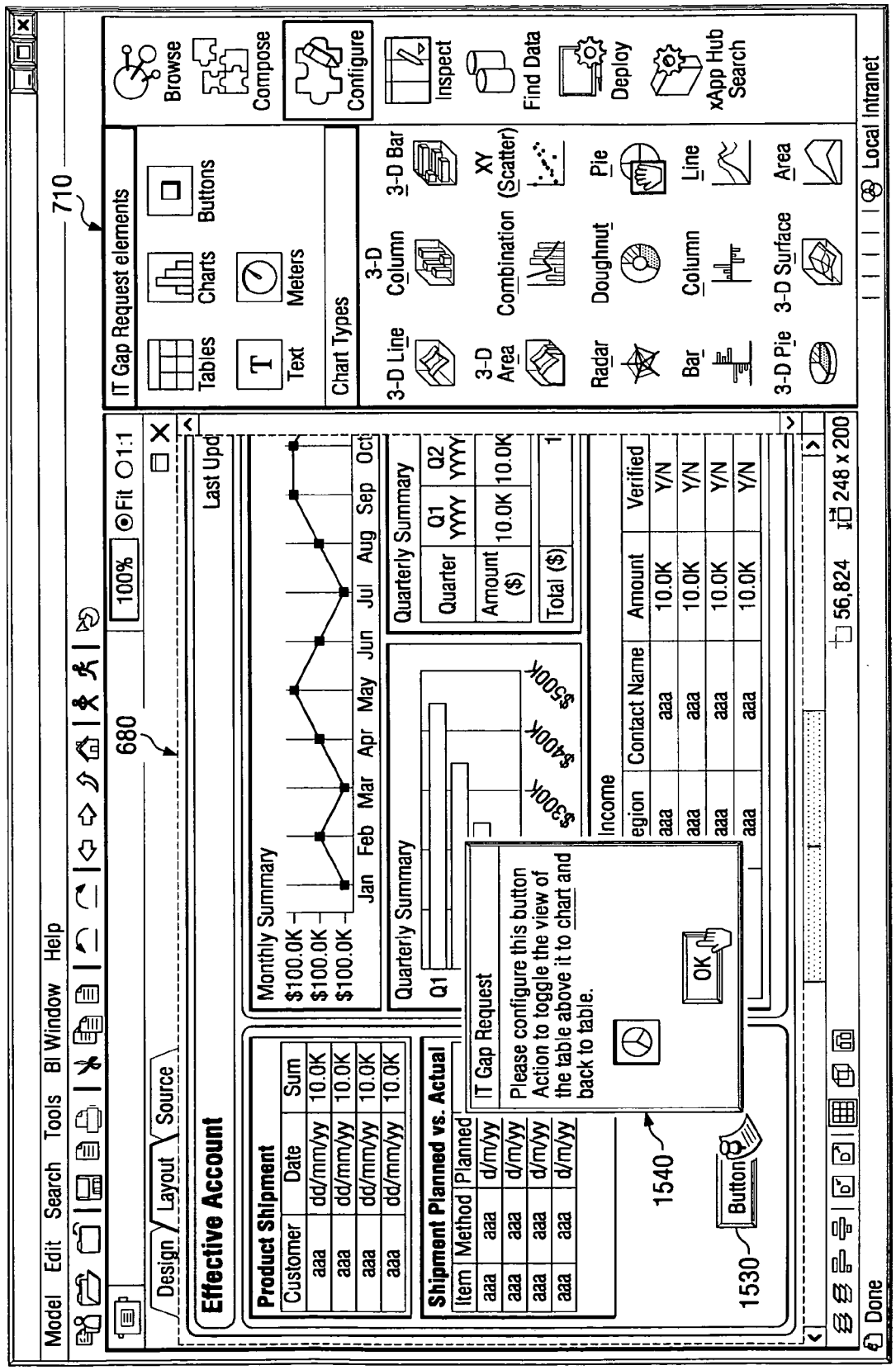
Figure 74:
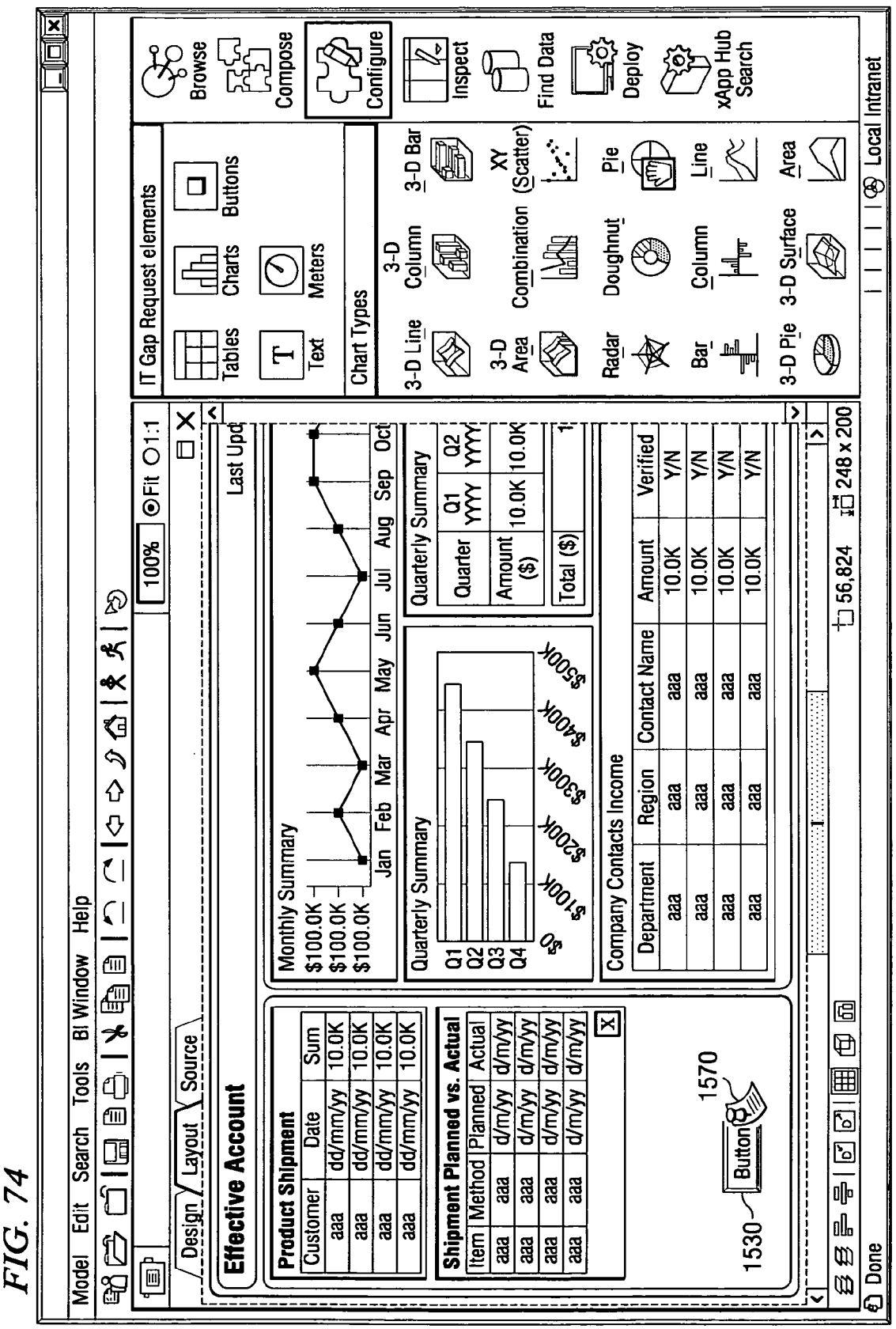

FIGS. 71-74 show how the user may define a gap in the application to be filled by an information technology specialist. FIG. 71 also shows a new component being added by selection of the Add Element button 1390. The button icon 1510 is selected from the window 1400, creating an object 1520 that may be dragged and dropped to a desired position. As indicated, the object 1520 is added to the first layer 1240, creating a button component 1530. In FIG. 72, a to-do list 1540 is displayed, prompting the user to define a function to be performed by the added button object 1530. By selecting the OK button 1550, configuration options are displayed in the toolbar 710, as shown in FIG. 73. A pie chart icon 1560 is selected from the toolbar 710 and dragged and dropped to the button object 1530. Consequently, the user indicates that the button object 1530 is to cause a table included with the application to switch between a table view and a chart view, as indicated in the to-do list 1540. Thus, within the workbench, 680, the user may define functionality of a component, which may be completed by an information technology specialist at a later time, for example. Therefore, as shown in FIG. 74, the button object 1530 includes a pin and note icon 1570, indicating that a gap to be filled by the information technology specialist.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method performed by one or more processors for developing an application, the method comprising:
   using the one or more processors to identify one or more pre-constructed business process components using a third party portal;
   presenting a pre-built user interface for each of the one or more business process components, each user interface comprising an example of a visual representation of a particular business process component associated with the user interface;
   receiving a selection for at least one of the presented user interfaces;
   identifying a design-time model representation of at least one of the pre-constructed business process components associated with the selected user interface to form at least a part of a particular application;
   generating an abstract representation of the particular application from the design-time model representation of the at least one of the pre-constructed business process components, wherein the abstract representation includes a representation of a graphical user interface described by design-time model representations associated with the particular application; and
   sending the abstract representation to a runtime platform for transformation into a runtime representation specific to the runtime platform,
   wherein the abstract representation is generated based on an executable graphical user interface language (XGL).

2. The method according to claim 1, further comprising:
   identifying one or more gaps existing between an operation of the one or more selected pre-constructed business process components and an operation of the particular application; and
   filling the gaps existing between the operation of the one or more pre-constructed business process components and the operation of the particular application.

3. The method of claim 2, wherein filling the gaps between the operation of the one or more pre-constructed business process components and the operation of the particular application comprises adapting the one or more pre-constructed business process components to function in a predetermined manner.

4. The method according to claim 3, wherein adapting the one or more pre-constructed business process components to function in a predetermined manner comprises importing and configuring one or more additional pre-constructed business process components.

5. The method according to claim 3, wherein adapting the one or more pre-constructed business process components to function in a predetermined manner comprises linking two or more pre-constructed business process components together.

6. The method according to claim 1, wherein identifying at least one pre-constructed application comprises requesting a search of a library of pre-constructed business process components through the third party portal.

7. The method according to claim 6, wherein the search utilizes criteria comprising at least one user-defined term and at least one taxonomy term.

8. The method of claim 1, the particular application comprises an existing application operable to incorporate the selected business process component.

9. Software for managing reusable business process components comprising computer readable instructions embodied on non-transitory, tangible media and operable to:
   identify a first business process component of a first type;
   store the first business process component in a repository, the repository including a plurality of other business process components with at least a second business process component of a second type and at least a subset of the business process components comprising reusable components;
   present an interface to a business analyst, the interface operable to display information for at least the first and second business process components, wherein the displayed information for each of the business process components includes a user interface comprising an example of a visual representation of the business process component;
   receive a selection for at least one of the user interfaces;
   identify a design-time model representation of the business process component associated with the selected user interface to form at least a part of a particular application;
   generate an abstract representation of the particular application from the design-time model representation of the business process component, wherein the abstract representation includes a representation of a graphical user interface described by design-time model representations associated with the particular application; and
   send the abstract representation to a runtime platform for transformation into a runtime representation specific to the runtime platform,
   wherein the abstract representation is generated based on an executable graphical user interface language (XGL).

10. The software of claim 9, the interface presented in response to a request by the business analyst and comprising a searching component, the software further operable to:
    present the searching component to the business analyst;
    select business process components based on a requested search from the business analyst; and
    display information associated with at least a portion of the selected components.

11. The software of claim 10 further operable to:
    receive a selection of at least one business process component; and
    allow the business analyst to acquire the selected business process component.

12. The software of claim 11, wherein allowing the user to acquire the selected business process component comprises:
    bill the business analyst based on associated costs for the selected business process component; and allow the business analyst to download the business process component upon payment.

13. The software of claim 9, the repository comprising a first and second repository.

14. The software of claim 13, the first repository comprising a local repository and the second repository comprising a remote repository.

15. The software of claim 13, the first repository comprising a first type of repository and the second repository comprising a second type of repository.

16. The software of claim 9 further operable to allow the business analyst to execute an interactive trial of one of the business process components associated with the displayed information.

17. The software of claim 9 further operable to receive a tag for the first business process component to facilitate subsequent searches.

18. The software of claim 9, the repository further storing automatically identified information involving relationships among two or more business process components.

19. The software of claim 9, the interface further operable to display an expert locator, one or more discussion groups, and usage metrics.

20. The software of claim 9 further operable to authenticate the business analyst via the interface prior to displaying the information.

21. The software of claim 9 further operable to automatically filter the displayed information based on a role of the business analyst.

22. A system comprising:
memory operable to store business process components; and
one or more processors operable to:
identify one or more pre-constructed business process components using a third party portal;
present a pre-built user interface for each of the one or more business process components, each user interface comprising an example of a visual representation of a particular business process component associated with the user interface;
receive a selection for at least one of the presented user interfaces;
identify a design-time model representation of at least one of the pre-constructed business process components associated with the selected user interface to form at least a part of a particular application;
generate an abstract representation of the particular application from the design-time time model representation of the at least one of the pre-constructed business process components, wherein the abstract representation includes a representation of a graphical user interface described by design-time model representations associated with the particular application; and
send the abstract representation to a runtime platform for transformation into a runtime representation specific to the runtime platform,
wherein the abstract representation is generated based on an executable graphical user interface language (XGL).

23. The system of claim 22, wherein the one or more processors are further operable to:
identify one or more gaps existing between an operation of the one or more selected pre-constructed business process components and an operation of the particular application; and
fill the gaps existing between the operation of the one or more pre-constructed business process components and the operation of the particular application.

24. The system of claim 23 wherein filling the gaps between the operation of the one or more pre-constructed business process components and the operation of the particular application comprises adapting the one or more pre-constructed business process components to function in a predetermined manner.

25. The system of claim 24, wherein adapting the one or more pre-constructed business process components to function in a predetermined manner is accomplished free from exposure to programming code of the one or more business process components.

26. The system of claim 24, wherein adapting the one or more pre-constructed business process components to function in a predetermined manner is accomplished free from exposure to an application model of the one or more business process components.

27. The method of claim 1, wherein each business process component complies with a service-oriented architecture.

28. The method of claim 1, wherein the abstract representation is independent of a particular runtime platform.

29. The method of claim 1, wherein the design-time model representation includes a machine-readable representation of an application encapsulating at least one design parameter related to a graphical user interface of the application, the at least one design parameters including at least one of a graphical user interface component, a dependency between multiple graphical user interface components, an input, or an output.

30. The method of claim 1 further comprising sending the abstract representation to a second runtime platform different from the runtime platform, wherein the second runtime platform is associated with at least one of a different graphical user interface framework, source code in a different programming language, or a graphical user interface for a different target device with respect to the runtime platform.

* * * * *